(12) United States Patent
Goyal et al.

(10) Patent No.: US 12,316,423 B2
(45) Date of Patent: May 27, 2025

(54) IDLE/INACTIVE MODE OPERATIONS IN HIGHLY DIRECTIONAL UE-CENTRIC SYSTEMS

(71) Applicant: InterDigital Patent Holdings, Inc., Wilmington, DE (US)

(72) Inventors: Sanjay Goyal, Deer Park, NY (US); Ravikumar Pragada, Warrington, PA (US); Hussain Elkotby, Conshohocken, PA (US); Tanbir Haque, Jackson Heights, NY (US); Alpaslan Demir, East Meadow, NY (US); Patrick Cabrol, Bayshore, NY (US); Mihaela Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/038,406

(22) PCT Filed: Dec. 16, 2021

(86) PCT No.: PCT/US2021/063830
§ 371 (c)(1),
(2) Date: May 23, 2023

(87) PCT Pub. No.: WO2022/133101
PCT Pub. Date: Jun. 23, 2022

(65) Prior Publication Data
US 2024/0007168 A1 Jan. 4, 2024

Related U.S. Application Data

(60) Provisional application No. 63/145,823, filed on Feb. 4, 2021, provisional application No. 63/126,272, filed on Dec. 16, 2020.

(51) Int. Cl.
*H04L 5/12* (2006.01)
*H04B 7/024* (2017.01)
*H04B 7/06* (2006.01)

(52) U.S. Cl.
CPC .......... *H04B 7/0695* (2013.01); *H04B 7/024* (2013.01)

(58) Field of Classification Search
CPC ............................. H04B 7/0695; H04B 7/024
(Continued)

(56) References Cited

U.S. PATENT DOCUMENTS

| 2019/0028170 A1 | 1/2019 | Zhang et al. |
| 2020/0059290 A1* | 2/2020 | Pan ...................... H04B 7/0874 |
| 2021/0282168 A1 | 9/2021 | Matsumura et al. |

FOREIGN PATENT DOCUMENTS

| CN | 100365949 C | 1/2008 | |
| WO | WO-2018085144 A1 * | 5/2018 | ............ H04W 24/08 |
| WO | 2020012619 A1 | 1/2020 | |

OTHER PUBLICATIONS

3GPP TS 38.304 V16.0.0, "User Equipment (UE) procedures in Idle mode and RRC Inactive state", 3rd Generation Partnership Project (3GPP), (Release 16), Valbonne, France, Mar. 2020, 38 pages.

(Continued)

*Primary Examiner* — Helene E Tayong
(74) *Attorney, Agent, or Firm* — Flaster Greenberg P.C.

(57) ABSTRACT

An Evanescent Cell (EC) refers to a WTRU-centric cell exploiting highly directional transmissions. An EC may comprise one or more beams from one or more BSs/gNBs/TRPs that may be operated by the same or different operators. An EC may be created utilizing knowledge of radio planning having detected the presence of one or more WTRU. A Beam-Group (BG) refers to a group of beams associated with an EC. All beams associated with an EC may (Continued)

be categorized into multiple BGs. Each BG may be made up of one or more beams from multiple BSs/gNBs/TRPs. Multiple BGs within an EC may be enabled to ease the burden of cell management. In one or more embodiments, there may be systems, procedures, and/or devices for EC/BG detection, deactivation, activation, selection, reselection, and augmentation. Further, there may be one or more embodiments for hierarchical system information acquisition as they relate to ECs/BGs.

20 Claims, 24 Drawing Sheets

(58) Field of Classification Search
USPC .......................................................... 375/262
See application file for complete search history.

(56) References Cited

OTHER PUBLICATIONS

3GPP TS 38.331 V16.0.0 , "Radio Resource Control (RRC) protocol specification", 3rd Generation Partnership Project (3GPP) (Release 16), Valbonne, France, Mar. 2020, 835 pages.
R2-163443 , "On beam sweeping and its implications", 3GPP TSG-RAN WG2 Meeting 94, Nanjing, China, May 2016, 4 pages.

* cited by examiner

Link-Budget Analysis Num of Beam (N), Num Antenna Elements (M)

|  | 28GHz | 60GHz | 114GHz | 140GHz |
|---|---|---|---|---|
| Range = 10m | N = 9<br>M = 5 | N = 25<br>M = 12 | N = 81<br>M = 32 | N = 100<br>M = 36 |
| Range = 50m | N = 49<br>M = 20 | N = 144<br>M = 49 | N = 324<br>M = 132 | N = 400<br>M = 144 |

Steerable Range:+/-45deg in Elevation and Azimuth,
min SNR = 18dB for 16QAM

FIG. 3

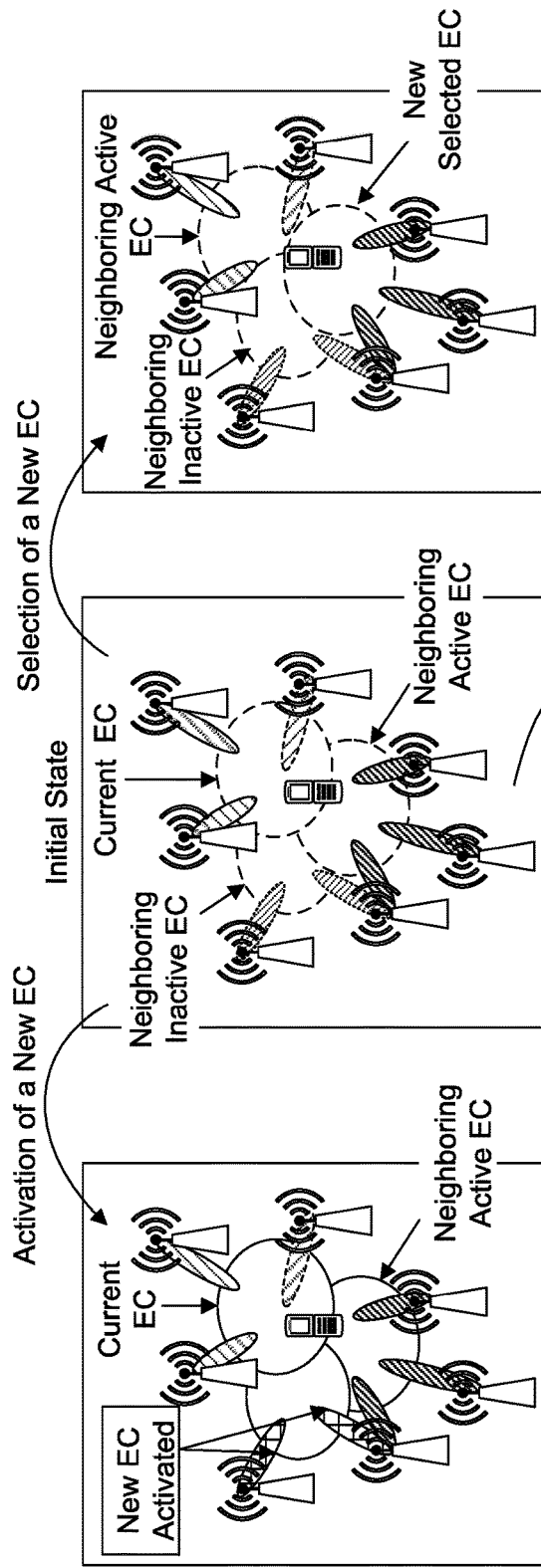
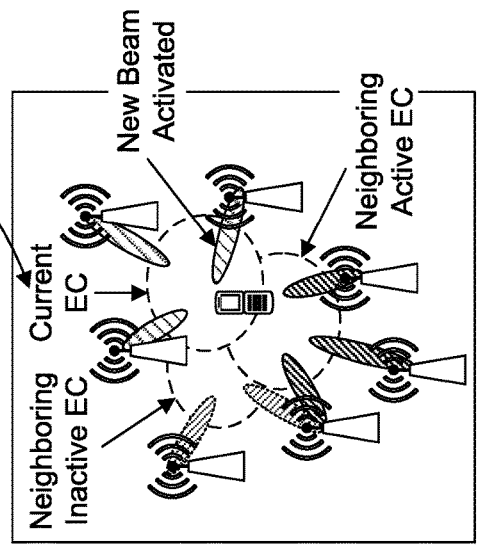
FIG. 15A, FIG. 15B, FIG. 15C, FIG. 15D

IDLE/INACTIVE MODE OPERATIONS IN HIGHLY DIRECTIONAL UE-CENTRIC SYSTEMS

CROSS-REFERENCE TO RELATED APPLICATIONS

This application is the 371 National Stage of International Application No. PCT/US2021/063830, filed Dec. 16, 2021, which claims the benefit of U.S. Provisional Application No. 63/126,272, filed Dec. 16, 2020, and U.S. Provisional Application No. 63/145,823, filed Feb. 4, 2021, the entire contents of which are incorporated herein by reference.

BACKGROUND

Generally, in the field of wireless communications, different frequency bands may be used to enable communication between one or more wireless devices. In some frequency bands, such as sub-THz bands, the number of beams may be almost "laser-like" which may present challenges to accommodate efficient wireless communication in these frequency bands. There is a need to address these challenges in order to prevent possible issues, such as unnecessary signaling overhead.

SUMMARY

An Evanescent Cell (EC) refers to a WTRU-centric cell exploiting highly directional transmissions. An EC may comprise one or more beams from one or more BSs/gNBs/TRPs that may be operated by the same or different operators. An EC may be created utilizing knowledge of radio planning having detected the presence of one or more WTRU. A Beam-Group (BG) refers to a group of beams associated with an EC. All beams associated with an EC may be categorized into multiple BGs. Each BG may be made up of one or more beams from multiple BSs/gNBs/TRPs. Multiple BGs within an EC may be enabled to ease the burden of cell management. In one or more embodiments, there may be systems, procedures, and/or devices for EC/BG detection, deactivation, activation, selection, reselection, and augmentation. Further, there may be one or more embodiments for hierarchical system information acquisition as they relate to ECs/BGs.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 3 illustrates an example of link budget analysis showing a number of beams and a number of antenna elements required at different carrier frequencies;

FIGS. 15A, 15B, 15C, and 15D all illustrate an example of EC augmentation versus new EC selection versus new EC activation;

DETAILED DESCRIPTION

Figure 1A:
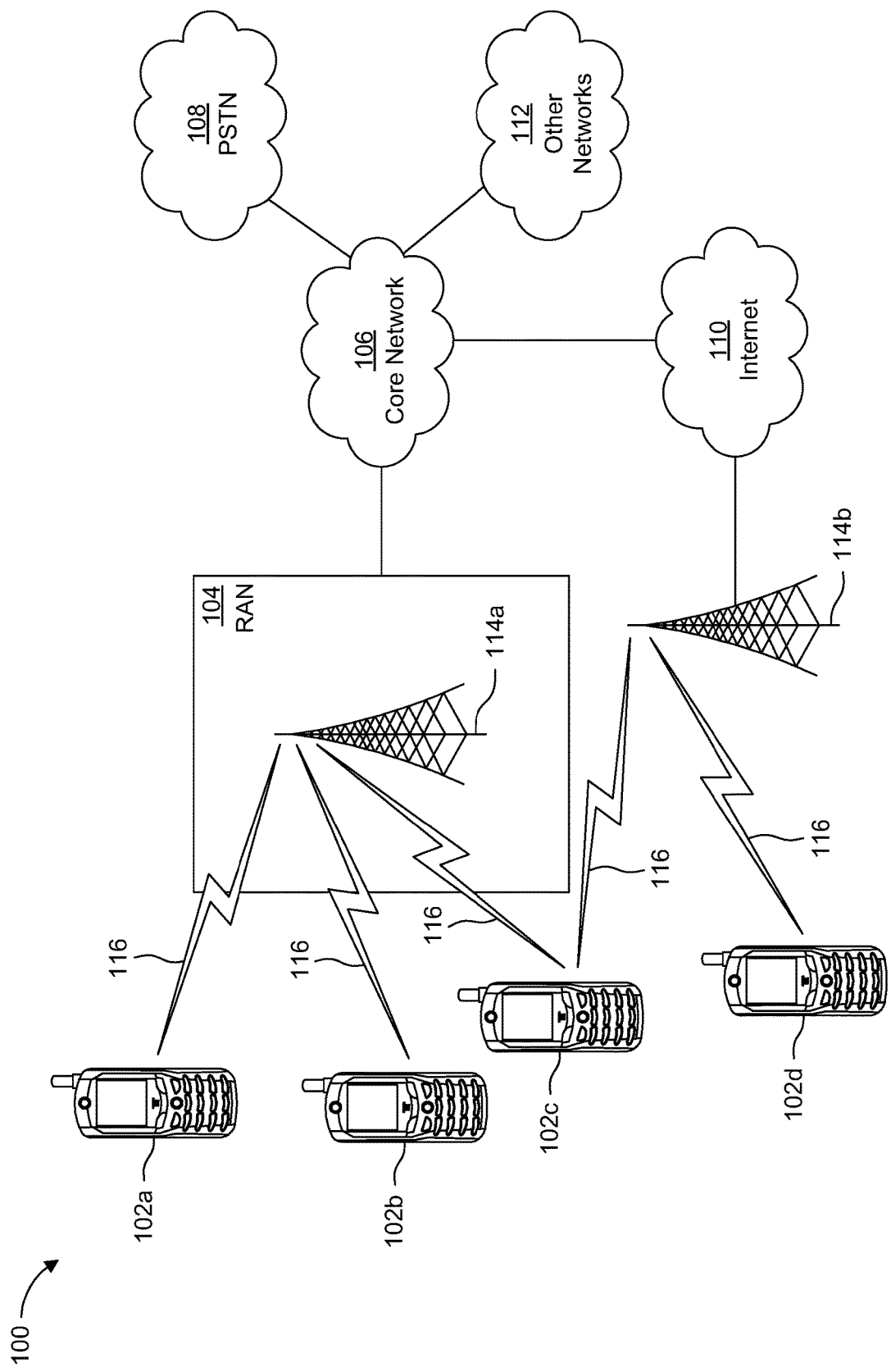
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations (BSs) 114a, 114b may be, and interchangeable with, a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, a transmission receive point (TRP), and/or the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a g NB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (Wi MAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
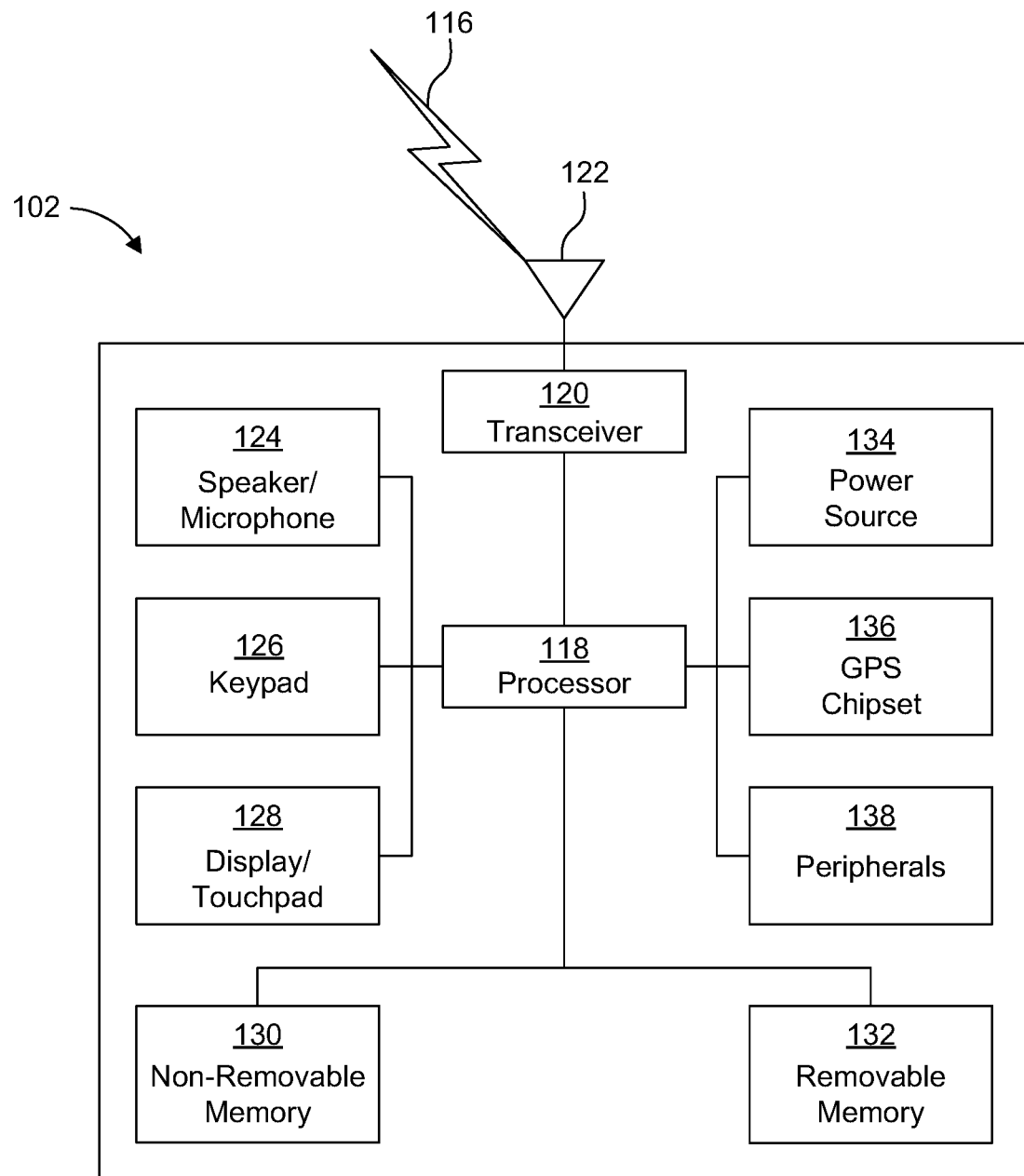
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
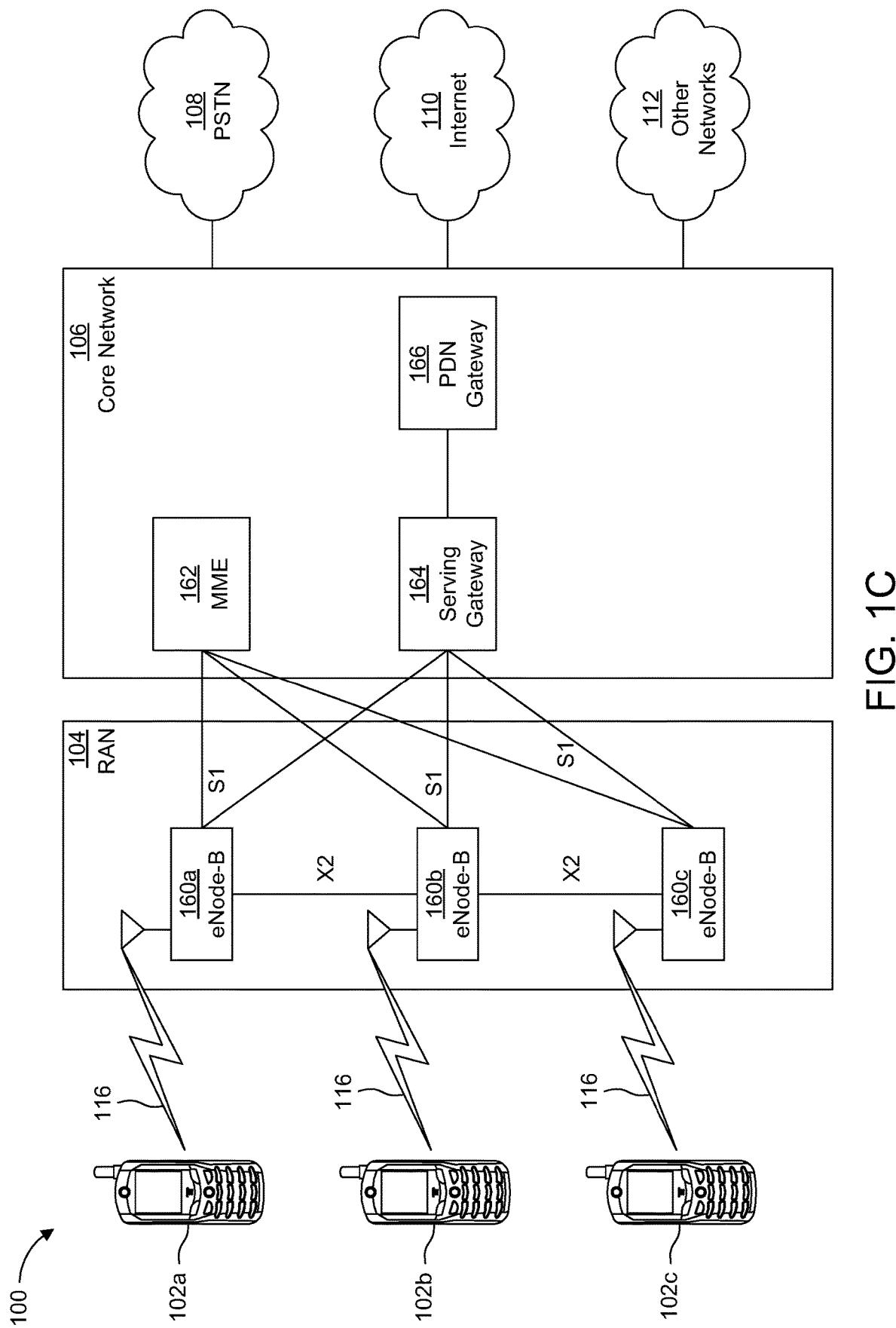
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
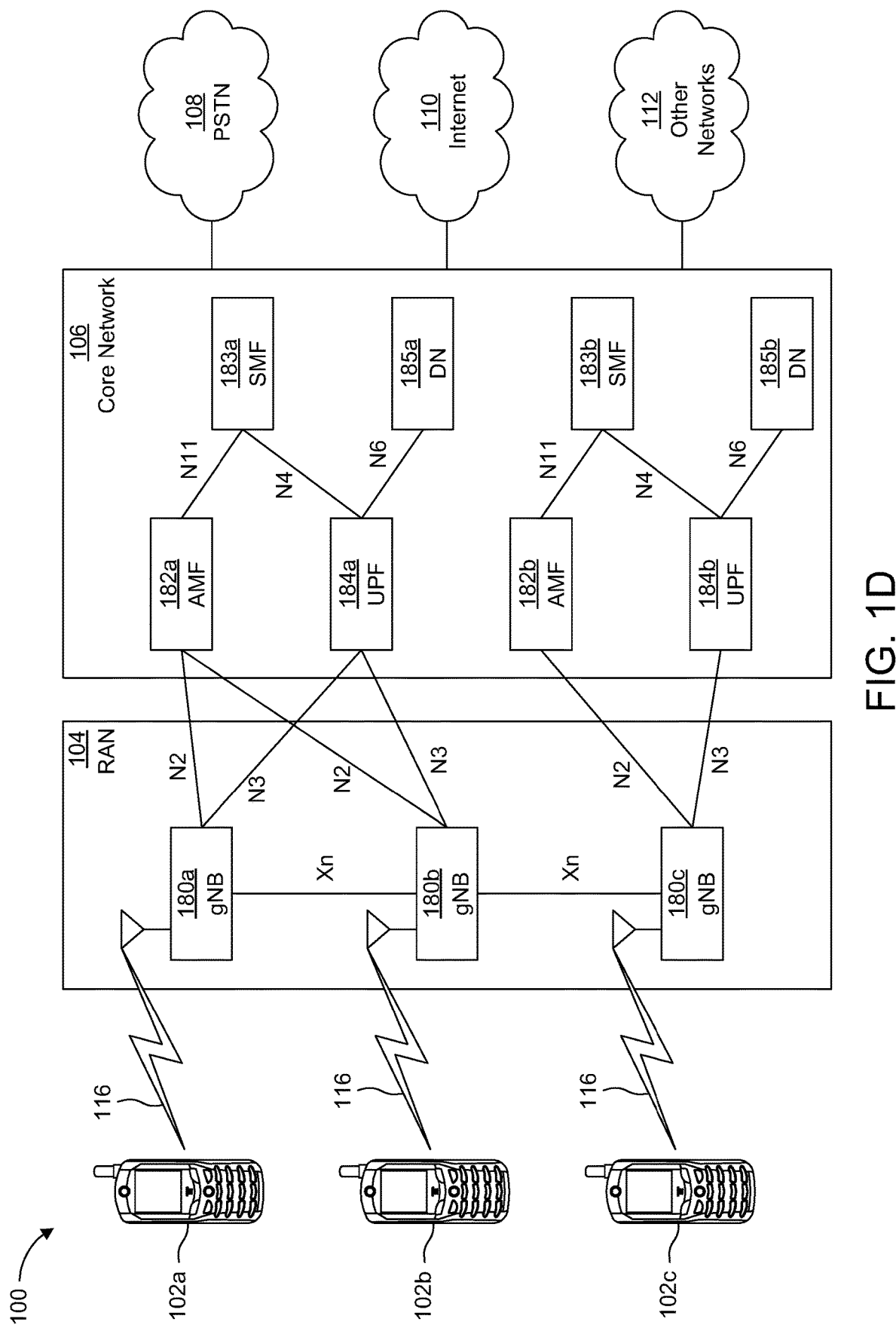
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Generally, a WTRU may operate in different modes or states, which in turn may effect different operations that the WTRU carries out. As discussed herein, mode and state may be used interchangeably. In some cases, the state may be dependent on the traffic activity of the WTRU. For example, Radio Resource Control (RRC) IDLE and INACTIVE state operations may include PLMN selection, cell selection, cell reselection, and location registration (e.g., for IDLE mode only), and RNA update (e.g., for Inactive mode only). As discussed herein, a WTRU in IDLE mode may refer to a WTRU in an RRC IDLE state. An INACTIVE mode WTRU may refer to a WTRU in RRC INACTIVE state.

When a WTRU is switched on, it operates in RRC IDLE state and a PLMN may be selected by the WTRU. A list of PLNMs in priority order may be maintained at the WTRU. The selection of PLMN may be based on the priority order. For the selected PLMN, associated radio access technologies (RAT(s)) may be set or configured. With cell selection, the WTRU may search for a suitable cell of the selected PLMN, may choose that cell to provide available services, and/or may monitor its control channel. This procedure may be referred to as "camping on the cell". The WTRU may register its presence by means of a NAS registration procedure in the tracking area of the chosen cell.

When operating in an RRC IDLE/INACTIVE state, the WTRU may perform received signal strength measurements on serving and/or neighbor cells. Serving cell may refer to the cell over which the WTRU is camped-on. If the WTRU finds a more suitable cell according to the cell reselection criteria, it may perform a reselection process, and move on to that cell and camp on it. If this new cell does not belong to at least one tracking area to which the WTRU is registered, location registration may be performed. When operating in an RRC INACTIVE state, if the new cell does not belong to the configured RAN based notification area (RNA), an RNA update procedure may be performed. The WTRU may also search for higher priority PLMNs at regular time intervals and/or search for a suitable cell if another PLMN has been selected by its NAS.

If the WTRU loses coverage of the registered PLMN, either a new PLMN may be selected automatically or an indication of available PLMNs may be given to the user so that a manual selection can be performed. Various means of control may exist for the network to prioritize cell (re) selection using certain RATs, to control the rate at which low, medium, or high mobility WTRUs perform cell re-selection and to bar selected tracking areas from re-selection by WTRUs.

When the WTRU camps on a cell in RRC_IDLE or in RRC_INACTIVE state, it may receive system information from the PLMN, it may establish an RRC connection or resume a suspended RRC connection, and it may receive ETWS or CMAS notifications. Moreover, if the network needs to send a control message or deliver data to a registered WTRU, it may know in some (e.g., most) cases the set of tracking areas in which the WTRU is camped. A paging message may then be sent for the WTRU on the control channels of all the cells in the corresponding set of areas. The WTRU may then receive the paging message and may respond.

In NR, a cell may transmit synchronization signals (SS) (e.g., PSS, SSS) for a WTRU to acquire time and frequency synchronization with the cell. A cell may also transmit minimum system information (e.g., MIB) using PBCH for a WTRU to acquire the minimum information required to camp on the cell. The synchronization signals and PBCH may be transmitted simultaneously. The combination of synchronization signals and PBCH block is called an SS block (SSB). Each SSB may occupy 4 OFDM symbols in the time domain and spread over 240 subcarriers in the frequency domain. The PSS may occupy a first OFDM symbol and span over 127 subcarriers. A SSS may be located in the third OFDM symbol and span over 127 subcarriers. There may be 8 un-used subcarriers below SSS and 9 un-used subcarriers above SSS. The PBCH may occupy two full OFDM symbols (e.g., second and fourth) spanning 240 subcarriers and in the third OFDM symbol spanning 48 subcarriers below and above a SSS. This may result in the PBCH occupying 576 subcarriers across three OFDM symbols.

An SSB may be periodically transmitted with a periodicity of 5 ms, 10 ms, 20 ms, 40 ms, 80 ms or 160 ms. A WTRU may assume a default periodicity of 20 ms during initial cell search or idle mode mobility. To enable beam-sweeping for PSS/SSS and PBCH, SS burst sets may be defined (e.g., configured). An SS burst set may be comprised of a set of SSBs, where each SSB may potentially be transmitted on a different beam. An SS burst set may comprise of one or more SSBs. SSBs in the SS burst set may be transmitted in time-division multiplexing fashion. An SS burst set may (e.g., always) be confined to a 5 ms window and may be either located in the first-half or in the second-half of a 10 ms radio frame. The maximum number of candidate SSBs (Lmax) within an SS burst set may depend upon the carrier frequency. For example, for carrier frequency up to 3 GHz, Lmax=4, for carrier frequency above 3 GHz and up to 6 GHz, Lmax=8, and for carrier frequency above 6 GHz, Lmax=64. Within a 5 ms half frame, the starting OFDM symbol index for a candidate SSB within SS burst set may depend upon SCS and carrier frequency. For example, for carrier frequency above 6 GHz, SCS=120 KHz, the indexes of the first symbols of the maximum 64 candidate SS/PBCH blocks are derived by {4, 8, 16, 20}+ 28n, where n=0, 1, 2, 3, 5, 6, 7, 8, 10, 11, 12, 13, 15, 16, 17, 18.

For PLMN selection in NR, a WTRU may scan all RF channels in the NR bands according to its capabilities to find available PLMNs. On each carrier, the WTRU may search for the strongest cell and read its system information, to find out which PLMN(s) the cell belongs to. If the WTRU can read one or several PLMN identities in the strongest cell, each found PLMN may be reported from the AS layer to the NAS layer. The search for PLMNs may be stopped on request from the NAS layer to the AS layer. Once the WTRU has selected a PLMN (e.g., for the purposes of finding a valid cell/operator), the cell selection procedure may be initiated to select a suitable cell of that PLMN to camp on. For purposes of the aforementioned process, the NAS layer may sit in top of the control stack, which may be responsible for PLMN selection.

For cell selection in NR, there may be initial cell selection and/or cell selection using stored information.

Initial cell selection may occur when no prior knowledge of which RF channels of NR frequencies are known at the WTRU. The WTRU may scan all RF channels in the NR bands according to its capabilities. On each frequency, the WTRU may only search for the strongest cell. Once a suitable cell is found, the WTRU may select that cell. A suitable cell may be a cell for which the PLMN is valid, cell is not barred, cell is not part of the forbidden TA, and/or the cell selection criteria (e.g., described further herein) is fulfilled.

Cell selection using stored information may require stored information of frequencies and/or information on cell parameters from previous measurements/cells (e.g., if available). This may be valid when a WTRU transitions from operating in RRC IDLE/INACTIVE state from the RRC CONNECTED state. Once a suitable cell is found, the WTRU may select that cell. If no suitable cell is found with this procedure, the WTRU may perform initial cell selection.

The cell selection criteria may be fulfilled when: Srxlev (Rx level value)>0 dB and Squal (quality value)>0 dB, where:

$$Srxlev = Q_{rxlevmeas} - (Q_{rxlevmin} + Q_{rxlevminoffset})$$
$$- P_{compensation} - Q_{offsettemp}$$

$$Squal = Q_{qualmeas} - (Q_{qualmin} - Q_{qualminoffset}) - Q_{OffSettemp} \quad \text{Eq. 1}$$

Where the terms of Eq. 1 may be defined in Table 1.

TABLE 1

| | |
|---|---|
| $Q_{offset_{temp}}$ | Offset temporarily applied to a cell as specified in [3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB). |
| $Q_{rxlevminoffset}$ | Offset to the signalled $Q_{rxlevmin}$ |
| $Q_{qualminoffset}$ | Offset to the signalled $Q_{qualmin}$ |
| $P_{compensation}$ | For FR1, if the WTRU supports the additional Pmax in the NR-NS-PmaxList (see [1] for further details). For FR2, $P_{compensation}$ is set to 0. |

$Q_{rxlevminoffset}$ and $Q_{qualminoffset}$ may only be applied when a cell is evaluated for cell selection as a result of a periodic search for a higher priority PLMN while camped normally in a visited PLMN.

For cell selection in multi-beam operations, measurement quantity of a cell may be up to WTRU implementation.

When the WTRU camps-on a suitable cell, the WTRU may monitor for a paging channel transmission, Short messages, and/or relevant system information (SI). Further, the WTRU may perform measurements and other procedures related to cell reselection.

The NAS layer (e.g., of the WTRU) may control the RAT(s) in which the cell selection should be performed, for instance by indicating RAT(s) associated with the selected PLMN, and by maintaining a list of forbidden registration area(s) and a list of equivalent PLMNs. This information may be (pre)configured to the WTRU.

If the cell selection process fails to find a suitable cell after a complete scan of all RATs and all frequency bands supported by the WTRU, the WTRU may attempt to find an acceptable cell of any PLMN to camp on (e.g., referred to as any cell selection state), trying all RATs that are supported by the WTRU and searching first for a cell where the signal strength meets a threshold (e.g., high-quality cell such as RSRP>−110 dBm). An acceptable cell may be a cell that is not barred and for which the cell selection criteria is fulfilled. The WTRU may obtain only limited services (e.g., originate emergency calls and receive ETWS and CMAS notifications) after camping-on an acceptable cell. The WTRU returning to RRC IDLE state after the WTRU has moved to RRC CONNECTED state from camped on any cell state, may attempt to camp on an acceptable cell (e.g., may use the assisting information in RRC Release message if provided).

When the WTRU camps-on an acceptable cell, the WTRU may monitor for Short messages and relevant SI, may perform measurements, and other procedures related to cell reselection, and may regularly attempt to find a suitable cell (e.g., if a suitable cell is found, the WTRU may camp-on the suitable cell). This process of camping on a cell and evaluating other cells to camp on relative to the current cell being camped on may be repeated as necessary.

For cell reselection in NR, when camped on a cell, the WTRU may regularly search for a better cell according to the cell reselection criteria. If a better cell is found that cell may be selected. In some cases, the change of a cell may imply a change of RAT. Absolute priorities of different NR frequencies or inter-RAT frequencies may be provided to the WTRU (e.g., via SI and/or dedicated RRC signaling).

The WTRU may perform intra-frequency measurements when the current cell (e.g., serving cell on which the WTRU is camped-on) fulfils $Srxlev <= S_{IntrasearchP}$ and $Squal <= S_{IntrasearchQ}$. For a NR inter-frequency or inter-RAT frequency with a reselection priority higher than the reselection priority of the current NR frequency, the WTRU may perform measurements. For a NR inter-frequency or inter-RAT frequency with an equal or lower reselection priority than the reselection priority of the current NR frequency, the WTRU may perform measurements if the current cell fulfils $Srxlev <= S_{nonIntraSearchP}$ and $Squal <= S_{nonIntraSearchQ}$.

In a situation regarding moving to a higher priority NR frequency/RAT cell: If more than 1 second has elapsed since the WTRU camped on the current cell, the WTRU may perform cell reselection to a cell on a higher priority frequency or inter-RAT frequency fulfilling $Squal > Thresh_{X, HighQ}$ (e.g., when $Thresh_{X, HighQ}$ is configured) or $Srxlev > Thresh_{X, HighP}$ (e.g., when $Thresh_{X, HighQ}$ is not configured) during a time interval $Treselection_{NR}$. If multiple cells meet the criteria, the WTRU may reselect the highest ranked cell among the cells on the highest priority frequencies.

In a situation regarding moving to a lower priority NR frequency/RAT cell: If more than 1 second has elapsed since the WTRU camped on the current cell, and the current cell fulfills $Squal < Thresh_{Serving, LowQ}$ (e.g., when $Thresh_{Serving, LowQ}$ is configured to the WTRU) or $Srxlev < Thresh_{Serving, LowP}$ (e.g., when $Thresh_{Serving, LowQ}$ is not configured to the WTRU), the WTRU may perform cell reselection to a cell on a lower priority frequency or inter-RAT frequency fulfilling $Squal > Thresh_{X,LowQ}$ (e.g., when $Thresh_{Serving, LowQ}$ is configured to the WTRU) or $Srxlev > Thresh_{X, LowP}$ (e.g., when $Thresh_{Serving, LowQ}$ is not configured) during a time interval $Treselection_{NR}$.

In some cases, cell reselection to a higher priority RAT/frequency may take precedence over a lower priority RAT/frequency if multiple cells of different priorities fulfil the cell reselection criteria.

In a situation regarding intra-frequency and equal inter-frequency cell reselection: The WTRU may perform ranking of all cells fulfilling the cell selection criteria. The rank of the serving cell may be given by $R_s = Q_{meas,s} + Q_{hyst} - Q_{offsettemp}$, and the rank of a neighboring cell may be given by $R_n = Q_{meas,n} - Qoffset - Qoffset_{temp}$, where is $Q_{meas}$ the RSRP measurement, Qoffset includes the offset between two cells, if any, and frequency specific offset for equal priority NR frequencies, $Qoffset_{temp}$ is temporary offset applied to a cell, $Q_{hyst}$ specifies the hysteresis value for ranking criteria.

In case of multi-beam operations, the measurement quantity (e.g., the RSRP/RSRQ value for cell selection, such as Q_rxlevmeas or/and Q_qualmeas of Equation 1) of a cell may be derived based on the highest beam measurement quantity if parameters nrofSS-BlocksToAverage and absThreshSS-BlocksConsolidation are not configured, otherwise as the linear average of the power values of up to nrofSS-BlocksToAverage of highest beam measurement quantity values above absThreshSS-BlocksConsolidation.

If rangeToBestCell is configured, then the WTRU may perform cell reselection to the cell with the highest number of beams above the threshold (e.g., absThreshSS-Blocks-Consolidation) among the cells whose R value is within rangeToBestCell of the R value of the highest ranked cell. If there are multiple such cells, the WTRU may perform cell reselection to the highest ranked cell among them.

In any case, the WTRU may reselect a new cell if the WTRU has elapsed more than some time threshold (e.g., 1 second) on the current serving cell and the new cell is better than the serving cell according to the cell reselection criteria during a time interval $Treselection_{NR}$.

The ranking criteria for cell (re)selection may take the WTRU's mobility into account; there may be a one or more different mobility states/types. The WTRU may be in normal-mobility state if number of cell reselections during $T_{Crmax}$ is less than $N_{CR\_M}$. The WTRU may be in medium-mobility state if number of cell reselections during $T_{Crmax}$ is greater than or equal to $N_{CR\_M}$ but less than or equal to $N_{CR\_H}$. The WTRU may be in high-mobility state if number of cell reselections during $T_{Crmax}$ is greater than $N_{CR\_H}$. Consecutive reselections where a cell is reselected again right after one reselection may not be taken into account for mobility state detection criteria. If the criteria for either medium or high mobility state is not detected during time period $T_{CrmaxHyst}$, the WTRU may be considered in normal-mobility state. If the high- or medium-mobility state is detected, a scaling factor may be configured to the WTRU to be used for cell reselection measurements, one scaling factor (e.g., sf-High for high-mobility state/sf-medium for medium-mobility state) which may be added to $Q_{hyst}$, as well as another scaling factor (e.g., different for high- and medium-mobility states) may be configured to the WTRU which may be multiplied to $Treselection_{NR}$.

There may also be scenarios where there are mechanisms to relax the measurements (e.g., for low mobility WTRUs which are not at the cell edge).

Cell reselection parameters (e.g., timer values, measurement thresholds, offset, etc.), as discussed herein, may be broadcast in system information.

For system information (SI) acquisition in NR, SI may be transmitted in the form of master information block (MIB) and a number of system information blocks (SIBs). The MIB may carry the most essential system information, such as SFN, SCS, cell barred information, etc. MIB may also carry the parameters that are required to decode the SIB1. The MIB may be transmitted over a broadcast channel with a fixed periodicity. The SIB1 may be transmitted periodically over a downlink shared channel. After the acquisition of the MIB, the WTRU may acquire the SIB1. The SIB1 may carry the information of cell selection parameters, information of the random-access channel resources, cell specific common DL, and/or UL configurations, etc. The SIB1 may also carry the information regarding the availability of other SIBs. The SIB1 may also indicate whether other SIBs are provided via periodic broadcast basis or only on-demand basis. In case of periodic broadcast basis, SIB1 may include the scheduling information (e.g., periodicity, window size) of other SIBs. In case of on-demand basis, the SIB1 may include the information of UL resources and sequences that can be used to request other SIBs. SIB2, SIB3, SIB4, and SIB5 may carry cell re-selection related information. SIB6, SIB7, and SIB8 may carry ETWS and CMAS related system information. SIB9 may carry GPS time and UTC related information. SIB10 may carry human-related network names of the non-public networks listed in SIB1. SIB11 may carry information related to IDLE/INACTIVE measurements. SIB12 may carry NR sidelink communication configuration. SIB13 and SIB14 may carry V2X communication related information.

Figure 2:
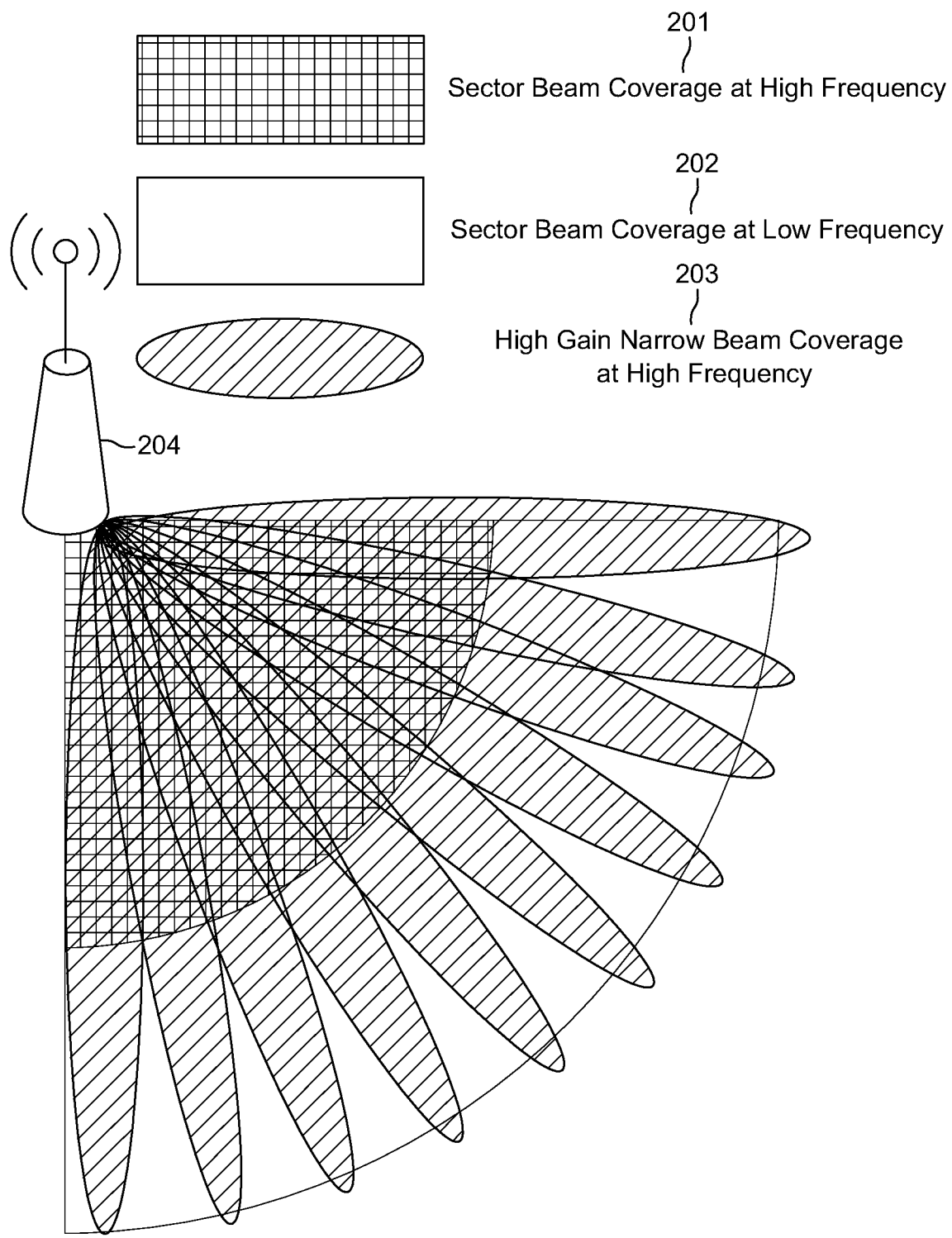
FIG. 2 illustrates an example of cell coverage with different beam gains.

FIG. 2 illustrates an example of cell coverage with different beam gains. For highly directional (e.g., beamformed) systems, propagation at higher frequency bands may be a more challenging issue than for lower frequency bands. In some cases, high propagation loss at higher frequencies may necessitate the use of high antenna-gain with narrow beam based directional (e.g., beamformed) transmissions. To increase the antenna-gain over a wide sector beam, larger antenna arrays (e.g., number of antenna elements ranging from tens to hundreds) may be used to form high gain beams. An example of effect on coverage and the compensation of path loss by using narrow beams at higher frequency is shown in the illustration of FIG. 2. As shown, 201 shows sector beam coverage at high frequencies; 202 shows sector beam coverage at low frequencies; and 203 shows high gain narrow beam coverage at high frequencies. At 204, there is the transmission point (e.g., base station or WTRU) that is transmitting the signals that illustrates the different types of coverage.

In a directional system, since the spatial coverage for each Tx beam is limited, multiple beams would be needed for transmitting DL common channels (e.g., system information, paging, etc.) to cover the entire cell area (e.g., multiple 203 beams of high gain narrow beam coverage at high frequency would be needed to have the same coverage of the 202 sector beam coverage at low frequency). The number of concurrent high gain beams that a gNB can support may be limited by the cost and complexity of the utilized transceiver architecture.

As the carrier frequency increases, the number of beams required to cover the entire cell increases due to the higher beamforming gain required to overcome propagation loss limitations. FIG. 3 illustrates an example of a link budget analysis performed to estimate the number of beams required to cover a sector of +/−45 degree for multiple coverage ranges at different millimeter wave carrier frequencies. As the carrier frequency increases, the number of required beams required to cover the sector increases significantly. As can be seen, as the frequency increases, the number of beams and antennas needed to cover a given range increases (e.g., 28 GHz requires 10 beams and 5 antenna elements to cover a range of 10 m, whereas 140 GHz requires 100 beams and 36 antenna elements to cover the same range of 10 m).

In higher frequency bands (e.g., sub-THz bands), the number of beams (e.g., where the beams are almost "laser-like" beams) used by a base station (e.g., gNB) to cover its coverage area is expected to be much higher than the NR system operating at mmWave frequencies (e.g., below 71 GHz bands). Coverage range may be expected to be shorter at higher frequency bands due to the limit on antenna array size can used at a device to achieve significant antenna gain for higher coverage range. Therefore, such systems may be expected to be deployed very densely to combat pathloss impacts. Common control information such as synchronization signals, system information (e.g., master information block), paging information, and the like, may be transmitted using beam-sweeping to cover the cell coverage area. In such a deployment scenario, always-on signaling (e.g., periodic transmission of synchronization signals, system information, etc.) even though there may be no terminal unit(s) present may cause significant network overhead in terms of energy and resource inefficiency.

Further, directional transmissions may be susceptible to blockages and orientation of the device/user, which becomes more prominent when the beam-widths becomes narrower in higher frequency bands. Small movements or variations in the orientation of a WTRU may cause frequent link failures (e.g., quality of the link below minimum required threshold) with the current cell, which in case of a WTRU in IDLE/INACTIVE mode may trigger frequent cell reselections, and even may cause ping-pong effect (e.g., where a device goes back and forth between two cell because the destination cell always appears superior from the vantage point of the origin cell).

One or more embodiments, techniques, and/or examples disclosed herein may address the above described issues, as well as other related issues, and generally advance the state of the art.

Figure 4:
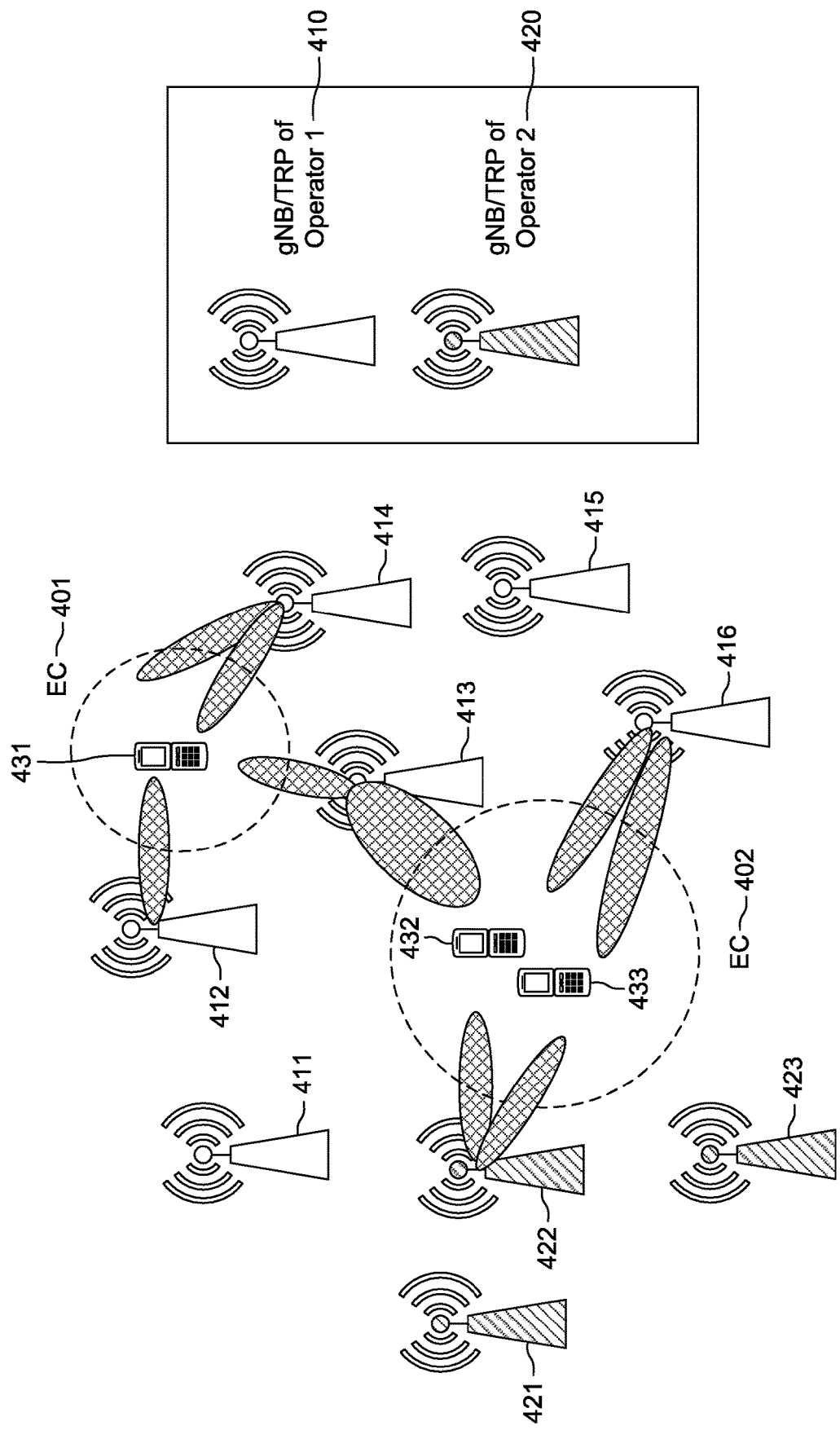
FIG. 4 illustrates an example of evanescent cells.

FIG. 4 illustrates an example of an Evanescent Cell(s) (EC). An EC generally refers to a WTRU-centric cell exploiting highly directional transmissions. For illustrative purposes, the term EC may be used predominantly herein, however, EC may be interchangeable with cell, flexible cell, virtual cell, advanced cell, directional cell, and/or other variations disclosed herein, where the name EC is not intended to have a limiting effect unless otherwise described. An EC may be made up of one or more beams from one or more base stations and/or transmission/receive points that may be operated by the same or different operators. An EC may be created utilizing knowledge of radio planning having detected the presence of one or more WTRUs. An EC may be associated with a group of WTRUs, (e.g., ECs may or may not be WTRU specific). In an EC, the term 'evanescent' may reference covering the Degrees of Freedom (DoF) associated with a number of beams, beam characteristics (e.g., antenna again, beam width, etc.), Tx power, Radio Resource usage, and/or the like. ECs may be formed and utilized for IDLE, INACTIVE and CONNECTED mode operations (e.g., of the WTRU). A WTRU-centric EC(s) may be expected to be beneficial to (e.g., greatly) reduce the network and WTRU overhead, as well as to increase reliability (e.g., robustness against ping-pong effect) at least for IDLE/INACTIVE operations. Details/solutions on how to create (e.g., activate, switch on, etc.), perform IDLE/INACTIVE operations with ECs including EC selection/reselection, augmentation, SI acquisition are further disclosed herein.

In the example of FIG. 4, 410 illustrates a first operator and 420 illustrates a second operator (e.g., operator of BS/gNB/TRP/etc.) 410 first operator may include base stations 411-416. 420 second operator may include base stations 421-423. In this example, EC 401 may be created from only one operator (e.g., 410 first operator using base stations 412, 413, and 414). EC 401 may serve WTRU 431. EC 402 may be created from two operators (e.g., 410 first operator using base stations 413 and 416, and 430 second operator using base stations 422). EC 402 may serve WTRU 432 and WTRU 433.

Figure 5:
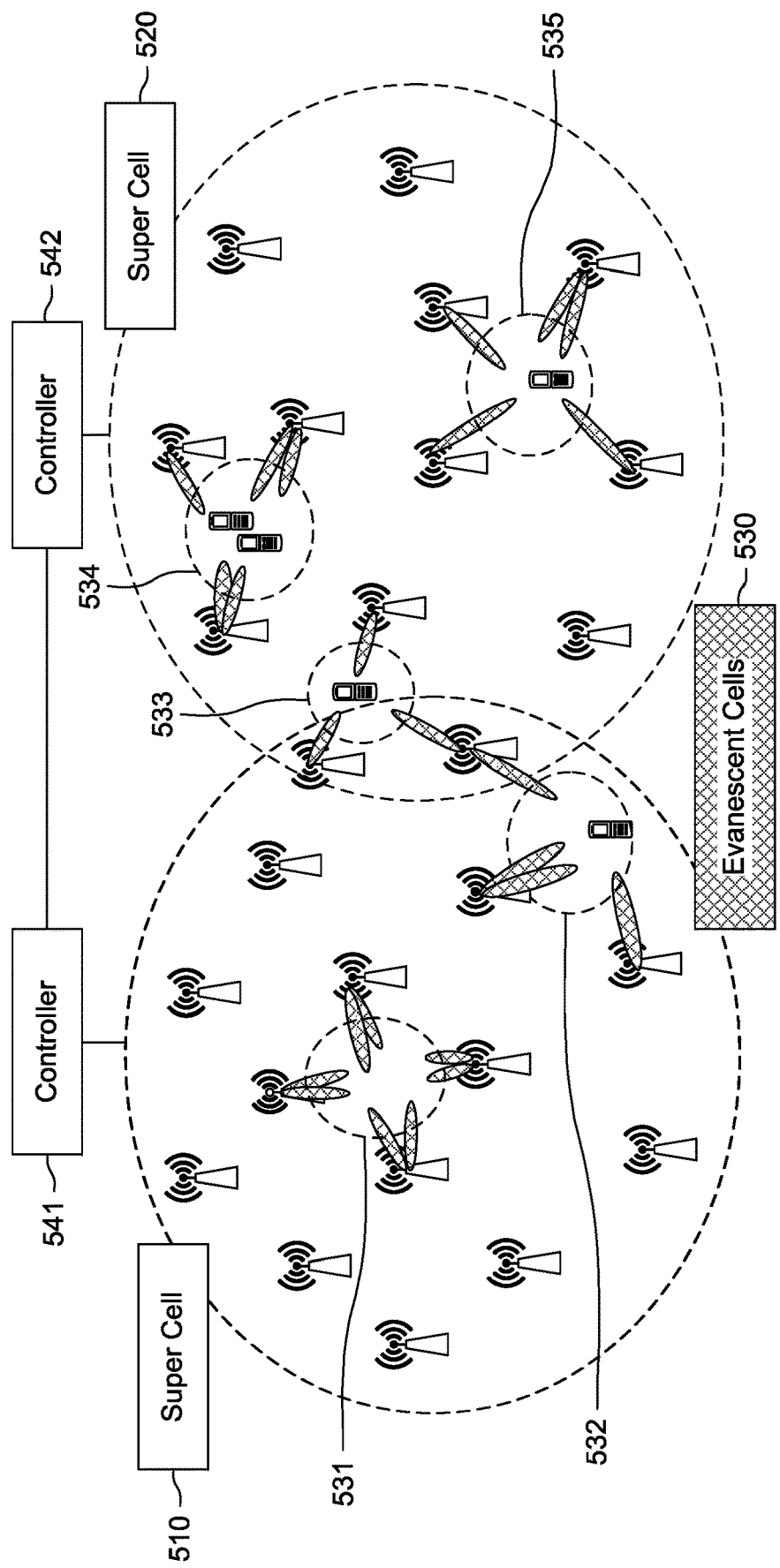
FIG. 5 illustrates an example of super cells.

FIG. 5 illustrates an example of a Super Cell(s) (SC). An SC refers to a cell comprising of one or more BSs (e.g., gNBs, TRPs, etc.). A SC may comprise of one or more ECs. A SC (e.g., coverage/boundary of a SC) may be created depending on the long-term statistics, such as, load/traffic distribution, density of the WTRUs, and the like in a given area. SCs may be formed and utilized for IDLE, INACTIVE and CONNECTED mode operations. In the example of FIG. 5, there may be SC 510 and super 520, where there may be overlap between the two SCs. In some cases, there may be one or more controllers to manage the SC; In one case, each SC may have a controller 541 and 542. The base stations within each SC may create localized ECs (e.g., EC 531 in SC 501, or EC 533 with base stations in both SC 510 and SC 520). While the ECs may be illustrated with a circle, they are created using the highly directional beams, such as the ones shown with the evanescent cells 530. For purposes of all figures discussed herein, a circle in a figure described as an EC is for illustrative purposes only since the cell is created through the use of a directional beam, and therefore the actual area would be determined based on the limitations of the range of those directional beams.

Figure 6:
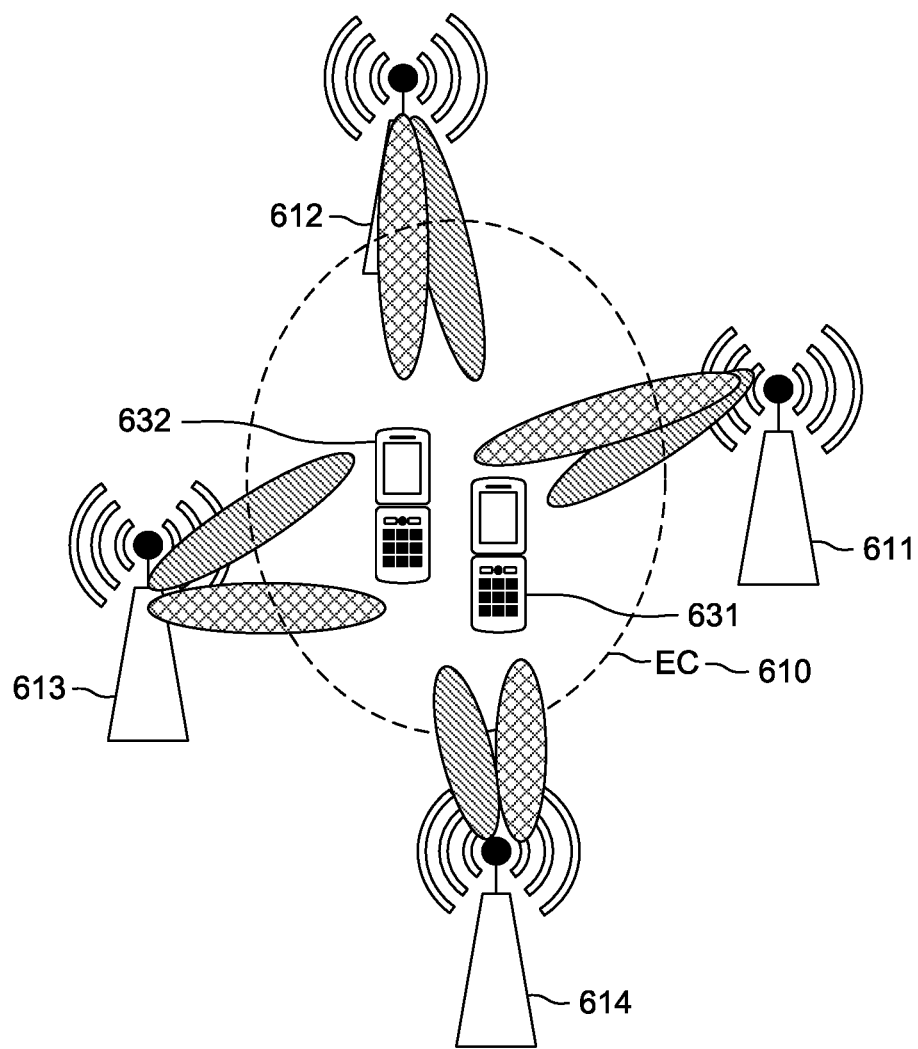
FIG. 6 illustrates an example of beam groups.

FIG. 6 illustrates an example of a Beam Group (BG). A BG as discussed herein may refer to a group of beams associated with an EC (e.g., the beams that would comprise the EC and/or create the EC). One or more beams associated with a specific EC may be organized into one or more groups (e.g., an EC may have more than one BG). Group as used herein may comprise one or more of a given item and may be interchangeable with set; Set as used herein may comprise one or more of a given item and may be interchangeable with group. Each BG may be made up of one or more beams from one or more base stations or the like. In FIG. 6, an EC 610 has two BGs, BG 601 and BG 602, where each BG comprises beams transmitted from multiple base stations 611, 612, 613, and 614. EC 610 may be created using base stations 611-614, or said another way created from BG 601 and BG 602, and serve WTRU 631 and WTRU 632. Multiple BGs within an EC may ease the burden of cell management. Any discussion herein regarding an EC may also apply to a BG since an EC will always have at least one set of beams, and in some cases may have more than one set (e.g., multiple BGs); accordingly, any reference to EC may be interchangeable with BG, and vice versa, unless otherwise noted.

Figure 7:
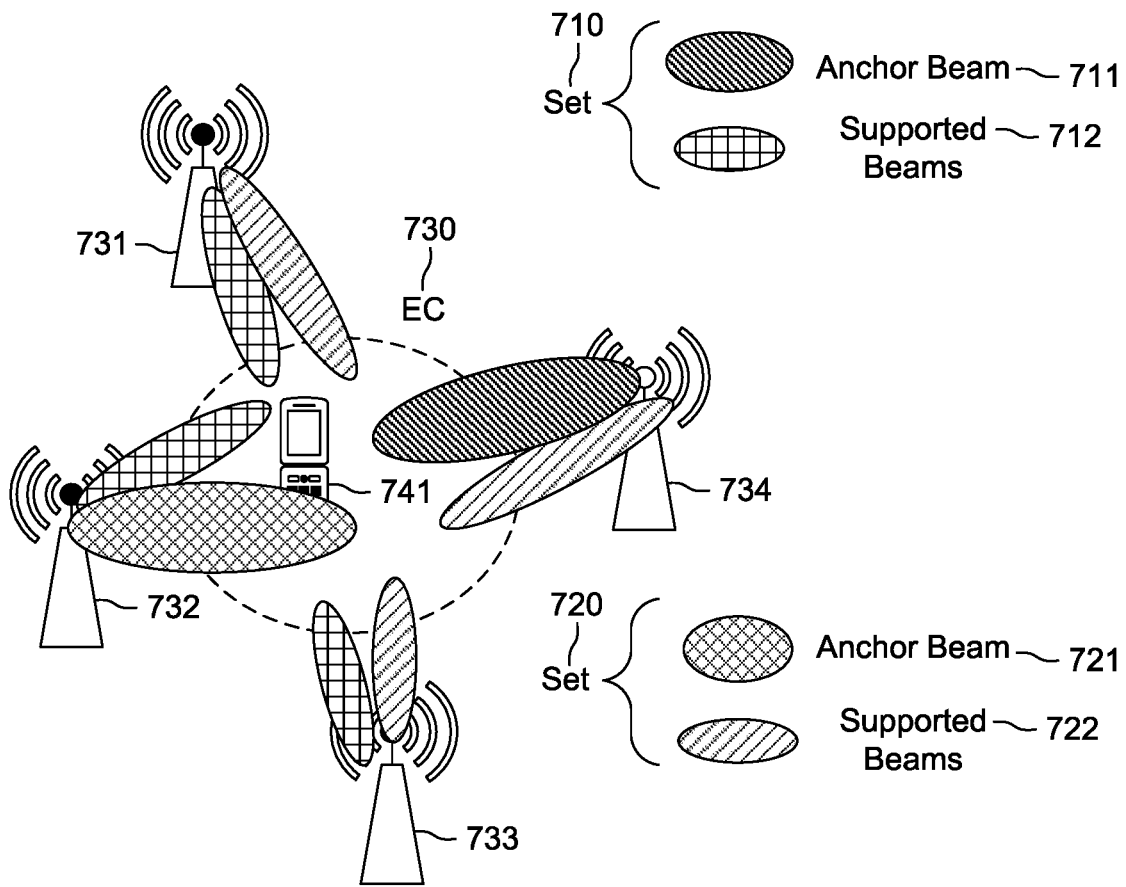
FIG. 7 illustrates an example of anchor and supported beams.

FIG. 7 illustrates an example of an Anchor and Support beams. Beams associated with an EC and/or BG may be organized into one or more sets, where each set may have an anchor beam (e.g., primary beam) and one or more associated supported beams (e.g., secondary beams). In the example of FIG. 7, beams of an EC 730 are categorized into two such sets: 710 and 720. The EC 730 may serve WTRU 741 and comprise base stations 731, 732, 733, and 734. Within each set, there is an anchor and associated support beams: set 710 has anchor 711 and support beams 712, and set 720 has anchor 721 and support beams 722. These beams may be treated differently, for example, and may be used for different purposes. For example, high priority information transmission, such as paging, system information, and the like, may be transmitted over anchor beam(s), whereas supporting beams may be used for other purposes such as transmission of EC/BG specific reference signals, network presence indications, etc. In some cases, the information transmitted over support beams may also be transmitted over the anchor beams and vice versa. Selection of anchor and supported beams may be performed using, for example, radio planning, or other factors (e.g., if the beam is supported by non-ideal backhaul or integrated access and backhaul, etc.).

There may be one or more procedures for EC detection, activation, and deactivation. For example, there may be one or more procedures for a WTRU operating in an IDLE/INACTIVE mode to detect a network (e.g., EC), and to select and activate inactive ECs and/or BGs.

Figure 8:
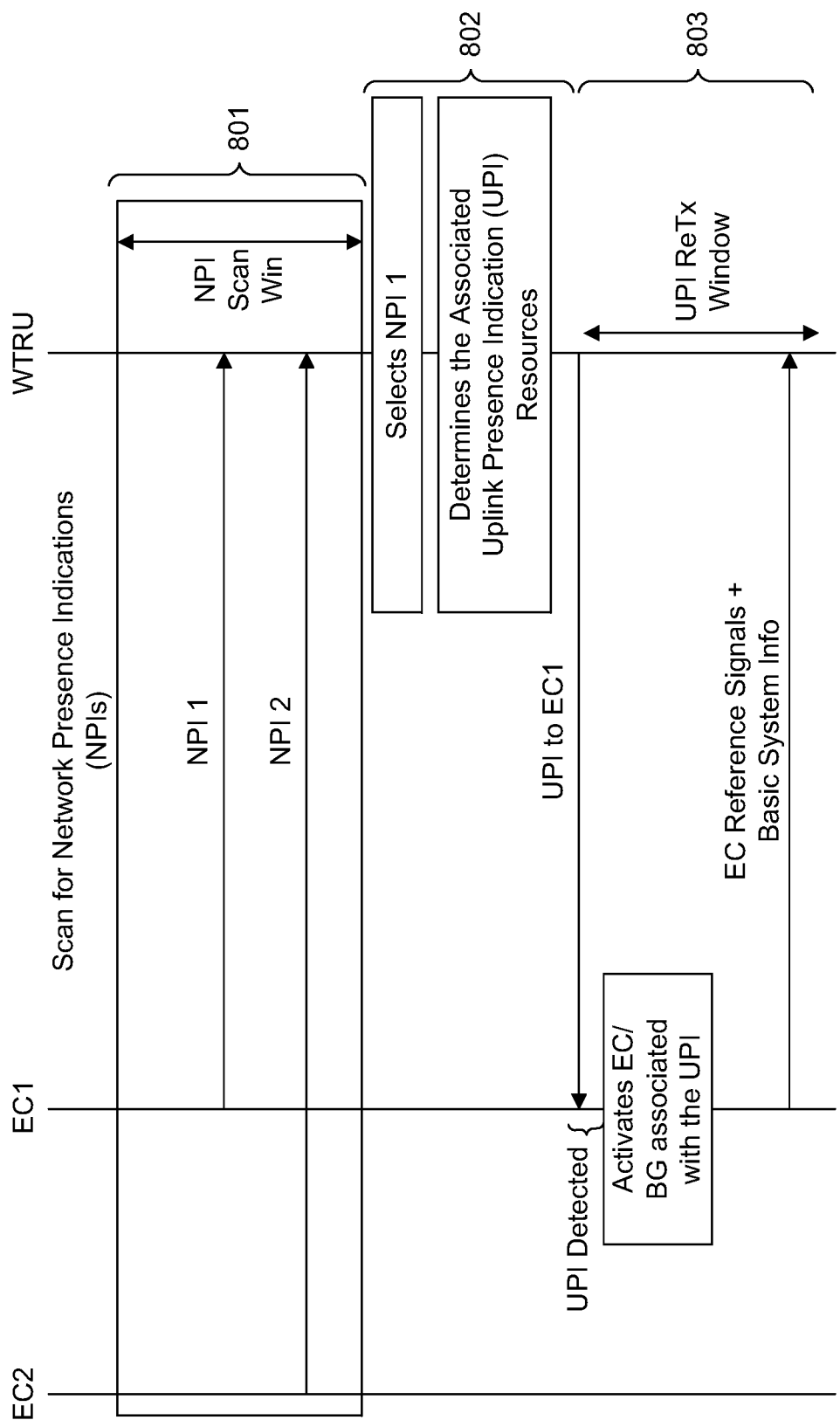
FIG. 8 illustrates an example of a high-level overview of EC detection and activation procedure.

FIG. 8 illustrates an example of a high-level overview of a procedure for EC detection and activation.

Figure 9:
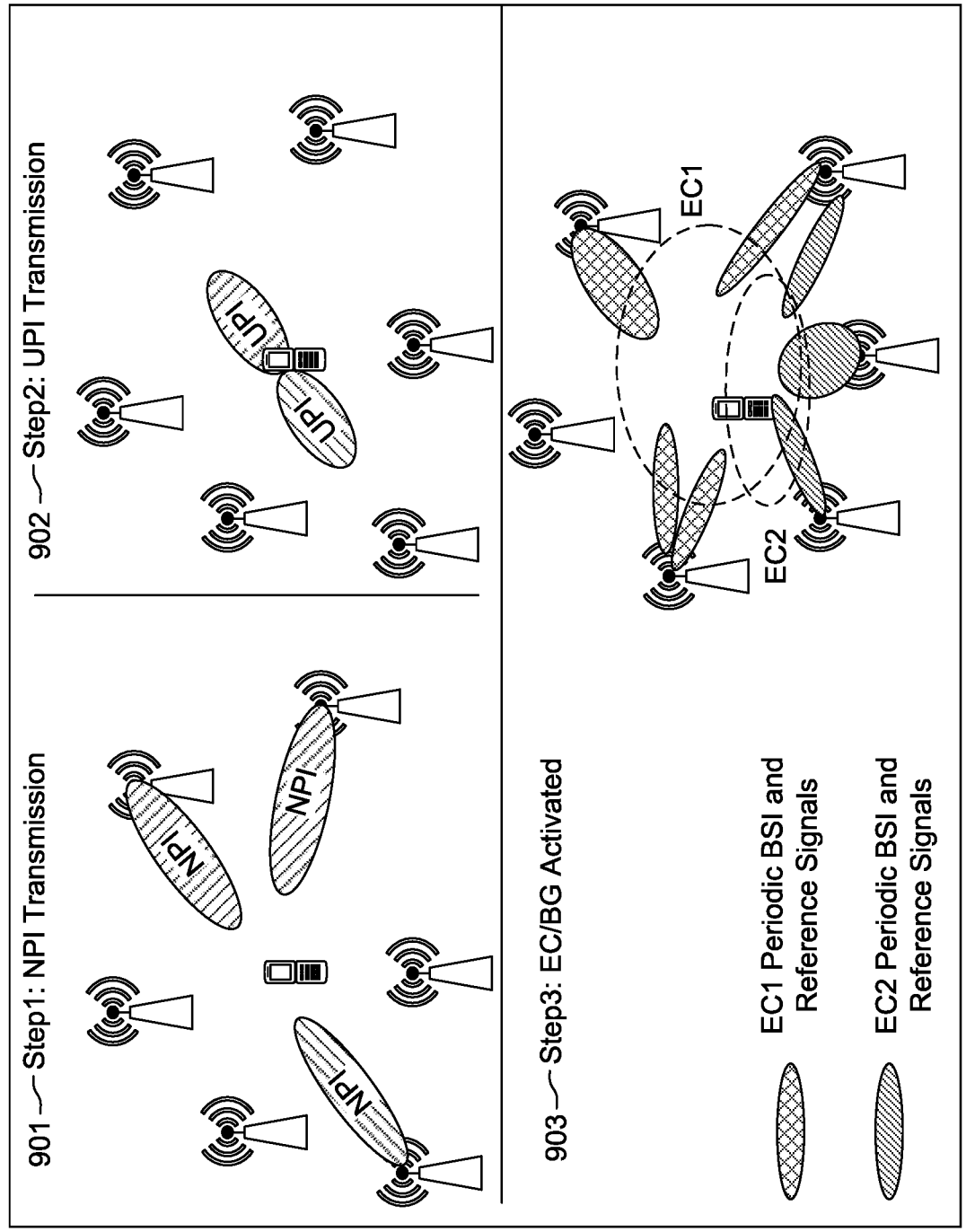
FIG. 9 illustrates an example of EC detection and activation procedure.

FIG. 9 illustrates an example of a procedure for EC detection and activation. As described herein, each EC may comprise one or more beams and serve one or more WTRUs.

While FIGS. 8 and 9 are described with regard to ECs, it is intended that the same and/or similar process may apply to, and/or be read from the perspective of, using BGs.

Referring to FIG. 8 and/or FIG. 9, at 801/901 the WTRU may detect a network (e.g., EC) presence by scanning for Network Presence Indications (NPIs) transmitted by the ECs; where NPIs may be transmitted by themselves or as part of another message. In scanning for, and receiving, NPIs, the WTRU may perform measurements on the received signals. At 802/902, the WTRU may select an EC (e.g., EC1) to activate based on one or more measurements of one or more associated NPI(s). The WTRU may send an UL indication, such as, a UE Presence Indication (UPI), to the EC1 using the configured UL resources (e.g., configured or determined by the WTRU) associated with the selected NPI of EC1 (e.g., NPI 1). At 803/903, the network may detect and receive the UPI from the WTRU. The network may activate the EC1 associated with the UPI sent from the WTRU and may start transmitting basic system information (BSI) and/or EC reference signals (RSs) over the activated beams of the active EC. As shown in FIG. 9, multiple ECs (e.g., EC1 and EC2) may be detected, selected, and activated by the WTRU. The details of each step and message/signaling may be further described herein.

One or more presence indications or network presence indications, such as NPIs, may be transmitted by an EC to indicate to the WTRUs about the presence of the EC. In some cases, NPIs transmitted by an EC may be transmitted periodically. The value of the period may be a fixed value for all the ECs or the value of the period for an EC may be chosen from a set of fixed values (e.g., different/same value of the period from the set of values may be chosen for the different ECs). The value or values of the period may be known to the WTRU. Additional timing information, such as a set of frames/sub-frames/slot/symbols over which NPIs may be transmitted may be known to the WTRU.

NPIs may be transmitted in one or more frequency bands (e.g., a set of frequency bands supported by the network) over one or more frequency locations. The value of the frequency bands and the frequency locations for the NPI transmissions may be configured or known to the WTRU.

NPIs for an EC may be transmitted over a set of beams, such as a default sub-set of all possible associated beams. A set of beams for the transmission of NPIs for an EC may be configured and/or pre-defined by the network. A set of beams for the transmission of NPIs for an EC may be defined based on the deployment scenario, such as coverage over the entire EC may be provided for the NPI transmissions. For example, in case of overlapped coverage by multiple ECs, NPI transmissions over multiple associated ECs may be configured such that coverage to a region/location may be provided by at least one EC. NPIs for an EC may be transmitted over a set of beams simultaneously, on a time-division basis, or a set of beams may be divided in to multiple groups, where NPIs sent over the group may be transmitted simultaneously and/or on a time-division basis across the groups.

In an example, where an EC may comprise multiple BGs, NPIs may be transmitted over one or more beams (e.g., set of beams) associated with each or a sub-set of BGs.

NPIs may contain varying amounts of information depending on the circumstances (e.g., minimal information in order to reduce the transmission time/complexity/etc.). In some cases, NPIs may contain minimal information to indicate to one or more WTRUs about the network (e.g., EC) presence. In one example, NPIs may be sent by ECs through simple illumination using a set of DL resources on each associated beam and the WTRU may use energy-based detection to detect NPIs. In another example, specific sequences or signatures or preambles (e.g., may be designed using pseudo-random sequence, Zadoff-Chu Sequence, or Golay Sequence, etc.) may be used to transmit NPIs that contain some information (e.g., more than the smallest amount of information). As discussed herein simple illumination may refer to an energization and/or powering up of a set of time/frequency resources without sending any specific data (e.g., via any random signal); the receiver may use energy detection to detect the present of a signal (e.g., simple illumination).

NPI(s) may contain one or more pieces of information, such as: PLMN ID or a portion of PLMN ID or a similar ID representing the unique network/operator (e.g., such ID may be similar across all ECs for a given operator); EC ID (e.g., NPIs may be EC specific); BG ID (e.g., in case EC comprises multiple BGs and NPIs are BG specific); Offset information (e.g., time-offset or time & frequency offset information) to indicate the associated UL resources for UPIs; UPI Code/Sequence Information (e.g., root sequence id, cyclic shift), such as when NPIs have different associated UL codes/sequences for the UPIs; and/or, Active/Inactive flag (e.g., where it is used to indicate if the associated EC/BG is active or inactive).

In an example, the content of an NPI(s) that needs to be transmitted may be, for example, XOR'd with a base sequence (e.g., pseudo-random sequence, Zadoff-Chu sequence, Golay Sequence, etc.). Additionally/alternatively, sequences may be generated by performing an operation (e.g., XOR operation) among all the information that needs to be transmitted. Additionally/alternatively, one or more of the above information that needs to be transmitted may be sent along with (e.g., appended) with a sequence, such as a base sequence (e.g., pseudo-random sequence, Zadoff-Chu sequence, Golay Sequence, etc.). Since the NPI may also be used to provide some level of synchronization to the WTRU to be able to send UPI to the network, then the NPI sequence may also take into account the need for providing synchronization to the WTRU. The information of base sequence and possible values of PLMN ID, EC ID, BG ID, Offset information, etc. may be known (e.g., (pre)configured) to the WTRU and/or may also be communicated to the WTRU via BSI/other SI (e.g., if the WTRU was camped on an EC before) and/or may also be communicated via higher layer signaling (e.g., if the WTRU was operating in a CONNECTED Mode with the network before).

In some cases, NPIs may be EC specific. NPIs belonging to the same EC may contain the same information for PLMN ID, EC ID, etc. One or more of NPIs belonging to the same EC may have a common associated UL resources and/or UL sequence (e.g., if configured) for the UPIs. In some cases, when an EC comprises one or more BGs, NPIs may be BG specific. In some cases, NPIs belonging to the same EC but with different BGs may have the same EC ID but different BG IDs. In some cases, NPIs belonging to the different BGs may have the different/separate associated UL resources for the UPIs or may have the same associated UL resources but with different UL sequences (e.g., if configured) for the UPIs.

In some cases, NPIs may be transmitted only over/by the inactive ECs. In case an EC comprises one or more BGs, NPIs may be transmitted only for the inactive BGs. In some cases, NPIs may be transmitted over/by both inactive and active ECs/BGs. In such a case, Active/Inactive Flag information contained in an NPI may indicate if the associated EC or BG is active (e.g., Active/Inactive Flag set to 1) or inactive (e.g., Active/Inactive Flag set to 0).

In some cases, there may be a WTRU presence indicator (e.g., UPI), and the WTRU may scan one or more channels in the pre-configured frequency bands to detect NPIs. A WTRU operating in an IDLE/INACTIVE mode may scan for NPIs when, for example, the WTRU is not currently camped on an EC and attempting to camp on an EC. In another example, a WTRU operating in an IDLE/INAC- TIVE mode may scan for NPIs when the WTRU is already camped on an EC and performing EC reselection or EC augmentation procedure, as discussed herein.

In some cases, the WTRU may scan for NPIs for a time duration, such as a NPI Scan Window. For example, the scan window may be configured to greater than the maximum value of the period configured for the NPI transmissions. The WTRU may use multiple receive spatial domain filters (e.g., Rx beams) to scan for NPIs, where the WTRU may scan for NPIs with each of the receive spatial domain filters for the multiple durations of the NPI Scan Window. The WTRU may stop scanning the NPIs when, for example, the WTRU has detected one or more NPIs.

The WTRU may detect one or more NPIs associated with one or more ECs and/or BGs. The WTRU may select an inactive EC/BG if the PLMN ID is valid for the WTRU (e.g., that may be determined with communication to the upper layers, such as NAS layer), if the PLNM ID is sent within the NPI. Once the PLMN ID is determined as valid (e.g., if the PLMN ID is sent within the NPI), the WTRU may select an inactive EC/BG based on the detected NPIs. For example, the WTRU may select an inactive EC/BG for which the received signal strength (e.g., RSRP/RSSQ) of the associated NPI/NPIs is the maximum and/or above the minimum quality threshold (e.g., $Thresh_{NPI}$). Alternatively, the WTRU may select an inactive EC/BG for which the number of associated NPIs with a receive signal strength (e.g., RSRP/RSSQ) above the $Thresh_{NPI}$ is the highest. In another example, the WTRU may select one or more inactive ECs/BGs based on the detected NPIs. For example, the WTRU may select one or more inactive ECs/BGs for which the received signal strength of at least one associated NPI is above $Thresh_{NPI}$. Alternatively, the WTRU may select one or more inactive ECs/BGs for which the received signal strengths of at least 'N (>1)' associated NPIs are above $Thresh_{NPI}$. The default value of the minimum quality threshold (e.g., $Thresh_{NPI}$) and/or N may be known to the WTRU or (e.g., default or different values) may be communicated to the WTRU, such as via NPI and/or BSI/other SI (e.g., from a previous network connection, and/or if the WTRU was camped on an EC before) and/or via higher layer signaling (e.g., if the WTRU was in CONNECTED Mode with the network before).

The WTRU may not send any UPI for a selected EC when, for example, the selected EC is already active, which may be determined from the Active/Inactive Flag information contained within the NPI.

The WTRU may send one or more UPIs to trigger the activation of one or more selected inactive ECs/BGs using the associated UL resources for UPIs. The WTRU may determine the UPI resources from the detected NPIs. Each NPI may have associated UL resources for the UPIs. As discussed herein, each NPI may contain offset information to indicate the associated one or more UL resources for the UPIs. Each NPI may have one or many associated UL resources for the UPIs. NPIs belonging to the different ECs/BGs may have separate or common UL resources for the UPIs. For example, common resources for one or more NPIs associated with two or more ECs/BGs may be configured when the associated UPIs may be differentiated in the spatial domain (e.g., a WTRU may need to use different Tx beam to transmit UPIs associated with different ECs/BGs).

In the scenario where energy-based detection is used for NPI detection, a fixed NPI-to-UPI mapping may be pre-configured to the WTRU. In one example, simple energy-based detection may be used by the network for the UPI detection. In another example, each NPI may be associated with one or more UL sequences/codes/signature/preamble to be used for UPI transmissions. The UL sequence/signature/code/preamble may be designed using pseudo-random sequence, Zadoff-Chu sequence, Golay sequence, or any other mathematical sequences. In one example, UL sequences may be like LTE/NR random access channel preamble sequences. The information of sequence/codes for the UPI may be known to the WTRU or may be contained within the NPI. NPIs belonging to the different ECs/BGs may have separate or common associated UL sequences for the UPIs. The WTRU may transmit the UL sequence, if configured, using the UL resources configured for the UPIs associated with the selected NPIs.

For each selected NPI, the WTRU may transmit one or more UPIs using a spatial domain transmission filter (e.g., Tx beam). For example, for each selected NPI, the WTRU may transmit one or more UPIs using a spatial domain transmission filter (e.g., Tx beam) corresponding to the spatial domain receive filter used for the NPI reception.

In one example, UPI resource configuration may depend on the extent of coarse synchronization provided via the NPIs. For example, both narrow-band and wide-band based transmission of NPIs may be performed by the network to support different classes/groups of WTRUs. Different WTRU classes/groups may be defined based on the narrow-band or wide-band support for NPI detection. In this example, wide-band NPI may provide better synchronization than the narrow-band NPI. Wide-band NPIs may require a smaller number of UPI UL resources (e.g., small time domain guard band) than the narrow-band NPIs. Therefore, different UPI resources may be configured for the WTRUs depending on the type of the supported NPI detection (e.g., narrow-band and wide-band).

At some point in the examples/embodiments discussed herein, for example, the network may activate one or more inactive ECs or BGs. An inactive EC may be activated, for example, after the reception of an associated UPI from one or more WTRUs. On the activation of an EC, all the associated beams or a specific sub-set of beams may be activated (e.g., called active beams herein). In another example, when an EC comprises one or more BGs, an inactive BG may be activated after the reception of an associated UPI from one or more WTRUs. All the associated beams or a specific sub-set of beams associated with the BG may be activated (e.g., called active beams herein).

System information that includes the basic or minimal information (e.g., Basic System Information (BSI)), may be transmitted (e.g., periodically) over the activated beams of the active ECs/BGs. The BSI may contain at least the information required for EC/BG selection/reselection. The BSI may contain one or more of: number of beams associated with the EC/BG; EC ID; BG ID (e.g., in case of EC is comprising of BGs); PLNM ID(s) (e.g., in case if PLMN is not sent as part of the NPI while the EC is inactive); and/or, other information used for EC selection/reselection/augmentation (e.g., as discussed herein). The BSI may contain one or more pieces of additional information including, for example, periodicity information for the BSI transmission, scheduling information to acquire other/remaining system information, bandwidth configuration, sub-carrier spacing, system frame number, cell barred or not barred information, and/or the like.

In one case, when NPIs are also configured to be transmitted over the active ECs/BGs, the periodicity of NPIs transmission may be different (e.g., higher or lower) or the same as the BSI transmission. For example, the periodicity of the NPIs transmission may be set lower than the BSI transmission to facilitate the new WTRUs to quickly detect the active ECs. In another example, NPIs and BSIs over an active EC may be transmitted in different or the same frequency bands.

EC/BG specific reference signals (e.g., synchronization signals) may be transmitted (e.g., periodically) over the activated beams of the active EC/BG. Different reference signals (e.g., sequences may be formed using the EC/BG IDs) may be used by the network across different ECs/BGs. EC reference signals may be common to the EC. BG reference signals may be common to the BG. As discussed herein, being common to something, such as an EC, may mean that it will be EC-specific reference signals; all beams of that EC may transmit the same reference signal; comparatively, if it is beam-specific, then each beam may have different reference signals (e.g., function of a beam ID). In another example, EC/BG reference signals may be beam or beam-set (e.g., beams may be further categorized into different sub-sets) specific. In case of beam or beam-set specific reference signals, unique IDs (e.g., unique over the EC or BG) may be used for the beams or the beam-sets. The reference signal may be formed by also taking beam or beam-set ID into account. WTRUs may use the reference signals for EC selection/reselection/augmentation procedures (as further discussed herein), as well as for fine synchronization. The periodicity of EC/BG specific reference signals may be the same or different from the periodicity of the BSI transmission of the EC/BG.

BSI and EC/BG specific reference signals for an EC may be transmitted over the same frequency band over which the NPIs are transmitted. In one example, a fixed frequency offset may be used between the frequency location used for the NPI transmission and the BSI/reference signal transmission. The default value of the fixed frequency offset may be known to the WTRU (e.g., preconfigured, or configured at another point in time). In another example, NPI may contain the information of frequency offset (e.g., compared to the NPI's frequency location) for the BSI/reference signal transmission.

After the transmission of a UPI associated with an EC/BG, the WTRU may monitor for EC/BG specific reference signals and/or BSI associated with the EC/BG for a duration, such as a UPI Re-transmission Window. The WTRU may monitor for EC/BG specific reference signals and/or BSI using the same or different spatial domain receive filter (e.g., Rx beam) corresponding to the spatial domain transmission filter (e.g., Tx beam) used for the UPI transmission. The WTRU may re-send one or more UPIs later; for example, the WTRU may re-send the UPI (e.g., after having sent a UPI initially) when the WTRU does not receive any EC/BG specific reference signals or BSI during the duration of UPI Re-transmission Window. The re-transmission may be performed using the same or different transmission power (e.g., higher/lower transmission power compared to the previous transmission). The re-transmission may be performed using the same or different Tx beam used for the previous transmission. The resources for the UPI re-transmission may be configured within the NPI, such as the UPI resources associated with a NPI may be periodic, where the value of the periodicity may also be contained within the associated NPI. The WTRU may re-send the UPI using the same or different (e.g., randomly selected) UL sequence used for the previous transmission. The default value of the UPI Re-transmission Window may be known to the WTRU (e.g., default or configured) or a value may be communicated to the WTRU, such as via NPI and/or BSI/other SI (e.g., if the WTRU was camped on an EC before) and/or via higher layer signaling (e.g., if the WTRU was in CONNECTED Mode with the network before).

Other information such as paging related transmissions (e.g., notifications for the change in system information) may be performed over the activated beams of the active ECs/BGs.

Once an activated EC/BG is selected by the WTRU, for example, the WTRU may camp on that EC/BG (e.g., the procedure for EC/BG selection/camping-on as described herein), and the WTRU may be configured to send periodic uplink indications (e.g., Keep Activate Indication (KAIs)) associated with the selected EC/BG to indicate to the network the WTRU's presence (e.g., in order to keep the EC/GB active). EC/BG specific time-frequency resources may be configured for KAIs. In one example, since the use of KAIs is to identify if there is at least one WTRU present in the EC/BG, common resources may be configured for all the beams. The WTRU may just illuminate the allocated time-frequency resource to send a KAI. Alternatively, specific sequences or signatures or preambles (e.g., may be designed using pseudo-random sequence, Zadoff-Chu sequence, Golay sequence, or any other mathematical sequence) may be configured to send KAIs on the allocated resources. Different ECs/BGs may configure different or the same UL sequences. Common or beam-specific sequences may be allocated for KAIs. Resources may be periodic. In one example, UPIs may also use these resources. In another example, since KAIs may generally be allocated with longer periodicity and may use less resources than UPIs, separate resources (e.g., in time and/or frequency domain), or sequences may be allocated for KAIs and UPIs.

The WTRU may be configured with a duration (e.g., a maximum presence indicator time interval ($T_{max\_pi}$)) Once the WTRU camps-on or selects an EC/BG, the WTRU may be configured to send KAIs (e.g., at least one KAI) within each $T_{max\_pi}$. The WTRU may send one or more KAIs using the configured resources associated with its current EC/BG and/or with its best beam (e.g., if beam-specific resources are allocated), where the best beam may be the beam over which the WTRU receives EC/BG reference signals and/or NPI (if NPIs are transmitted over active EC/BG) with the highest received signal quality. The WTRU may send a KAI using the spatial domain transmission filter (e.g., Tx beam) corresponding to the spatial domain receive filter (e.g., Rx beam) used to receive its best DL beam. The value of $T_{max\_pi}$, and/or periodic UL resources for KAIs may be configured to the WTRU via BSI, or any other SI, and/or using higher layer signaling (e.g., in case the WTRU was in CONNECTED mode with the same EC/BG earlier).

The network may deactivate an active EC/BG when, for example, the network does not receive any KAI (e.g., at least one UPI) associated with the active EC/BG within the duration of $T_{max\_pi}$. Upon the deactivation of an active EC/BG, the network may stop transmitting one or more pieces of information including EC/BG reference signals, BSI, other SI, paging information, or the like, on the deactivated EC/BG and may only transmit NPIs (e.g., with inactive flag if NPIs are also transmitted in active state) on that EC/BG.

Figure 10:
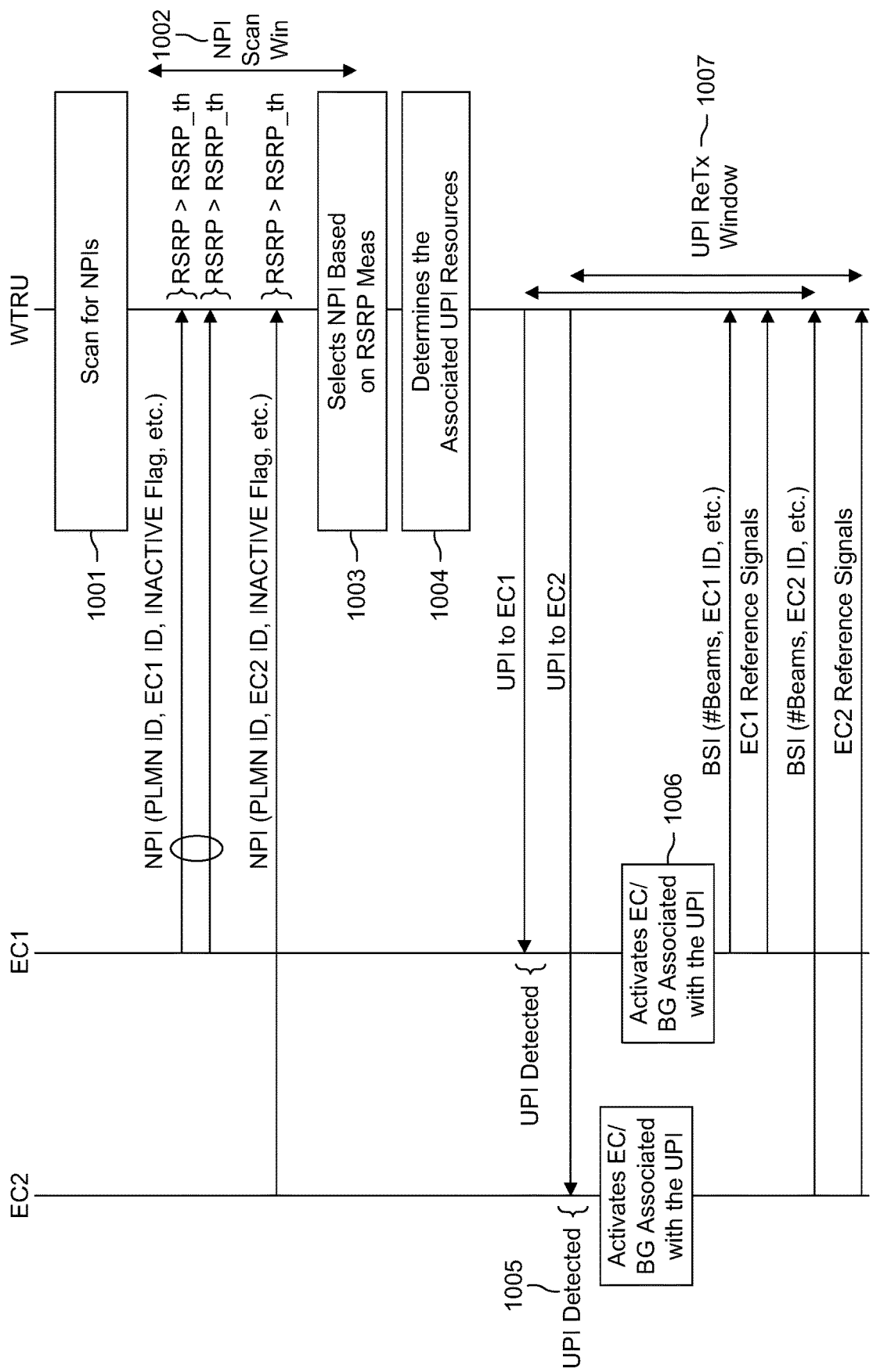
FIG. 10 illustrates an example of EC detection and activation procedure.

FIG. 10 illustrates an example of EC(s) detection and activation procedure. According to one or more techniques described herein, there may be a method performed by a WTRU operating in an IDLE/INACTIVE mode to detect and activate one or more ECs (e.g., EC1 and EC2). At 1001, the WTRU may monitor/scan for NPI(s) in one or more channels in one or more (pre)configured frequency bands (e.g., according to its capabilities). At 1002, the WTRU may receive one or more NPIs, where the NPI may include one or more pieces of information (e.g., PLMN ID, EC1 ID, INACTIVE Flag, etc.). At 1003, the WTRU may select an inactive EC based on whether the receive signal strength (e.g., RSRP/RSRQ) over the associated NPI is the highest (e.g., relative to an NPI(s) from another EC), and/or above the minimum quality threshold (e.g., $Thresh_{NPI}$). At 1004, the WTRU may determine the resources to send UPI(s) for the selected inactive EC using one or more pieces of information associated with, and/or included in, one or more of the detected NPI(s). At 1005, the WTRU may send one or more UPIs using the associated resources to enable the activation of the selected EC. At 1006, the EC(s) may be activated based on the UPI(s). At 1007 the WTRU may monitor for EC reference signals and/or BSI from the EC(s) for which a UPI(s) was sent (e.g., for the EC that was to be activated); and/or, not shown in FIG. 10, the WTRU may resend UPI(s) if no reference signals or BSI is received within the duration of UPI Retransmission window. Any part of the process of FIG. 10 may be omitted and/or repeated as necessary depending on a given scenario (e.g., the WTRU may scan for NPIs again if no NPIs are received and/or some NPIs do not meet the threshold). The process of FIG. 10 may also apply to the activation of one or more BGs, where similar/same steps may occur.

With regard to the examples of FIG. 9 and/or FIG. 10, and/or any other example provide herein, the WTRU may use one or more received spatial domain filters (e.g., Rx beams) to scan for NPIs, where with each of the received spatial domain filters, scanning for NPIs may be performed for one or more durations of NPI Scan Window. The WTRU may select an inactive EC/BG for which the PLMN ID is valid if the PLNM ID is sent within the NPI. The WTRU may select an inactive EC/BG for which the receive signal strength (e.g., RSRP/RSRQ) over the associated NPI is the maximum (e.g., with respect to NPI(s) of other EC(s)/BG(s) received, if any, during the scanning window) and above the minimum quality threshold (e.g., $Thresh_{NPI}$). The WTRU may select an inactive EC/BG for which the linear average of the receive signal strengths (e.g., RSRPs/RSRQs) over the associated NPIs is the maximum and above the minimum quality threshold (e.g., $Thresh_{NPI}$). The WTRU may select an inactive EC/BG for which the number of associated NPIs with receive signal strength (e.g., RSRP/RSRQ) above the minimum quality threshold (e.g., $Thresh_{NPI}$) is the highest. The WTRU may select more than one inactive ECs/BGs based on the detected NPIs. The WTRU may select one or more inactive ECs/BGs for which the receive signal strengths of at least 'N (>1)' associated NPIs are above a minimum quality threshold (e.g., $Thresh_{NPI}$). The WTRU may receive the information of UPI resources within the associated NPIs, where in the case of the energy-based detection used for NPI detection, a fixed NPI-to-UPI mapping may be pre-configured to the WTRU. The WTRU may transmit UPI using a sequence selected randomly from the configured set of sequences (if any) over the configured UL resources. The WTRU may send more than one UPIs to trigger the activation of more than one selected inactive ECs/BGs using the associated UL resources and sequences (if configured) for UPIs. The WTRU may transmit the UPI using the spatial domain transmission filter (e.g., Tx beam) corresponding to the spatial domain receive filter used for the associated NPI reception. The default value of the minimum quality threshold (e.g., $Thresh_{NPI}$), N, and/or UPI Re-transmission Window may be known to the WTRU or (e.g., default or different values) may communicated to the WTRU, for example, via NPI and/or BSI/other SI (e.g., if the WTRU was camped on an EC before) and/or via higher layer signaling (e.g., if the WTRU was in CONNECTED Mode with the network before).

According to one or more techniques described herein, there may be one or more procedures for enabling enable detection, activation, and/or deactivation of an EC comprising at least one of the following actions: sending NPIs for inactive ECs periodically in one or more frequency bands over one or more frequency locations over one or more beams associated with the EC; activating an EC upon reception of one or more UPIs associated with the EC and start transmitting periodic BSI and EC specific reference signals over a set of beams selected for initial activation; deactivating an active EC when there is no KAI received within the duration of $T_{max\_pi}$; and/or, stop transmitting BSI and EC specific reference signals and only transmitting NPIs (e.g., with inactive flag) for that EC. In some cases, the one or more procedures may be performed by the network (e.g., any network node(s) described herein).

With regard to the above example method performed by the network, NPIs may be transmitted by ECs through simple illumination of a set of DL resources on each associated beam. Specific sequences may be used as NPIs containing (e.g., within the sequence or appending with sequence) one or more pieces of information including PLMN ID, EC ID, offset information for associated UPI resources, UPI sequence information, active/inactive flag, and the like. NPIs may be transmitted for active EC with active flag on. The BSI may contain one or more pieces of information including EC selection/reselection related parameters, number of beams associated with the EC/BG, EC ID, PLNM ID(s), other information used for EC selection/reselection/augmentation, periodicity information for the BSI transmission, scheduling information to acquire other/remaining system information, bandwidth configuration, sub-carrier spacing, system frame number, cell barred or not barred information, and/or the like. The network may transmit other SI and/or paging information on the set of selected beams of the active EC/BG. EC reference signals may be beam or beam-set (e.g., beams may be further categorized into different sub-sets) specific. One or more of the above features for BGs may be applied when the EC comprises multiple BGs.

According to one or more techniques described herein, there may be one or more procedures for WTRU to select, reselect, and/or augment an EC. In some cases, the WTRU may be operating in an IDLE/INACTIVE mode.

For EC selection criteria, the WTRU may select or camp on an active EC. If the PLMN is sent within the BSI, the WTRU may make measurements for the EC/BG selection if the PLNM ID is valid for the WTRU (e.g., which may be determined by communicating with upper layers, such as NAS layer). The WTRU may perform measurements over the EC reference signals transmitted by the active EC(s) to determine the EC to be camped on. In another example, if the active EC(s) also transmit NPIs (e.g., with Active/Inactive Flag set to Active), the WTRU may perform measurements using NPIs and/or EC reference signals transmitted by the active ECs to determine the EC to be camped on.

In one approach, the WTRU may be configured to select an EC for which the received signal quality measurements (e.g., RSRP, RSRQ, and/or other received signal quality metric) over at least M1 (>=1) number of associated active beams are above a minimum threshold ($Thresh_{Sel}$). Different thresholds may be defined for different received signal quality metrics, for example, $Thresh_{RSRP\_Sel}$ for RSRP, $Thresh_{RSRQ\_Sel}$ for RSRQ, etc. In case of an EC comprising multiple BGs, the WTRU may perform measurements over reference signals or NPIs associated with BGs and may select a BG to camp on. The value of M1 and/or minimum threshold (Thresh$_{Sel}$) may be configured to the WTRU via SI (e.g., BSI), and/or via higher layer signaling (e.g., if the WTRU was in CONNECTED Mode with the network before).

Figure 11:
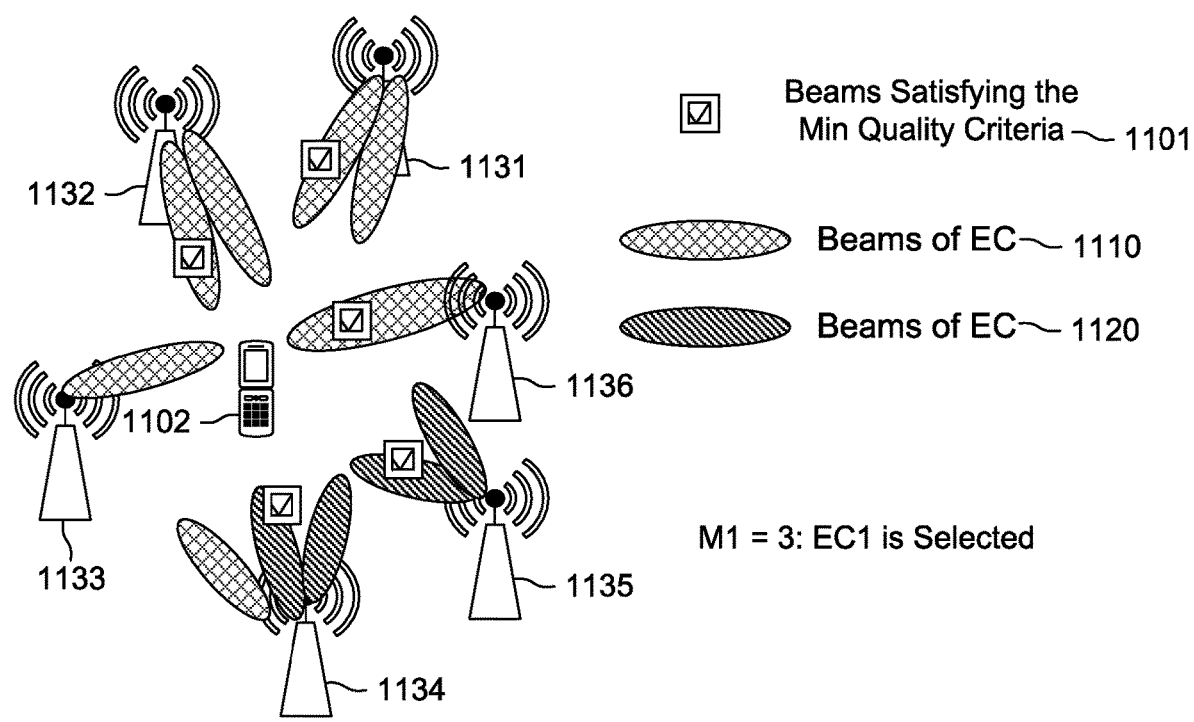
FIG. 11 illustrates an example of EC selection criteria.

FIG. 11 illustrates an example of EC selection criteria. There may be two ECs 1110 and 1120, and six base stations, where each base station can transmit at least one beam for one or more ECs. In this example, for illustrative purposes, M1=3, which means that the selection criteria requires at least 3 beams to meet the signal quality threshold; as shown, each checkmark 1101 indicates where a beam has met the threshold. The WTRU 1102 determines that EC 1110 satisfies the EC selection criteria since there are at least three beams that meet the threshold, whereas only two beams met the threshold for EC 1120.

In another approach, when beams (e.g., active beams) associated with an EC or BG may be categorized into one or more sets, where each set may have an anchor beam and one or more supported beams, EC/BG reference signals and/or NPIs transmitted over a beam may contain the information to indicate if the associated beam is an anchor beam or a supported beam. Additionally, an ID may be associated with each set to differentiate among different sets. The information of ID may also be sent within the EC/BG reference signals and/or NPIs. For example, the sequences used for reference signal or NPI may encode the information of set ID and anchor/supported beam indication within the sequence. The information of the number of sets and/or number of total supported beams (e.g., active beams) in each set may be configured to the WTRU via BSI.

With such categorization of beams, in one example, the WTRU may be configured to select an EC or BG for which the received signal quality measurements (e.g., RSRP/RSRQ/etc.) over at least one anchor beam is above a minimum threshold (e.g., Thresh$_{Sel}$). In another example, the WTRU may be configured to select an EC or BG for which the received signal quality measurement (e.g., RSRP/RSRQ/etc.) over at least one set is above a minimum threshold, where for example, measurements over one anchor beam and a minimum M2 number of associated support beams are all above minimum threshold (e.g., Thresh$_{Sel}$).

Figure 12:
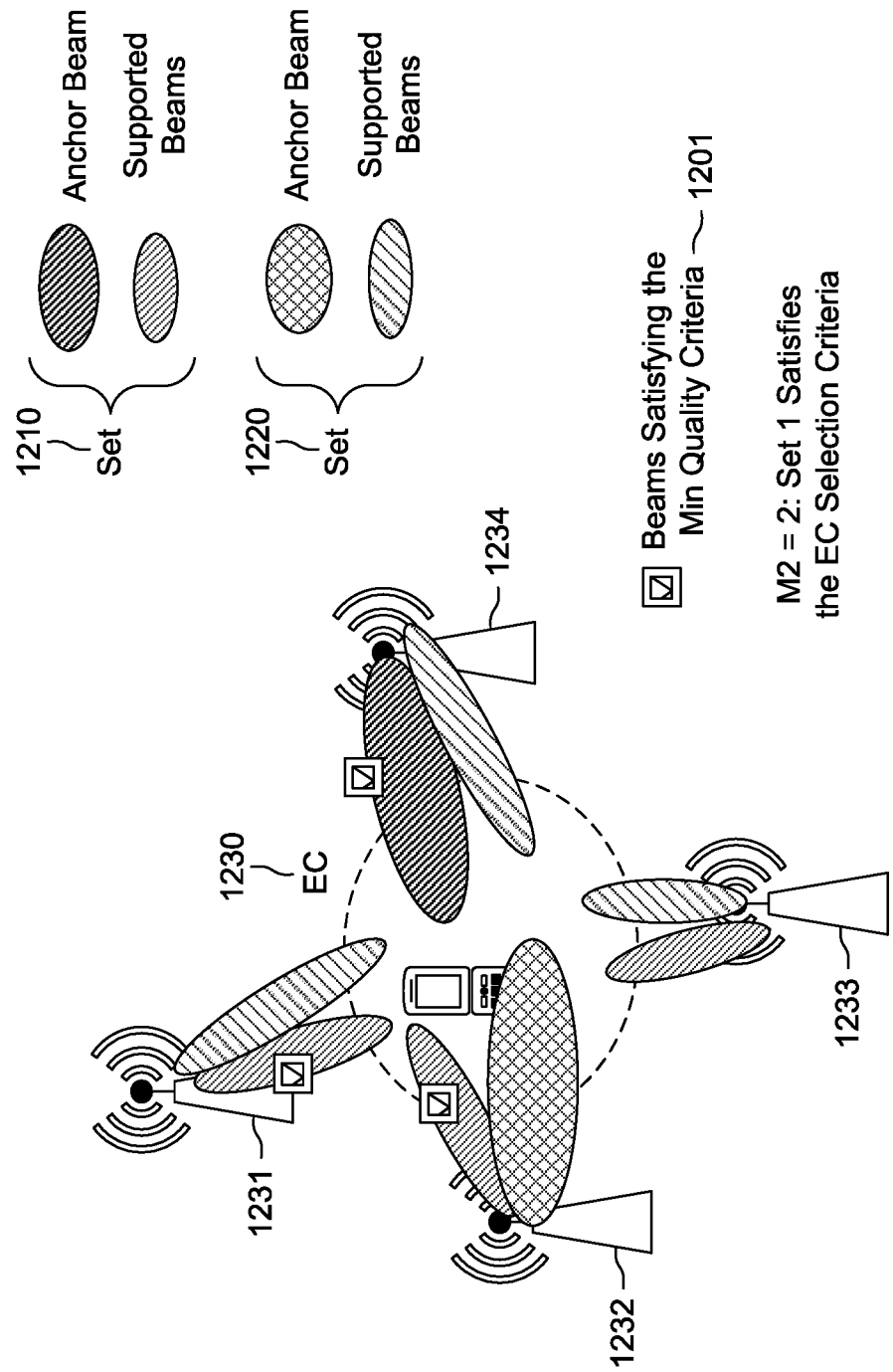
FIG. 12 illustrates an example of EC selection using anchor and supported beams.

FIG. 12 illustrates an example of EC selection using anchor and supported beams. As shown, there may be two sets 1210 and 1220. In this example, the selection criteria may require that one set of beams meets the associated thresholds, where M2=2 (e.g., at least one anchor and two support beams meet the related threshold(s)). In FIG. 12, each checkmark 1201 illustrates which beam meets a threshold, and the set 1210 satisfies the selection criteria of M2=2.

In such an example, beam-based biasing may be used, where the anchor beam may be assigned more weight, such as a larger minimum measurement threshold for the anchor beam (e.g., Thresh$_{SelAnchor}$=Thresh$_{Sel}$+Q$_{bias\_anchor}$) compared to the support beams (e.g., Thresh$_{SelAnchor}$=Thresh$_{Sel}$), where Q$_{bias\_anchor}$>0 (in linear scale) may be configured.

In another example, the WTRU may be configured to select an EC or BG for which the received signal quality measurement (e.g., RSRP/RSRQ/etc.) for more than one set are above a minimum threshold. For each set, measurement criteria over the anchor beam and a minimum M2 number of associated supported beams may be satisfied. Anchor beams may be biased differently (e.g., larger minimum measurement threshold) than the supported beams. Different criteria, for example, in terms of minimum number of supported beams and/or minimum measurement thresholds (for anchor and/or supported beams) may be configured for different sets.

The parameters needed for EC/BG selection such as number of sets, minimum number of supported beams associated with each set, minimum measurement threshold (Thresh$_{Sel}$/Thresh$_{SelAnchor}$/Thresh$_{SelSupported}$, etc.), and/or bias (e.g., for anchor beams, e.g., Q$_{bias\_anchor}$), or the like, may be configured to the WTRU via SI (e.g., BSI or other SI), and/or via higher layer signaling (e.g., if the WTRU was operating in CONNECTED Mode with the network before, or some other circumstance where the WTRU was connected to the network previously).

When camped on an EC, the WTRU may search for a better EC according to the EC reselection criteria. In case of WTRU camped on a BG, the WTRU may search for a better BG of the same or different EC. If a better EC/BG is found, that EC/BG may be selected.

The WTRU may be configured to perform measurements for EC/BG reselection.

Criteria/rules using the measurements on the current EC/BG on which the WTRU is camped on may be used by the WTRU to trigger additional measurements to perform EC/BG reselection procedure.

In one example, the WTRU may start performing the measurements for EC/BG reselection, for example when the received signal qualities (e.g., RSRP, RSRQ, and/or other received signal quality metric) on all visible beams of the current EC/BG on which the WTRU is camped on are below a configured threshold (e.g., Thersh$_{Resel}$) Different thresholds may be defined when different received signal quality metrics are used, for example, Thresh$_{RSRP\_Resel}$ for RSRP, Thresh$_{RSRQ\_Resel}$ for RSRQ, etc. Visible beams to the WTRU may refer to the beams of the current EC/BG (e.g., on which the WTRU is camped on) for which the received signal quality (e.g., RSRP/RSRQ/etc.) is above a minimum threshold (e.g., Thersh$_{visible}$), where Thersh$_{visible}$ <=Thersh$_{Resel}$, and Thersh$_{visible}$ may be greater than and equal to Thresh$_{Sel}$ used during the EC/BG selection.

In another example, a minimum number of beams may be configured (e.g., M3 which may be the same or different than the value of M1 used for EC/BG selection process) to the WTRU. The WTRU may start performing the measurements for EC/BG reselection, for example, when the received signal qualities (e.g., RSRP/RSRQ/etc.) on at least M3 number of beams of the current EC/BG (e.g., on which the WTRU is camped on) are below a configured threshold (e.g., Thersh$_{Resel}$).

In another example, when the beams are categorized in one or more sets of anchor and supported beams, the WTRU may start performing the measurements for EC/BG reselection, for example when the received signal qualities (e.g., RSRP/RSRQ/etc.) on all visible anchor beams (e.g., for which the RSRP/RSRQ/etc. is above a minimum threshold, e.g., Thersh$_{visible}$) or on a configured minimum number (e.g., M4>=1) of anchor beams of the current EC/BG (e.g., on which the WTRU is camped on) are below Thersh$_{Resel}$.

In another example, the WTRU may start performing the measurements for EC/BG reselection when the received signal qualities (e.g., RSRP/RSRQ/etc.) on all visible sets of the current EC/BG (e.g., on which the WTRU is camped on) or a configured minimum number of sets (e.g., M5>=1) are below a minimum threshold, where in each set, RSRP/RSRQ on the anchor beam and a minimum number of M6 (e.g., may be same or different than M2 used during the EC/BG selection) supported beams are below Thersh$_{Resel}$.

Visible sets may be the sets for which the RSRP/RSRQ/etc. on the anchor and a minimum M6 number of supported beams are above a minimum threshold (e.g., $Thersh_{visible}$). Different values for the thresholds (e.g., $Thersh_{Resel}$ and $Thersh_{visible}$) may be used for the measurements over the anchor beam and the associated supported beams; for example, larger thresholds (e.g., $Thersh_{Resel}$ and/or $Thersh_{visible}$) may be configured for the anchor beams compared to the supported beams.

In another example, criteria to trigger additional measurements for EC/BG reselection may be defined based on the number of visible beams. The WTRU may start performing the measurements for EC/BG reselection, for example when the number of visible beams (e.g., for which the RSRP/RSRQ/etc. is above a minimum threshold, e.g., $Thersh_{visible}$) of the current EC/BG (e.g., on which the WTRU is camped on) is below a minimum threshold (e.g., $N_{Min\_Vis\_Beam}$). Measurements to derive the number of visible beams may be performed one or more times (e.g., over one or more measurement cycles) and an average value over the multiple measurements may be used.

In another example, the WTRU may track one or more specific beams (e.g., one or more anchor beams and/or best beam selected by the WTRU during the EC/BG selection process based on received signal quality) of the current EC/BG (e.g., on which the WTRU is camped on) and may make measurements to calculate the beam blockage rate of the one or more selected specific beams. A beam may be blocked when the beam is not visible (e.g., received signal quality on the beam is below $Thersh_{visible}$) Multiple measurements at different times, such as over multiple measurement cycles, may be performed on each of the selected beam(s) to derive the associated beam blockage rate. The WTRU may start performing the measurements for EC/BG reselection, for example, when the beam blockage rate on one or more or all the selected beams is above a threshold (e.g., $Thersh_{blockRate}$).

For any of the beam measurements discussed herein, the WTRU may perform these measurements using the associated NPIs, EC/BG reference signals, and/or other reference signals/sequences transmitted over the beams.

In one example, the WTRU may be configured with a time duration (e.g., $T_{meas\_trigECResel}$) The WTRU may trigger additional measurements for EC reselection when, for example, the criteria, as disclosed herein, holds over the configured time duration (e.g., $T_{meas\_trigECResel}$) One or more measurements may be made by the WTRU over the configured time duration (e.g., $T_{meas\_trigECResel}$) In another example, the WTRU may be configured with a number of minimum multiple measurements (e.g., $N_{meas\_trigECResel}$) The WTRU may make minimum $N_{meas\_trigECResel}$ number of measurements (e.g., on each beam considered for the criteria) to evaluate the criteria. Average measurements over the multiple measurements may be used to evaluate the criteria.

The parameters needed to determine the criteria to trigger additional measurements for EC/BG reselection such as value of measurement thresholds ($Thersh_{Resel}$, $Thersh_{RSRP\_Resel}$, $Thersh_{RSRQ\_Resel}$, $Thersh_{visible}$, $N_{Min\_Vis\_Beam}$, and/or $Thersh_{blockRate}$), M3, M4, M5, M6, $N_{meas\_trigECResel}$, $T_{meas\_trigECResel}$, and/or bias values for measurement threshold for the anchor beams may be configured to the WTRU via SI (e.g., BSI or other SI), and/or via higher layer signaling (e.g., if the WTRU was operating in CONNECTED Mode with the network before).

The WTRU may perform measurements on neighboring ECs/BGs when the criteria to trigger EC/BG reselection procedure, such as those disclosed herein, is/are satisfied.

In one approach, the WTRU may perform measurements only over the current and neighboring active ECs/BGs. The WTRU may perform measurements on each considered EC/BG similarly as defined for the EC/BG selection procedure described herein. The WTRU may rank the ECs/BGs for the reselection procedure. The WTRU may consider all the active ECs/BGs for the ranking for which the EC/BG selection criteria (e.g., disclosed herein) is satisfied.

The EC/BG ranking may be according to the value of the measurement metric used for EC/BG selection (e.g., larger the measurement the higher the rank). In one example, the EC/BG ranking may be performed using the linear average of all the measurements performed over the different beams (e.g., considered as per the EC/BG selection requirement) of an EC/BG.

In another example, the EC/BG ranking may be performed based on the number of beams of an EC/BG satisfying the minimum measurement threshold criteria (e.g., higher the number of beams satisfying the minimum measurement threshold criteria the higher the rank). In the case where beams of an EC/BG are categorized into one or more sets of anchor and supported beams, then the EC/BG selection, and/or reselection, criteria may require the measurement over the one or more sets above minimum thresholds; the more the number of sets satisfying the minimum measurement threshold criteria for an EC/BG the higher the rank of that EC/BG. In a case where there are an equal number of sets satisfying the criteria for two more ECs/BGs, then the EC/BG with higher the number of supported beams (e.g., average over all the sets) may be given a higher rank.

The WTRU may reselect a new EC and/or BG, for example when the new EC/BG is better than the current EC/BG (e.g., where WTRU is currently camped), such as a higher rank than the current EC/BG. In case of multiple new ECs/BGs, the WTRU may select the EC/BG with the highest rank based on the criteria specified above.

In another approach, the WTRU may perform measurements on active, and/or inactive neighboring ECs/BGs when the EC/BG reselection criteria (e.g., any disclosed here) is satisfied. The WTRU may perform measurements using the NPIs transmitted by the inactive ECs/BGs. The WTRU may perform measurements using the NPIs or EC/BG reference signals transmitted by the current as well as neighboring active ECs/BGs.

The WTRU may compare the measurements on the inactive ECs/BGs and the active ECs/BGs to determine if one or more new ECs/BGs need to be activated and/or a new ECs/BGs needs to be selected. The WTRU may determine to remain camped on the current EC/BG. The WTRU may determine to activate one or more new ECs/BGs with or without selecting another EC/BG.

In one example, for each EC/BG (e.g., active or inactive), a linear average of all the measurements performed over the different associated visible beams may be determined and considered as a measurement for that EC/BG. The WTRU may select one or more ECs/BGs based on the measurement result (e.g., with highest measurement results).

In another example, the WTRU may select one or more ECs/BGs with the highest number of beams satisfying the minimum measurement threshold criteria (e.g., measurement>$Thresh_{sel}$).

The WTRU may camp-on a new EC/BG, for example when the WTRU selects an active EC/BG for which the EC/BG selection criteria (e.g., any disclosed herein) is satisfied and the selected EC/BG is better than the current EC/BG (e.g., on which the WTRU is currently camped on).

The WTRU may perform EC/BG activation procedure (e.g., like the ones described herein) when, for example, the WTRU selects an inactive EC/BG. In another example, the WTRU may trigger the activation of one or more inactive ECs/BGs when, for example, the measurement on the those ECs/BGs are above a minimum configured threshold (e.g., Thersh$_{act}$, which may be configured by the network via SI or higher layer signaling during the CONNECTED state). The WTRU may trigger activation of one or more new inactive ECs along with camping-on a new active EC/BG.

In some cases, EC/BG level biasing may be used. Different EC/BG specific bias values or weights or measurement offset values may be configured to the WTRU (e.g., different/separate values for different ECs/BGs, for example, different/separate values may be configured for current EC/BG compared to the other neighboring ECs/BGs). For example, inter-EC or inter-BG bias/weight/offset values may be configured for the measurements performed at the neighboring ECs/BGs.

In case of inactive ECs/BGs, additional bias/weights/measurement offset may be configured by the network, for example, to control the network overhead to maintain the simultaneous active ECs/BGs, the network may bias the new inactive ECs such that the WTRU may be configured to prefer to reselect an active EC with decent received signal quality instead of activating new ECs/BGs.

The WTRU may use the bias/weights/measurement offset values configured for an EC/BG. For example, the configured bias/weights/measurement offset values for an EC/BG may be added or subtracted or multiplied to the measurement performed for that EC/BG by the WTRU, to derive the final measurement for that EC/BG needed for ranking and/or determining activation versus reselection.

The WTRU may be configured with a time interval (e.g., T$_{reselect}$)) for selection/reselection. The WTRU may reselect a new EC/BG or activate a new EC/BG if the criteria specified above is satisfied for the duration of T$_{reselect}$. In another example, the WTRU may be configured with a minimum time interval (e.g., Trim). The WTRU may reselect or activate a new EC/BG if the criteria specified above is satisfied for the duration of T$_{reselect}$ and the WTRU has elapsed at least T$_{min}$ since the WTRU camped on the current EC/BG.

In another example, the WTRU may be configured with a number of minimum multiple measurements (e.g., N$_{meas\_Resel}$) The WTRU may make a minimum N$_{meas\_Resel}$ number of measurements (e.g., on each beam considered for the measurements) to evaluate the quality of each EC/BG. Average measurements over the multiple measurements may be used to evaluate the quality of each EC/BG.

The parameters needed for EC/BG reselection such as measurement offset/bias values for current and/or neighboring cells, T$_{reselect}$, T$_{min}$, and/or N$_{meas\_Resel}$ may be configured to the WTRU via SI (e.g., BSI or other SI), and/or via higher layer signaling (e.g., if the WTRU was in CONNECTED Mode with the network before).

One or more mobility states may be defined based on the rate of EC reselection. In another example, one or more mobility states may be defined based on the rate of BG reselection.

For example, the WTRU may determine its mobility state as a low-mobility state (e.g., normal-mobility state), if a number of BG or EC reselections during a time period, (e.g., T$_{BGR\_max}$ or T$_{ECR\_max}$) is less than a first threshold (e.g., BG$_{speed1}$ or EC$_{speed1}$). An EC reselection may be considered, for example, when the WTRU selects a different EC (e.g., either neighboring active EC or neighboring inactive EC) from the current EC. A BG reselection may be considered, for example, when the WTRU selects a different BG (e.g., different from the current BG) on the current EC or neighboring active/inactive EC. The number of BG reselections may be counted both over the same (e.g., single) EC and/or across different (e.g., multiple) ECs.

The WTRU may determine its mobility state as a medium-mobility state (e.g., WTRU with a higher mobility than the normal-mobility state), if the number of BG or EC reselections during time period (e.g., T$_{BGR\_max}$ or T$_{ECR\_max}$), is greater than or equal to the first threshold (e.g., BG$_{speed1}$ or EC$_{speed1}$), but less than or equal a second threshold (e.g., BG$_{speed2}$ or EC$_{speed2}$).

Similarly, the WTRU may determine its mobility state as a high-mobility state (e.g., WTRU is with the higher mobility than the mobility in the medium-mobility state), if the number of BG or EC reselections during time period, (e.g., T$_{BGR\_max}$ or T$_{ECR\_max}$) is greater than BG$_{speed2}$ or EC$_{speed2}$ and/or less than or equal to a third threshold (e.g., BG$_{speed3}$ Or EC$_{speed3}$). Similarly, one or more mobility states may be defined for the WTRU. Consecutive reselections where an EC/BG is reselected again right after one reselection may not be taken into account for mobility state detection criteria. The values of time period, such as T$_{BGR\_max}$/T$_{ECR\_max}$, one or more thresholds, such as BG$_{speed1}$/EC$_{speed1}$, BG$_{speed2}$/EC$_{speed2}$, BG$_{speed3}$/EC$_{speed3}$, or the like, may be configured to the WTRU by the network, for example via SI (e.g., BSI or other SI), and/or via higher layer signaling (e.g., if the WTRU was operating in CONNECTED Mode with the network before).

The criteria, as described herein, to determine/define different mobility states may be applicable to RRC IDLE, INACTIVE, and/or RRC CONNECTED state.

WTRU Mobility state or speed depended bias or measurement offset values for the current EC/BG and/or the other neighboring ECs/BGs (e.g., considered for reselection or activation) may be configured to the WTRU. Different bias or measurement offset values may be configured for different mobility states. For example, in case of high mobility state, larger measurement offset value may be configured for the current EC/BG which may be subtracted from the measurement of the current EC/BG so that a lower rank may be assigned to the current EC for reselection.

The value of the time duration over which the EC/BG reselection criteria needs to be satisfied (e.g., T$_{reselect}$) and/or the number of minimum measurements (e.g., N$_{meas\_Resel}$) which needs to be made to evaluate the quality of an EC/BG may also be scaled based the WTRU mobility state. Different (e.g., separate) scaling factor(s) (e.g., which may be multiplied or added or subtracted to the T$_{reselect}$/N$_{meas\_Resel}$) for different mobility state may be configured to the WTRU. The WTRU may use the scaling factor to determine the value of T$_{reselect}$/N$_{meas\_Resel}$ used for EC/BG reselection procedure.

Augmentation of an EC may refer to enhancing the EC by at least one or more of: activating one or more new beams; activating one or more new BGs; increasing the transmit power for the existing active beams; increasing the beamwidths for the existing active beams; and/or, the like.

Similarly, augmentation of a BG may refer to at least one or more of: activating one or more new beams; increasing the transmit power; beam-widths for the existing active beams; and/or, the like.

Figure 13:
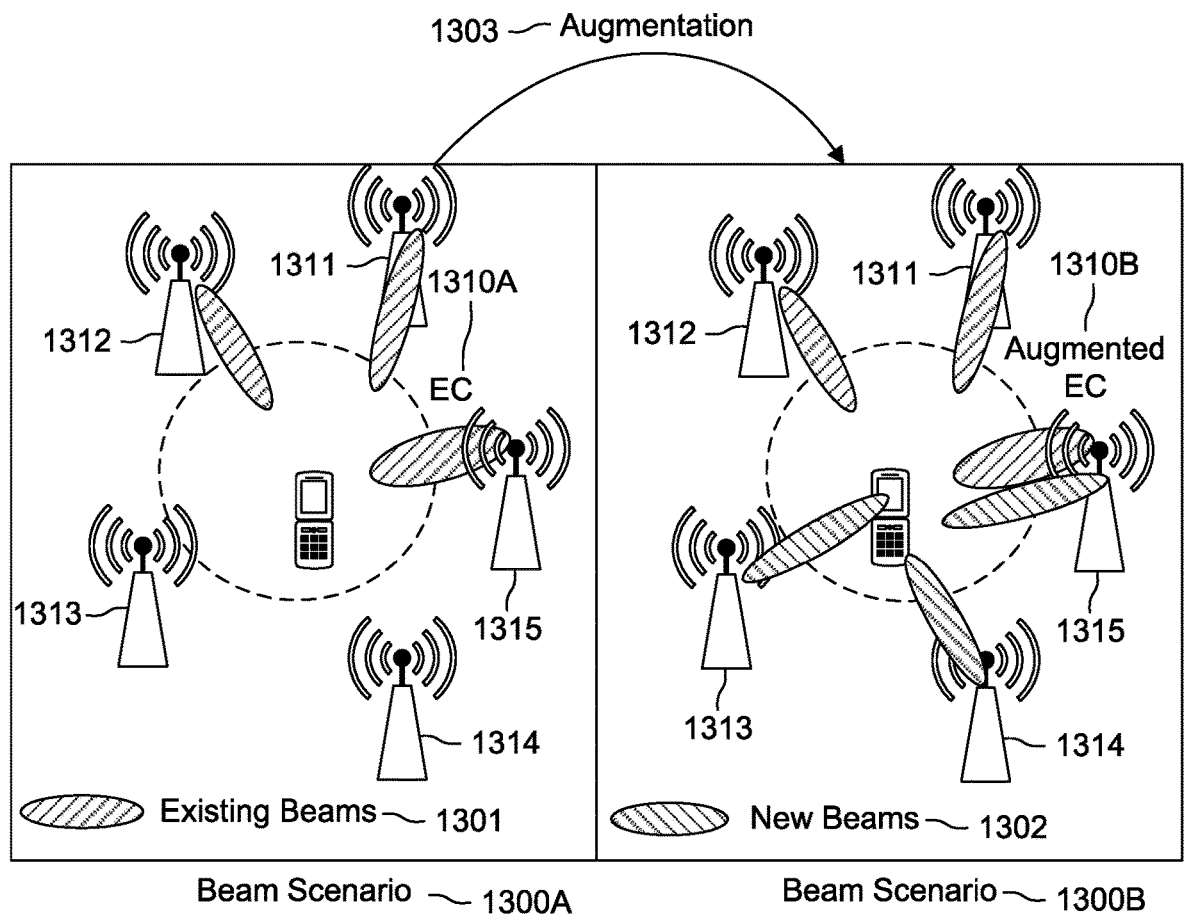
FIG. 13 illustrates an example of EC augmentation.

FIG. 13 illustrates an example of EC augmentation, where new beams are activated within the EC. The network may augment an EC/BG based on the feedback/indication from one or more WTRUs. As shown, an EC 1310 undergoes an augmentation 1303, which is shown as beam scenario 1300A transitioning to beam scenario 1300B as a result of the augmentation 1303. Initially, the pre-augmented EC 1310A has five base stations (e.g., 1311, 1312, 1313, 1314, 1315), and three of them are transmitting the existing beams 1301 (e.g., 1312, 1311, and 1315). Once augmentation 1303 occurs, the augmented EC 1310B has all five base stations (e.g., 1311-1315) transmitting beams, some of which are transmitting the existing beams 1301 and some of which are transmitting the new beams 1302 to generate the EC 1310B.

In some cases, there may be augmentation assisting system information in active ECs/BGs. On the activation of an EC/BG, a default sub-set of beams may be activated (e.g., as discussed herein). New/additional beams, such as inactive beams, may be activated via an augmentation procedure. To enable the activation of new/additional beams, DL signatures (e.g., specific sequences, which may be designed using pseudo-random sequences, Zadoff-Chu sequences, Golay sequences, or any other mathematical sequences) may be transmitted over the inactive beams. DL signatures may be transmitted to enable the WTRUs to indicate the presence of additional potential beams, as well as to measure the quality of those beams. This information may be used by the WTRU to determine if there is a need to activate any new beam on the current EC/BG (e.g., as discussed in further detail herein). DL signatures may be common to all the inactive beams for an EC/BG or may be common to a sub-set of inactive beams (e.g., multiple groups/sub-sets may be defined among the inactive beams) or may be beam-specific (e.g., a beam ID may be encoded within the sequence). Such DL signatures may be called Beam Presence Indications (BPIs). In one example, such DL signatures may be like NPIs.

In some cases, NPIs may only be transmitted over a default-set of active beams, whereas BPIs may be transmitted on all additional potential inactive beams only after the EC/BG is activated. BPIs may be transmitted periodically, where the periodicity of BPIs may be different (e.g., lower/higher) or same from the periodicity of the NPIs. BPIs may be used by the WTRUs that are camped-on the EC/BG.

The WTRU may receive the information related to BPIs of the EC/BG on which the WTRU is camped on from the network. Such information may be transmitted as augmentation related/assisting information/parameters from the network. The augmentation related information on the BPIs may comprise of at least one or more of the following parameters: number of beams; information of sequences used for BPIs (e.g., root IDs, cyclic shifts); and/or, scheduling information (e.g., timing information, such as periodicity, frame/sub-frame/slot/symbol information, frequency domain information, e.g., bandwidth, location in the frequency domain, etc.).

The WTRU may receive the information regarding power budget on the current active beams which, for example, may contain the information of available additional power budget that may be used for the active beams. This information may be used by the WTRUs to determine if there is a need to increase the power on the current active beams (e.g., as discussed in further detail herein). Such information may be common to all the active beams of the EC or may be BG specific (e.g., common to a BG) or may be beam or beam-set specific (e.g., a set of anchor and supported beams).

The information on the BPIs and/or the power budget of the current active beams may be transmitted to the WTRUs as augmentation related system information (e.g., as one of the other SI or part of the BSI). Such information may also be configured to the WTRUs via higher layer signaling (e.g., if the WTRU was operating in CONNECTED Mode with the EC/BG before).

Other augmented related information, such as the UL resources for sending UE/WTRU augmentation indications (UAIs/WAIs), may also be part of the augmentation related system information. Further details on UAIs are disclosed herein.

In some cases, there may be measurement criteria to initiate EC/BG augmentation. The WTRU may be configured to perform measurements for EC/BG augmentation. Criteria/rules using the measurements on the current EC/BG (e.g., on the current active beams of the current EC/BG) on which the WTRU is camped on may be used by the WTRU to trigger additional measurements for EC/BG augmentation. Similar rules/criteria defined for EC/BG reselection (as disclosed herein) may be applied/used by the WTRU for EC/BG augmentation. In one example, different (e.g., separate) minimum measurement thresholds may be configured for EC/BG augmentation, where the values of the thresholds for augmentation procedure may be higher or lower than the values of the thresholds configured for EC reselection procedure. For example, different values for $Thersh_{Resel}$ (or a threshold $Thersh_{aug}$ may be defined for the purpose of augmentation procedure), $Thersh_{visible}$, $N_{Min\_Vis\_Beam}$, $Thersh_{blockRate}$, M3, M4, M5, M6, $T_{meas\_trigECResel}$ (or a time duration $T_{meas\_trigECAug}$ may be defined for the purpose of augmentation procedure), $N_{meas\_trigECResel}$ (or a value $N_{meas\_trigECAug}$ may be defined for the purpose of augmentation procedure), and/or bias values for measurement threshold for the anchor beams compared to the values configured for EC/BG reselection may be configured to the WTRU for EC/BG augmentation procedure.

In some cases, there may be measurements and augmentation criteria. The WTRU may perform measurements on potential additional (e.g., inactive) beams of the current EC/BG (e.g., on which the WTRU is camped on) when the criteria to trigger EC/BG augmentation (as discussed herein) is satisfied.

The WTRU may perform measurements on the one or more current active beams of the current EC/BG (e.g., on which the WTRU is camped on). For example, on the '$n_{th}$' active beam (e.g., where 1<=n<=number of active beams or 1<=n<=number of active visible beams, where visible beam may refer to a beam for which the RSRP/RSRQ/etc. is above a minimum threshold, e.g., $Thersh_{visible}$), the WTRU may determine the final quality metric as $Q_{meas\_actBeamCurr\_n} = Q_{actBeamCurr\_n} + Q_{bias\_actBeamCurr\_n}$, where $Q_{actBeamCurr\_n}$ is the received signal quality (e.g., RSRP or RSRQ or any other received signal quality), $Q_{bias\_actBeamCurr\_n}$ is the measurement offset or bias or weight for the '$n_{th}$' active beam. The value of the measurement offset, bias or weight may be determined for example based on the available power budget for the beam (e.g., if the available power budget is high then a higher positive weight may be added to the measurement $Q_{actBeamCurr\_n}$) and/or speed dependent offset (e.g., configured for the current BG/EC as disclosed herein). The WTRU may perform such measurements on all the active beams or all the visible active beams.

In another example, if multiple beams are considered together to measure the received signal quality, for example, when the measurements are performed over the beam-sets (e.g., set of anchor beam and a number of supported beams) or any other group of beams, the received signal quality (e.g., $Q_{actBeamCurr\_n}$) may be determined based on the linear average of the measurements on different beams of the beam-set/group. In another example, when the beams are categorized into the sets of anchor beam and supported beams, only anchor beams (e.g., visible anchor beams) may be considered for the measurements.

In some instances, augmenting active beams may be considered versus activating new beams. The WTRU may perform measurements on the one or more potential additional (e.g., inactive) beams of the current EC/BG (e.g., on which the WTRU is camped on). The WTRU may use the BPIs transmitted over the inactive beams to make measurements. For example, on the '$n_{th}$' inactive beams (e.g., where $1<=n<=$number of inactive beams considered for the measurements), the WTRU may determine the final quality metric as $Q_{meas\_inactBCurr\_n} = Q_{inactBCurr\_n} + Q_{bias\_inactBCurr\_n}$, where $Q_{inactBCurr\_n}$ is the received signal quality (e.g., RSRP or RSRQ or any other received signal quality), $Q_{bias\_inactBCurr\_n}$ is the measurement offset or bias or weight for the '$n_{th}$' inactive beam. The value of the measurement offset, bias, or weight may be configured to the WTRU from the network, as well as any other offset, such as speed dependent offset (e.g., configured for the current BG/EC as described herein) may be added/subtracted/multiplied to the configured offset. The WTRU may perform such measurements on all the inactive beams or all the visible inactive beams (e.g., where visible inactive beam may refer to a beam for which the RSRP/RSRQ/etc. on the associated BPI is above a minimum threshold, e.g., Thersh$_{visible}$) or a sub-set of visible inactive beams.

If multiple inactive beams are considered together to measure the received signal quality, for example, when the inactive beams are combined into sub-sets/groups (e.g., BPIs are beam-set/group specific), received signal quality (e.g., $Q_{inactBCurr\_n}$) may be determined based on the linear average of the measurements on different beams of the beam-set/group.

The WTRU may compare the measurements on the inactive beams/beam-sets and the active beams/beam-sets to determine if one or more new beams/beam-sets need to be activated and/or one or more existing active beams need to be augmented. The WTRU may select one or more beams/beam-sets based on the measurement result (e.g., with highest measurement results) and may trigger the augmentation by sending one or more UAIs, as discuss in further detail herein.

The WTRU may be configured with a time interval (e.g., $T_{aug\_meas}$). Criteria for the selection of one or more beam/beam-sets may be evaluated over the duration of $T_{aug\_meas}$. The WTRU may select one or more beams/beam-sets for the augmentation for which criteria specified herein is satisfied over the duration of $T_{aug\_meas}$. The WTRU may perform multiple measurements over the duration of $T_{aug\_meas}$.

In another example, the WTRU may be configured with a number of minimum multiple measurements (e.g., $N_{meas\_Aug}$). The WTRU may make a minimum $N_{meas\_Aug}$ number of measurements (e.g., on each beam considered for the measurements) to evaluate the quality of each beam/beam-set. Averaged measurements over the multiple measurements may be used to evaluate the quality of each beam/beam-set.

In some instances, augmentation of the current EC/BG may be considered versus selection of a new active EC/BG versus activation of a new inactive EC/BG. The WTRU may determine triggering augmentation on the current EC/BG, camping-on another EC/BG, and/or activating one or more inactive ECs/BGs when for example, the criteria to trigger EC/BG augmentation (as discussed herein) is satisfied. The WTRU may determine triggering augmentation on the current EC/BG with or without activating one or more inactive ECs/BGs. The WTRU may determine camping-on another EC/BG with or without activating one or more inactive ECs/BGs.

The WTRU may perform measurements on the neighboring inactive ECs/BGs (if any), such as using NPIs transmitted by the inactive ECs/BGs. For example, on the '$n_{th}$' inactive EC/BG (e.g., where $1<=n<=$number of visible inactive ECs/BGs, where visible EC/BG may refer to an EC/BG for which the RSRP/RSRQ/etc. on at least one NPI is above a minimum threshold, e.g., Thersh$_{visible}$), the WTRU may determine the final quality metric as $Q_{meas\_inactNbg\_n} = Q_{inactNbg\_n} + Q_{bias\_inactNbg\_n}$, where $Q_{inactNbg\_n}$ is the received signal quality (e.g., RSRP/RSRQ/etc.), $Q_{bias\_inactNbg\_n}$ is the measurement offset or bias or weight for the '$n_{th}$' inactive EC/BG. The value of the measurement offset, bias, or weight may be configured to the WTRU from the network, for example, in terms of inter-EC/BG offset and/or additional offset associated with inactive ECs/BGs.

The WTRU may perform measurements on the neighboring active ECs/BGs (if any), such as using NPIs or EC/BG reference signals transmitted by the active ECs/BGs. For example, on the '$n_{th}$' active EC/BG (e.g., where $1<=n<=$number of visible active ECs/BGs, where visible EC/BG may refer to an EC/BG for which the RSRP/RSRQ/etc. on at least one beam is above a minimum threshold, e.g., Thersh$_{visible}$), the WTRU may determine the final quality metric as $Q_{meas\_actNbg\_n} = Q_{actNbg\_n} + Q_{bias\_actNbg\_n}$, where $Q_{actNbg\_n}$ is the received signal quality (e.g., RSRP/RSRQ/etc.), $Q_{bias\_actNbg\_n}$ is the measurement offset or bias or weight for the '$n_{th}$' active EC/BG. The value of the measurement offset, bias, or weight may be configured to the WTRU from the network, for example, in terms of inter-EC/BG offset.

If multiple beams are visible for neighboring inactive and/or active ECs/BGs, received signal quality (e.g., $Q_{inactNbg\_n}$ in case of inactive EC/BG and $Q_{actNbg\_n}$ in case of active EC/BG) may be determined based on the linear average of the measurements on different beams considered for the measurements.

The WTRU may compare the measurements performed for the augmentation on the current EC/BG, measurements on the neighboring inactive ECs/BGs (e.g., if available), and measurements on the neighboring active ECs/BGs (e.g., if available) to determine whether augmentation of the current EC/BG needs to be enabled, one or more new ECs/BGs need to be activated, and/or a new ECs/BGs needs to be selected.

Figure 14:
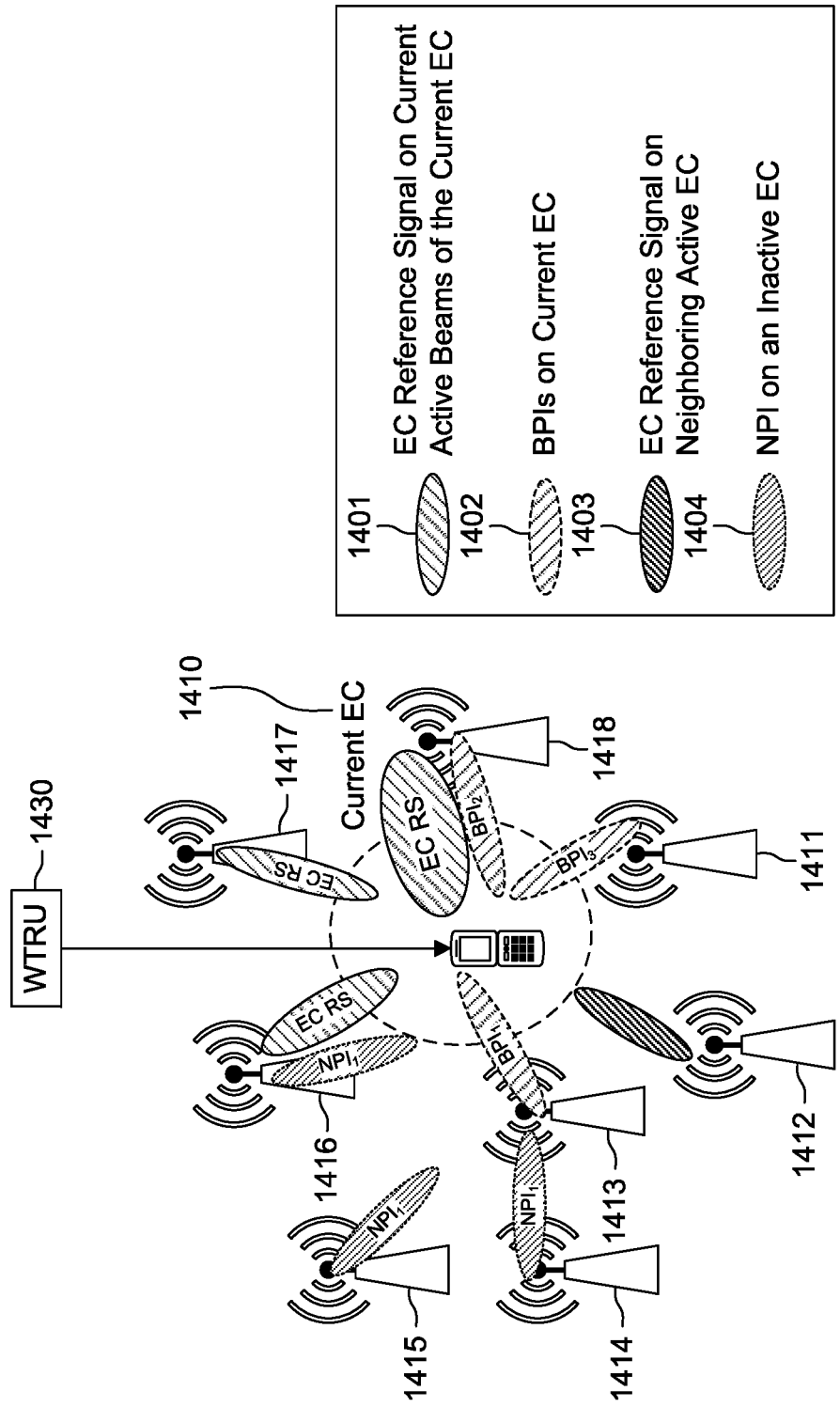
FIG. 14 illustrates an example of different possible WTRU measurements used to determine augmentation of current EC versus activation of a new EC versus selecting a new active EC.

FIG. 14 illustrates an example of different possible WTRU measurements. There may be an EC with base stations 1411-1418. As shown, WTRU 1430 may receive/measure one or more beams, such as 1401 EC reference signal(s) on current active beams of the current EC, 1402 BPIs on current EC, 1403 EC reference signal(s) on neighboring active EC, and/or 1404 NPI(s) on an inactive EC.

For the comparison with the measurements on the neighboring inactive ECs/BGs (if available), and measurements on the neighboring active ECs/BGs (if available), the WTRU may consider all the visible beams on the current EC/BG for measurements, including both active and inactive beams (e.g., potential additional beams), and may determine the received signal quality on the current EC/BG as the linear average of the measurements made on all visible beams. Speed dependent bias may be taken into account to determine the quality of the current EC/BG. The details of speed dependent bias may be disclosed further herein.

In another example, the number of visible beams satisfying the minimum measurement threshold criteria (e.g., measurement>$Thresh_{Sel}$ or a different threshold value may be configured to the WTRU for this purpose) may be considered as the quality metric (e.g., along with any bias/weight associated with each EC/BG) to compare the measurements for the augmentation on the current EC/BG, activation of new ECs/BGs, and/or camping-on a new EC/BG.

The WTRU may be configured with a time interval (e.g., $T_{aug\_meas}$). The WTRU may perform multiple measurements over the duration of $T_{aug\_meas}$. The value of the time duration (e.g., $T_{aug\_meas}$) may be scaled based on the WTRU's mobility state (e.g., as described herein).

The WTRU may trigger the augmentation by sending one or more UAIs when, for example, the measurement on the current EC/BG is the highest compared to the neighboring inactive and active ECs/BGs (if any) over the duration of $T_{aug\_meas}$. For the augmentation, the WTRU may compare the measurements on the inactive beams/beam-sets and the active beams/beam-sets of the current EC/BG to determine if one or more new beams/beam-sets need to be activated and/or one or more existing active beams need to be augmented as described herein.

The WTRU may camp-on a new active EC/BG when for example, the measurement on that active EC/BG is the highest compared to the current EC/BG and neighboring inactive active ECs/BGs (if any) over the duration of $T_{aug\_meas}$. The EC/BG selection criteria (as discussed herein) on the selected active EC/BG may need to be satisfied. Other EC/BG reselection criteria (as discussed herein) may also need to be considered for the selection of the new active EC/BG.

The WTRU may trigger the activation of a new inactive EC/BG when for example, the measurement on that EC/BG is the highest compared to the current EC/BG and neighboring active ECs/BGs (if any) over the duration of $T_{aug\_meas}$. In another example, the WTRU may trigger the activation of one or more inactive ECs/BGs when, for example, the measurement on those ECs/BGs are above a minimum configured threshold (e.g., $Thersh_{act}$, which may be configured by the network via SI or higher layer signaling during the CONNECTED state). The WTRU may trigger activation of one or more new inactive ECs along with the augmentation of current EC/BG or with camping-on a new active EC/BG. The WTRU may trigger the activation of an EC/BG by following the related procedure discussed herein.

In another example, the WTRU may be configured with a number of minimum multiple measurements (e.g., $N_{meas\_Aug}$). The WTRU may make minimum $N_{meas\_Aug}$ number of measurements (e.g., on each beam considered for the measurements) to evaluate the quality of each EC/BG. Average measurements over the multiple measurements may be used to evaluate the quality of each EC/BG. The value of the number of minimum measurements (e.g., $N_{meas\_Aug}$) may be scaled based on the WTRU's mobility state (as described herein).

FIG. 15 (FIGS. 15A, 15B, 15C, and 15D) illustrate an example of EC augmentation versus new EC selection versus new EC activation. FIG. 15B is the initial state of a plurality of ECs and a plurality of base stations transmitting the beams associated with those ECs; a WTRU may be in a current EC and there may be an evaluation of one or more other ECs (e.g., neighboring EC, active and/or inactive).

There may be several active beams, such as 1501 EC reference signal on current active beams of the current EC, 1502 BPI(s) on current EC, 1503 EC references signal(s) on a neighboring active EC, 1504 NPI(s) on an inactive EC, and/or 1505 EC reference signal(s) on a neighboring active EC. For the example of 15A, there may be an activation of a new EC. For the example of 15C, there may be a selection of a new EC. For the example of 15D, there may be an augmentation of the current EC. In all examples, the WTRU may start in the initial example state 15B camped on a current EC and there is neighboring active EC and a neighboring inactive EC.

In another example, the WTRU may also use the mobility pattern related data (e.g., history of WTRU's mobility pattern which may include the direction, speed, ECs/BGs selected and/or visible to WTRUs at different times, etc.), if available, to determine whether to augment the current EC/BG or activating a new EC/BG. The WTRU may determine to augment the current EC when, for example, based on the mobility pattern the WTRU determines that the WTRU is frequently moving out and moving back to the coverage of the current EC. Otherwise, the WTRU may determine to activate new ECs/BGs.

In some cases, the WTRU may send an augmentation indication and/or there may be an augmentation of an EC. For instance, there may be a WTRU procedure to send a WTRU augmentation indication. The WTRU may be configured with UL resources and/or sequences/signatures/preambles (e.g., sequences may be designed using pseudo-random sequences, Zadoff-Chu sequences, Golay Sequences, or any mathematical sequences) to send UAIs to request for the augmentation of the current EC/BG (e.g., on which the WTRU is currently camped-on) to the network. In one example, UAI sequence may be same as random access channel preambles. UL Resources and/or sequences for UAIs may be beam specific (e.g., one-to-one mapping between the beams and UAI resources and/or sequences), or beam-set specific (e.g., active as well as inactive beams may be categorized into different sets, and/or in sets of anchor and supported beams or any other grouping). The beam or beam-set identification may be determined by the WTRU from the BSI or Reference signals transmitted on the active beams, and from the BPIs transmitted on the inactive beams.

In one example, common UL resources (e.g., time-frequency resources) but with separate sequences (e.g., beam/beam-set specific sequences) may be configured. In such a case, in one example, common resources may be configured both for UPIs and UAIs but separate (e.g., orthogonal) UL sequences may be configured for UPIs and UAIs.

In another example, separate resources (e.g., beam/beam-set specific time-frequency resources) may be configured. In such a case, energy-based detection may be used at the network to detect UAIs from the WTRUs (e.g., WTRUs just need to illuminate the associated resources). In another example, a common UL sequence may be allocated, which may be detected at the network to detect any UAI transmission from the WTRUs.

Different (e.g., separate) resources and/or sequences may be allocated for a beam/beam-set for the different indications (e.g., increase power, increase beam-width, etc.).

The configuration related to UAIs (e.g., UL resources and/or sequences) where the information on UL resources may include the time-frequency resources and/or the time/frequency offset with respect to the transmission of the associated BPI (e.g., in case of inactive beams) or NPI/reference signal (e.g., in case of active beams), may be communicated to the WTRU via SI (e.g., as part of the augmentation related/assisting system information or any other SI) or via higher layer signaling if the WTRU was operating in a CONNECTED mode with the current EC/BG before. In another example, the UAI resource information indicating the time/frequency offset with respect to the transmission of the associated the BPI (e.g., in case of inactive beams) or NPI/reference signal (e.g., in case of active beams) may be contained within the BPI (e.g., in case of inactive beams) or NPI/reference signal (e.g., in case of active beams) transmissions (e.g., encoded within the associated sequences).

The WTRU may send one or more UAIs when, for example, the WTRU determines to trigger the augmentation of the current EC/BG. For example, the WTRU may send one or more UAIs for an inactive beam by using the associated UL resources and/or sequence when the WTRU determines to activate that inactive beam on the current EC/BG based on the measurement (e.g., as described herein). Similarly, in another example, the WTRU may send one or more UAIs for a currently active beam by using the associated UL resources and/or sequence when the WTRU determines to augment (e.g., request to increase the power) that beam (e.g., as described herein).

For each selected beam considered for the augmentation, the WTRU may transmit one or more UAIs using a spatial domain transmission filter (e.g., Tx beam). For example, for each selected beam considered for the augmentation, the WTRU may transmit one or more UAIs using a spatial domain transmission filter (e.g., Tx beam) corresponding to the spatial domain receive filter (e.g., Rx beam) used to perform measurement(s) (e.g., to receive a NPI or a reference signal in case of active beam or to receive BPI in case of inactive beam) on that beam. In another example, when a UAI is beam-set specific, the WTRU may be configured with additional information, such as which beam in the beam-set may be used as reference to determine the reference Rx beam. In one instance, the information about a reference beam may be encoded as a flag bit within the NPIs or reference signals transmitted in case of active beams and within the BPIs in case of inactive beams.

Figure 16:
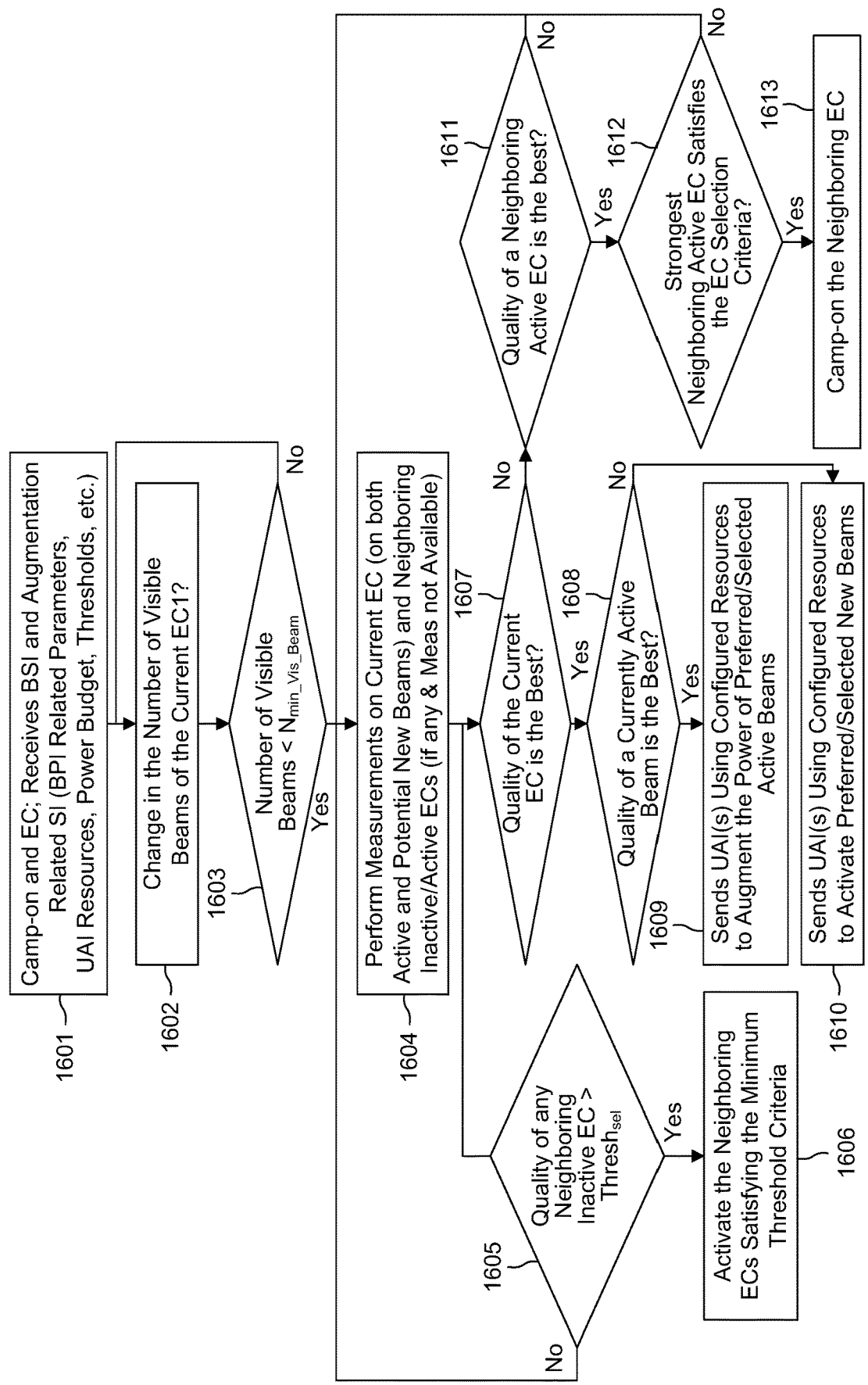
FIG. 16 illustrates an example of WTRU a procedure to determine EC augmentation versus a new EC selection versus activation of new ECs.

FIG. 16 is an example of a WTRU procedure to trigger the current EC augmentation, where after a measurement criteria on the current EC to initiate EC augmentation is satisfied (e.g., number of visible beams are lower a configured threshold $N_{min\_Vis\_Beam}$), the WTRU performs additional measurements on the current EC on active beams (e.g., using NPIs or EC reference signals) and the potential new beams (e.g., using BPIs). Initially, at 1601 the WTRU may be camped on an EC, where it may receive BSI and augmentation related SI (e.g., BPI related parameters, UAI resources, power budget, thresholds, etc.). At 1602, the WTRU may determine whether there is a change in the number of visible beams in the current EC (e.g., EC1). At 1603, the WTRU may determine whether the number of visible beams is less than some threshold (e.g., $N_{min\_vis\_beam}$): if no, the process may return to 1602; and, if yes proceeds to 1604. At 1604, the WTRU may perform measurements on the current EC (e.g., active and/or potential new beams) and neighboring inactive and active ECs (if any), if the recent measurements are not available. The WTRU may assess these measurements, and/or may compare the quality of the current EC with the quality of the active neighboring ECs. At 1607, if the WTRU determines that the quality of the current EC is the best, then the WTRU may then determine at 1608 whether the quality of the currently active beam is the best: if yes, at 1609 the WTRU may determine to augment the current EC by sending a UAI either for augmenting a currently active beam (e.g., increasing the power); if no, at 1610 the WTRU may send a UAI for activating a new beam based on the measurements. At 1611, if the WTRU determines that the quality of the neighboring active EC is the best, then at 1612 the WTRU may select the neighboring active EC with the best measurement if that EC satisfies the EC selection criteria, and then camp-on the neighboring EC at 1613; if the quality of the neighboring active EC is not the best, or if it is but doesn't satisfy the criteria, then the WTRU may repeat the assessment process at 1604. At 1605, the WTRU may also activate one or more neighboring inactive ECs if the measurements of those ECs satisfy the minimum quality threshold criteria, otherwise it may repeat the assessment process at 1604.

The WTRU may monitor for NPIs, EC/BG reference signals, and/or BSIs over the beam/beams for which the UAI(s) is/are sent when, for example, the UAI(s) is/are sent for activating new beams. For each UAI, the WTRU may monitor for NPIs, EC/BG reference signals, and/or BSIs using the same or different spatial domain receive filter (e.g., Rx beam) corresponding to the spatial domain transmission filter (e.g., Tx beam) used for the UAI transmission. The WTRU may be configured with a maximum time duration (e.g., $T_{retx\_UAI}$) The WTRU may re-send one or more UAIs later, for example when after sending a UAI, the WTRU does not receive any NPI, EC/BG reference signals, and/or BSI during the duration of $T_{retx\_UAI}$. The re-transmission may be performed using the same or different transmission power (e.g., higher transmission power compared to the previous transmission). The re-transmission may be performed using the same or different Tx beam used for the previous transmission. The resources for the UAI re-transmission and/or the value of $T_{retx\_UAI}$ may be communicated to the WTRU via SI (e.g., as part of the augmentation related/assisting system information or any other SI), for example, UAI resources may be periodic for, where the value of the periodicity may also be contained within the SI. The WTRU may use the next available configured periodic resource to re-send a UAI. The WTRU may re-send the UAI using the same or different (e.g., randomly selected) UL sequence used for the previous transmission.

In some instances, there may be a network procedure to augment an EC/BG. The network may augment (e.g., enhance) an EC/BG, for example upon reception of a UAI. For example, the network may activate a new beam/beamset after receiving a UAI associated with that new beam/beam-set. In another example, the network may increase the transmit power of a currently active beam/beam-set after receiving a UAI associated with that currently active beam/beam-set.

Upon the augmentation of an EC/BG by activating one or more new beams, BSI of the EC/BG (e.g., and/or other SIs containing the information, for example, number of beams, etc.) may be updated. Updated SIs (e.g., BSI and/or other SIs) may be transmitted after the augmentation. Indication of the SI modification may be transmitted by the network to the WTRUs.

Figure 17:
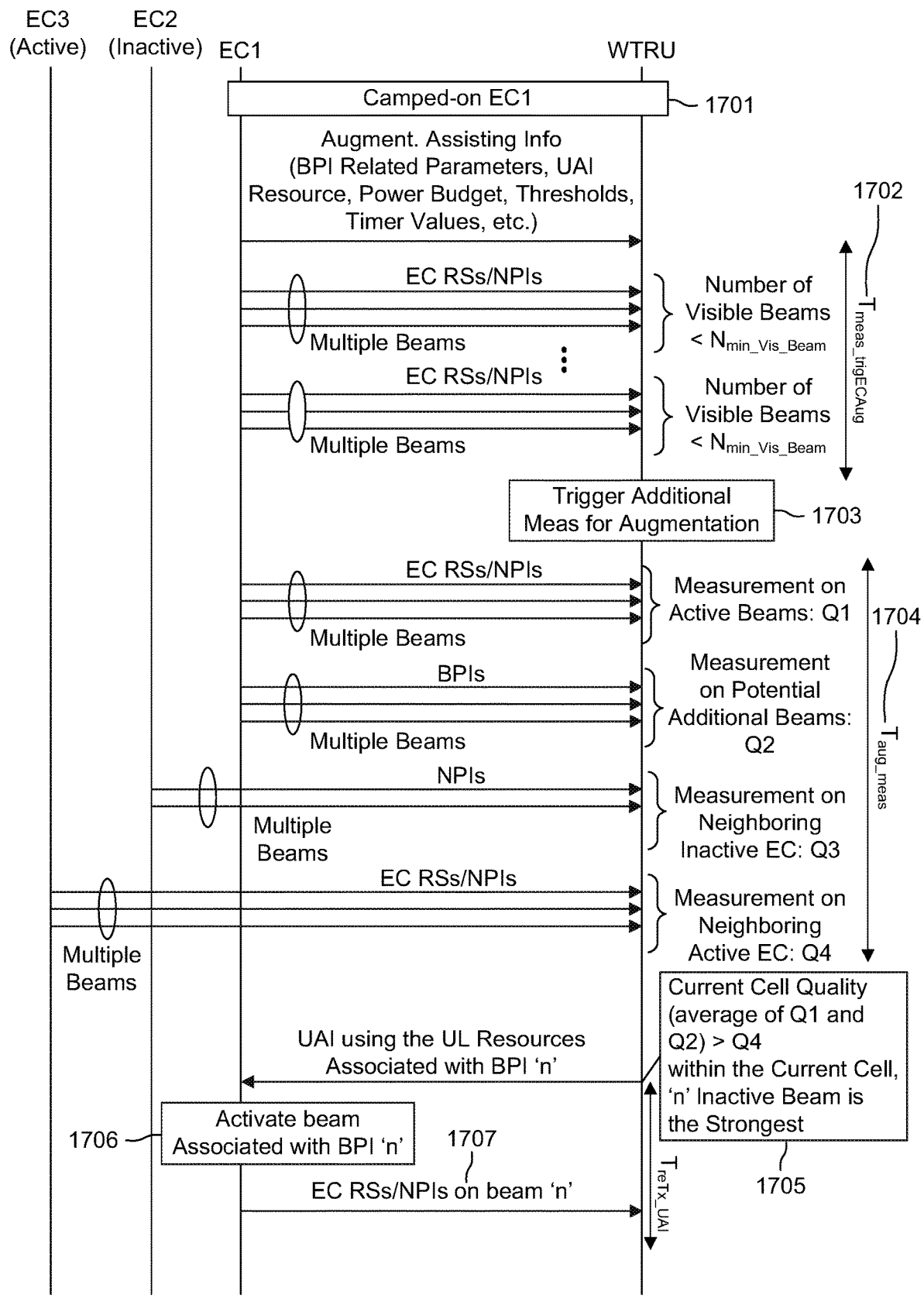
FIG. 17 illustrates an example of a WTRU procedure for EC augmentation.

FIG. 17 is an example embodiment describing a method performed by a WTRU to support augmentation of an EC/BG. Initially, there may be an EC1 where a WTRU is camped, and there may be other ECs, such as EC3 (e.g., inactive) and EC2 (e.g., active). The WTRU (e.g., camped on EC1) may receive (e.g., may be configured with) configuration information containing number of potential additional beams, configuration for BPI sequences, BPI scheduling information, power budget of the active beams, UL resource/sequence configuration for UAIs, one or more quality thresholds, different measurement bias values (for the active, inactive beams, for the inactive ECs/BGs, inter-EC/BG bias, for the current EC/BG, speed dependent bias), parameters to identify mobility state, one or more timer values, etc. At 1702, the WTRU may take measurements using the EC RSs/NPIs.

At 1703, the WTRU may initiate additional measurements for EC augmentation when the number of active visible beams on the current EC/BG is below a minimum quality threshold ($N_{min\_Vis\_Beam}$ number of beams) for the duration of $T_{meas\_trigECAug}$.

At 1704, the WTRU may determine the measurement quality of one or more potential additional beams using the measurements on the associated BPIs and measurement bias values (e.g., if configured). The WTRU may determine the measurement quality of one or more active beams of the current EC/BG using the measurements on the associated NPIs and measurement bias values (e.g., if configured). The WTRU may determine the measurement quality of one or more neighboring active and/or inactive ECs/BGs (e.g., if any) using the measurements on associated NPIs or EC/BG reference signals and measurement bias values (e.g., if configured).

At 1705, the WTRU may select one or more beams (e.g., "n" inactive beam, currently active, and/or potential additional beams) of the current EC/BG for augmentation based on the measurement quality when the quality of the current EC/BG is greater than the quality of the neighboring ECs/BGs over the duration of $T_{aug\_meas}$. The WTRU may send one or more UAIs using the configured resources associated with the selected one or more beams.

At 1706, the network may activate the selected one or more beams, based on the one or more UAIs.

At 1707, the network may have the EC send RS(s)/NPI(s) on the selected one or more beams.

For the example of FIG. 17, one or more of the following actions may be performed by the WTRU: Determining an active beam is visible when the received signal quality on the beam is above $Thresh_{visible}$; Initiating additional measurements for EC augmentation when the received signal qualities on all the active visible beams are below a minimum threshold (e.g., $Thresh_{aug}$); Initiating additional measurements for EC augmentation when the number of active visible beams with received signal quality above $Thresh_{aug}$ is below a minimum threshold (e.g., M3 number of beams); Initiating additional measurements for EC augmentation when the number of visible anchor beams with received signal quality above $Thresh_{aug}$ is below a minimum threshold (e.g., M4 number of beams) when for example, the beams are categorized in one or more sets of anchor and supported beams; Initiating additional measurements for EC augmentation when the number of visible beam sets (anchor beams and minimum number of configured, e.g., M6 supported beams) with received signal quality above $Thresh_{aug}$ is below a minimum threshold (e.g., M5 number of sets) when for example, the beams are categorized in one or more sets of anchor and supported beams; Initiating additional measurements for EC augmentation when the blockage rate of one or more specific beams (e.g., best beam or anchor beam) is/are above a maximum threshold (e.g., $Thresh_{blockRate}$); Making minimum $N_{meas\_trigECAug}$ number of measurements (e.g., on each beam considered for the criteria) and taking average measurements over the multiple measurements to evaluate the criteria for initiating additional measurements for EC augmentation; Making measurement on an active beam using the associated NPI or EC/BG reference signal transmitted over that beam; Determining the quality of the neighboring inactive ECs/BGs using the measurements on the associated one or more NPIs and configured bias values (e.g., inactive ECs/BGs, inter-EC related measurement bias values); Determining the quality of the neighboring active ECs/BGs using the measurements on the associated one or more NPIs or EC/BG reference signals and configured inter-EC related measurement bias values; Determining the quality of the current EC/BG by considering measurements on visible active as well as potential additional beams for the comparison with the quality of the neighboring active/inactive ECs/BGs; Determining the quality of an EC/BG by using linear average of the measurements made over the multiple beams for the inter-EC quality comparison; Determining the quality of an EC/BG using the number of visible beams satisfying the minimum measurement threshold (e.g., measurement> $Thresh_{Sel}$) for the inter-EC quality comparison; Determining the mobility state based on the rate of EC/BG reselections using the configured parameters of number of EC/BG reselections and the time duration; Determining the speed dependent bias/offset for the current EC/BG based on the WTRU's mobility state; Scaling the time duration (e.g., $T_{aug\_meas}$) over which the multiple measurements need to be made based on the WTRU's mobility state; Selecting a new active EC/BG when the quality of that EC/BG is greater than the quality of the current EC/BG over the duration of $T_{aug\_meas}$ and the criteria of EC selection is satisfied; Making minimum $N_{meas\_Aug}$ number of measurements (e.g., on each beam considered for the measurement) and taking average measurements over the multiple measurements to evaluate the quality of each EC/BG for EC/BG augmentation; Scaling the $N_{meas\_Aug}$ based on the WTRU's mobility state; Activating one or more new inactive ECs/BGs when the measurement on those ECs/BGs are above a minimum configured threshold (e.g., $Thresh_{act}$); Sending a UAI using a sequence selected randomly from the configured set of sequences (if any) over the configured UL resources; and/or, Re-sending a UAI if no NPI or BSI or EC/BG reference signals is received within the duration of $T_{retx\_UAI}$.

In one example, a method may be performed by the network (e.g., a node in the network, a functional entity, a virtual entity, etc.) to enable EC/BG augmentation comprising one or more of the following actions: Sending augmentation assisting information comprising of number of potential additional beams, sequence and resource (scheduling) configuration for BPIs, power budget for the active beams, resource and sequence (if any) configuration for UAIs, etc. via system information; Sending BPIs on the potential additional beams according to the configured schedule and using the allocated sequences (if any); Activating one or more additional beams upon reception of associated UAI/UAIs; Increasing the power for the transmission on an already activated beam upon reception of associated UAI/UAIs; and/or, update one or more SIs upon the augmentation. In this example, there may be one or more additional features/actions, such as: Sending augmentation assisting information via higher layer signaling (e.g., RRC); Sequences for BPIs may be configured as beam or beam-set specific; UAI resources and sequences (if any) may configured as beam or beam-set specific; and/or, updated SIs (e.g., BSI and/or other SIs) may be transmitted after the augmentation for which the indication of the SI modification may be transmitted to the WTRUs.

Figure 18:
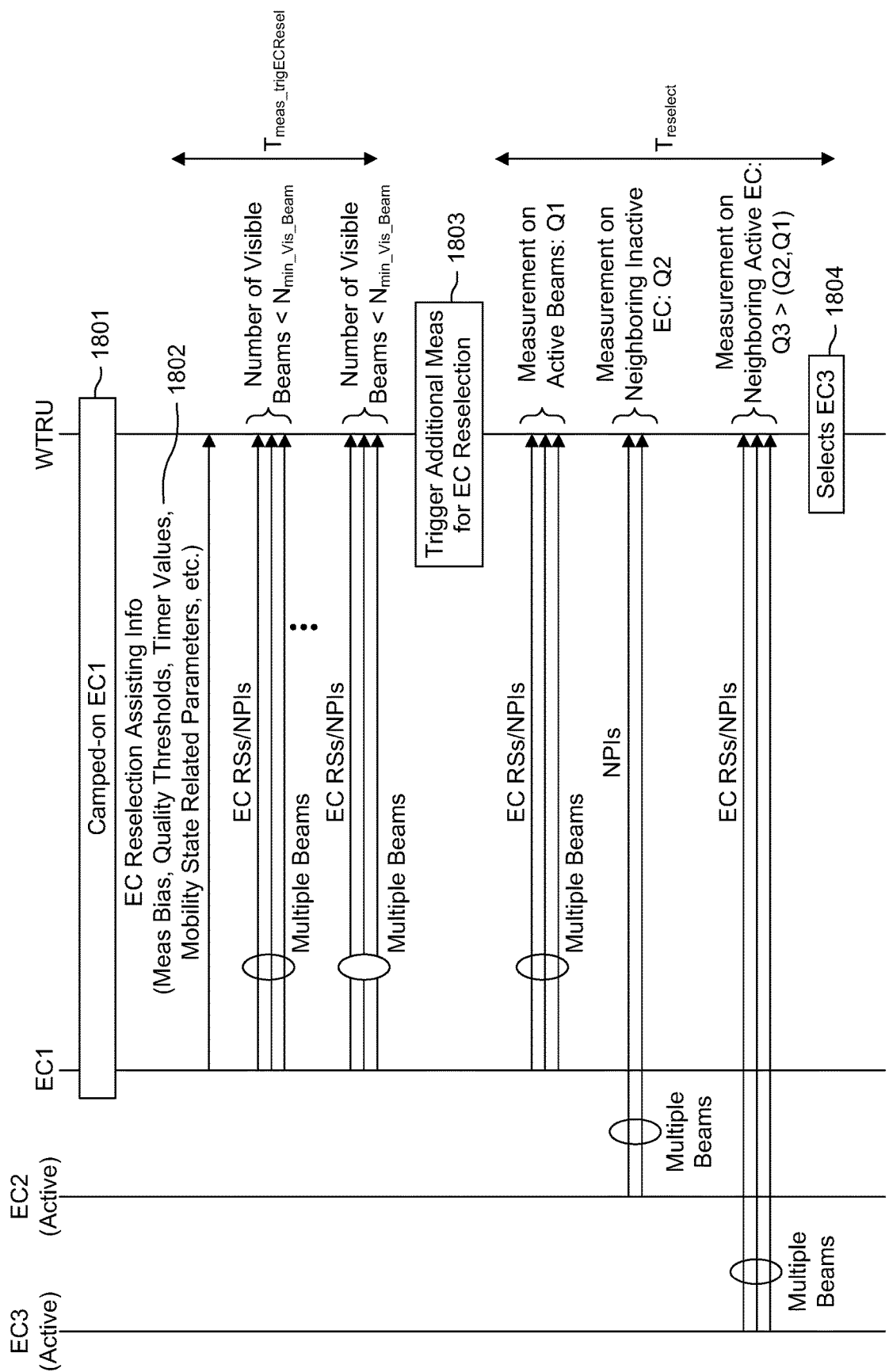
FIG. 18 illustrates an example of WTRU procedure for EC reselection.

FIG. 18 illustrates an example method performed by a WTRU to support EC/BG Reselection according to one or more techniques discussed herein. Initially, at 1801 the WTRU may be camped on EC1, where there is other ECs, such as EC3 (e.g., active) and EC2 (e.g., active). At 1802, the WTRU may receive configuration information comprising one or more quality thresholds, different measurement bias values (e.g., inter-EC/BG bias, for the current EC/BG, speed dependent bias, for the inactive ECs/BGs, etc.), parameters to identify mobility state, one or more timer values, etc. The may take one or more measurements of the current EC1. At 1803, the WTRU may initiate additional measurements for EC Reselection when the number of active visible beams on the current EC/BG is below a minimum quality threshold (e.g., $N_{min\_Vis\_Beam}$ number of beams) for the duration of $T_{meas\_trigECResel}$. The WTRU may determine the measurement quality of the current and one or more neighboring active ECs/BGs (if any) using the measurements on associated NPIs or EC/BG reference signals and measurement bias values (if configured). The WTRU may determine the measurement quality of one or more neighboring inactive ECs/BGs (if any) using the measurements on associated NPIs and measurement bias values (if configured). The WTRU may rank the ECs/BGs based on the measurement quality of each EC/BG. At 1804, the WTRU may select an active EC/BG providing the best measurement quality for the duration of $T_{reselect}$ and satisfying the EC/BG selection criteria.

For the example shown in FIG. 18, there may be one or more additional actions/parameters/conditions, as follows: Determining an active beam is visible when the received signal quality on the beam is above $Thresh_{visible}$; Initiating additional measurements for EC Reselection when the received signal qualities on all the active visible beams are below a minimum threshold (e.g., $Thresh_{Resel}$); Initiating additional measurements for EC Reselection when the number of active visible beams with received signal quality above $Thresh_{Resel}$ is below a minimum threshold (e.g., M3 number of beams); Initiating additional measurements for EC Reselection when the number of visible anchor beams with received signal quality above $Thresh_{Resel}$ is below a minimum threshold (e.g., M4 number of beams) when for example, the beams are categorized in one or more sets of anchor and supported beams; Initiating additional measurements for EC Reselection when the number of visible beam sets (e.g., anchor beams and minimum number of configured, such as M6 supported beams) with received signal quality above $Thresh_{Resel}$ is below a minimum threshold (e.g., M5 number of sets) when for example, the beams are categorized in one or more sets of anchor and supported beams; Initiating additional measurements for EC Reselection when the blockage rate of one or more specific beams (e.g., best beam or anchor beam) is/are above a maximum threshold (e.g., $Thresh_{blockRate}$); Making minimum $N_{meas\_trigECResel}$ number of measurements (e.g., on each beam considered for the criteria) and taking average measurements over the multiple measurements to evaluate the criteria for initiating additional measurements for EC Reselection; Making measurement on an active beam using the associated NPI or EC/BG reference signal transmitted over that beam; Determining the quality of the neighboring active ECs/BGs using the measurements on the associated one or more NPIs or EC/BG reference signals and configured inter-EC related measurement bias values; Determining the quality of the current EC/BG using the measurements on the associated one or more NPIs or EC/BG reference signals and the measurement bias values (e.g., speed dependent bias, any other configured bias for the current EC/BG, etc.); Determining the quality of the neighboring inactive ECs/BGs using the measurements on the associated one or more NPIs and configured bias values (e.g., inactive ECs/BGs, inter-EC related measurement bias values); Determining the quality of an EC/BG by using linear average of the measurements made over the multiple beams for the inter-EC quality comparison; Determining the quality of an EC/BG using the number of visible beams satisfying the minimum measurement threshold (e.g., measurement>$Thresh_{Sel}$) for the inter-EC quality comparison; Determining the mobility state based on the rate of EC/BG reselections using the configured parameters of number of EC/BG reselections and the time duration; Determining the speed dependent bias/offset for the current EC/BG based on the WTRU's mobility state; Selecting a new active EC/BG which is the best over the duration of $T_{reselect}$ (e.g., for which the EC selection criteria is satisfied) and the WTRU has elapsed a min time duration of $T_{min}$ on the current EC; Scaling the time duration (e.g., $T_{reselect}$) based on the WTRU's mobility state; Making minimum $N_{meas\_Resel}$ number of measurements (e.g., on each beam considered for the measurement) and taking average measurements over the multiple measurements to evaluate the quality of each EC/BG for EC/BG Reselection; Scaling the $N_{meas\_Resel}$ based on the WTRU's mobility state; and/or, Activating one or more new inactive ECs/BGs when the measurement on those ECs/BGs are above a minimum configured threshold (e.g., $Thresh_{act}$).

According to one or more techniques described herein, there may be a method performed by a WTRU to perform initial EC selection comprising at least one of the following actions. The WTRU may monitor for EC/BG Reference Signals over one or more beams of the one or more active ECs/BGs. The WTRU may select an EC/BG for which the received signal quality measurement (e.g., RSRP/RSRQ/etc.) over at least one set comprising of an anchor beam and a minimum M2 number of associated supported beams are all above a minimum threshold (e.g., $Thresh_{Sel}$). The WTRU may receive the value of $T_{max\_pi}$, resources configuration, and/or sequence configuration (if any) for KAIs via SI (e.g., BSI). The WTRU may send KAIs (e.g., at least one KAI) within each $T_{max\_pi}$ using the configured resources.

For the example method for initial EC selection (e.g., above), one or more of the following may apply: Monitoring for NPIs over one or more beams of the one or more active ECs/BGs for an EC/BG selection; Performing measurements only with the ECs/BGs for selection for which the PLMN ID is valid for the WTRU, where PLMN ID is received within the associated BSI; Selecting an EC/BG for which the received signal quality measurements over at least M1 (>=1) number of associated active beams are above a minimum threshold ($Thresh_{Sel}$); Selecting an EC or BG for which the received signal quality measurements over at least one anchor beam is above a minimum threshold (e.g., $Thresh_{Sel}$); Selecting an EC or BG for which the received signal quality measurement for more than one sets are above minimum threshold, where for each set, measurement criteria over the anchor beam and a minimum M2 number of associated supported beams may be satisfied (e.g., Different criteria, for example, in terms of minimum number of supported beams and/or minimum measurement thresholds (for anchor and/or supported beams) may be used for different sets); Determining if a beam is an anchor beam or a supported beam using the EC/BG Reference Signals detected on the beam; Beam-based biasing may be used, where, anchor beam may be given more weight by using a larger minimum measurement threshold for the anchor beam (e.g., $Thresh_{SelAnchor}=Thresh_{Sel}+Q_{bias\_anchor}$) compared to the supported beams (e.g., $Thresh_{SelAnchor}=Thresh_{Sel}$), where $Q_{bias\_anchor}>0$ (in linear scale); Receiving the configuration for EC selection (e.g., value of M1, minimum threshold Thresh$_{Sel}$, value of minimum number of supported beams for one or more sets, beam-based bias values via SI (e.g., BSI); Sending KAIs (e.g., at least one KAI) within each T$_{max\_pt}$ using the configured resources and sequence (if any) associated with its best beam if beam specific resources/sequences are allocated for KAIs, where best beam for the KAI transmission may be the beam over which the WTRU receives EC/BG reference signals and/or NPI (e.g., if NPIs are transmitted over active EC/BG) with the highest received signal quality.

The WTRU may acquire SI, for example, upon the activation of an inactive EC, upon the selection (e.g., camping-on) of a new active EC, upon the augmentation an EC (e.g., if the augmentation is requested by the WTRU), and/or upon receiving an indication that the system information has changed. In case an EC comprises multiple BGs, the WTRU may acquire SI upon the activation of an inactive BG, upon the augmentation of a BG (e.g., if the augmentation is requested by the WTRU), and/or upon the selection of a new active BG.

The network may transmit SI in a hierarchical manner. The network may utilize the hierarchy of the cell architecture to efficiently transmit the SI to the WTRUs where, for example, a SC may comprise of multiple ECs, and/or an EC may comprise of multiple BGs. SI common to a lower level of hierarchy may be transmitted at a higher level of the hierarchy. For example, SI common to all BGs of an EC may be transmitted at the associated EC level. Similarly, SI common to all ECs of a SC may be transmitted at the associated SC level.

Such approaches of SI transmission may be valid for other deployment scenarios. For example, a SC/EC may be a separate physical cell than the associated one or more ECs/BGs operating on the same or different carrier frequency.

Common SI to all ECs that may be transmitted at the SC level may comprise of, for example, associated SC ID information, EC selection information (e.g., measurement thresholds, and/or beam-based biasing values, other parameters etc.), EC reselection information (e.g., one or more measurement quality thresholds, one or more time values, measurement bias/offsets values, mobility related parameters, etc.), ETWS/CMAS notification related information, GPS time and UTC related information, parameters for connection establishment failure control, WTRU timers (e.g., t300, t301, t310, t311, etc.), common access control parameters, etc.

EC specific SI may comprise of, for example, EC ID information, associated SC ID, number of associated beams and/or beam-groups, number of associated beam-sets (e.g., set of anchor and supported beams), augmentation related information (number of potential additional beams, BPI sequence information, scheduling information of BPIs, configuration of UAIs, etc.), EC specific reference signal scheduling information, access related information for this cell, paging related parameters, system frame number, common EC-specific DL configuration (e.g., bandwidth, sub-carrier spacing, common configuration for control/shared channel, etc.), common EC-specific UL configuration (e.g., bandwidth, sub-carrier spacing, common configuration for control/shared channel, random access channel configuration, etc.), etc.

One or more EC specific SI information mentioned herein (e.g., DL/UL configuration information which may be common to all the ECs) may be common to all ECs and may be transmitted at the SC level. One or more common SI information mentioned herein may be specific to ECs and may be transmitted at the respective ECs.

In case of an EC comprising of one or more BGs, BG specific SI may comprise of, for example, BG ID information, associated EC ID, number of associated beams and/or beam-groups, number of associated beam-sets (e.g., set of anchor and supported beams), augmentation related information (number of potential additional beams, BPI sequence information, scheduling information of BPIs, configuration of UAIs, etc.), BG specific reference signal scheduling information, system frame number, etc.

Common SI to all BGs that may be sent at the EC level may comprise of, for example, paging related parameters, common EC-specific DL configuration (e.g., bandwidth, sub-carrier spacing, common configuration for control/shared channel, etc.), common EC-specific UL configuration (e.g., bandwidth, sub-carrier spacing, common configuration for control/shared channel, random access channel configuration, etc.), etc.

One or more BG specific SI information mentioned herein may be common to all BGs and may be transmitted at the EC or SC level. One or more common SI to all BGs mentioned herein may be specific to BGs and may be transmitted at the respective BGs.

A sub-set of common SI to all ECs/BGs may be sent as a part of the BSI (e.g., may be defined as common-BSI) of the associated SC/EC. Remaining part of the common SI to all ECs/BGs, such as common SI which is not sent in the BSI of the SC, may be sent as a part of the other SI (e.g., may be defined as common-other SI) of the associated SC/EC.

After the activation of an EC/BG, the network may start transmitting the associated EC/BG BSI (e.g., periodically) as described in herein. The WTRU may acquire the BSI of the selected EC/BG.

BSI containing at least the common-BSI at the SC/EC level may be configured to be transmitted as periodic broadcast information and/or as on-demand/on-request broadcast/unicast information.

Figure 19:
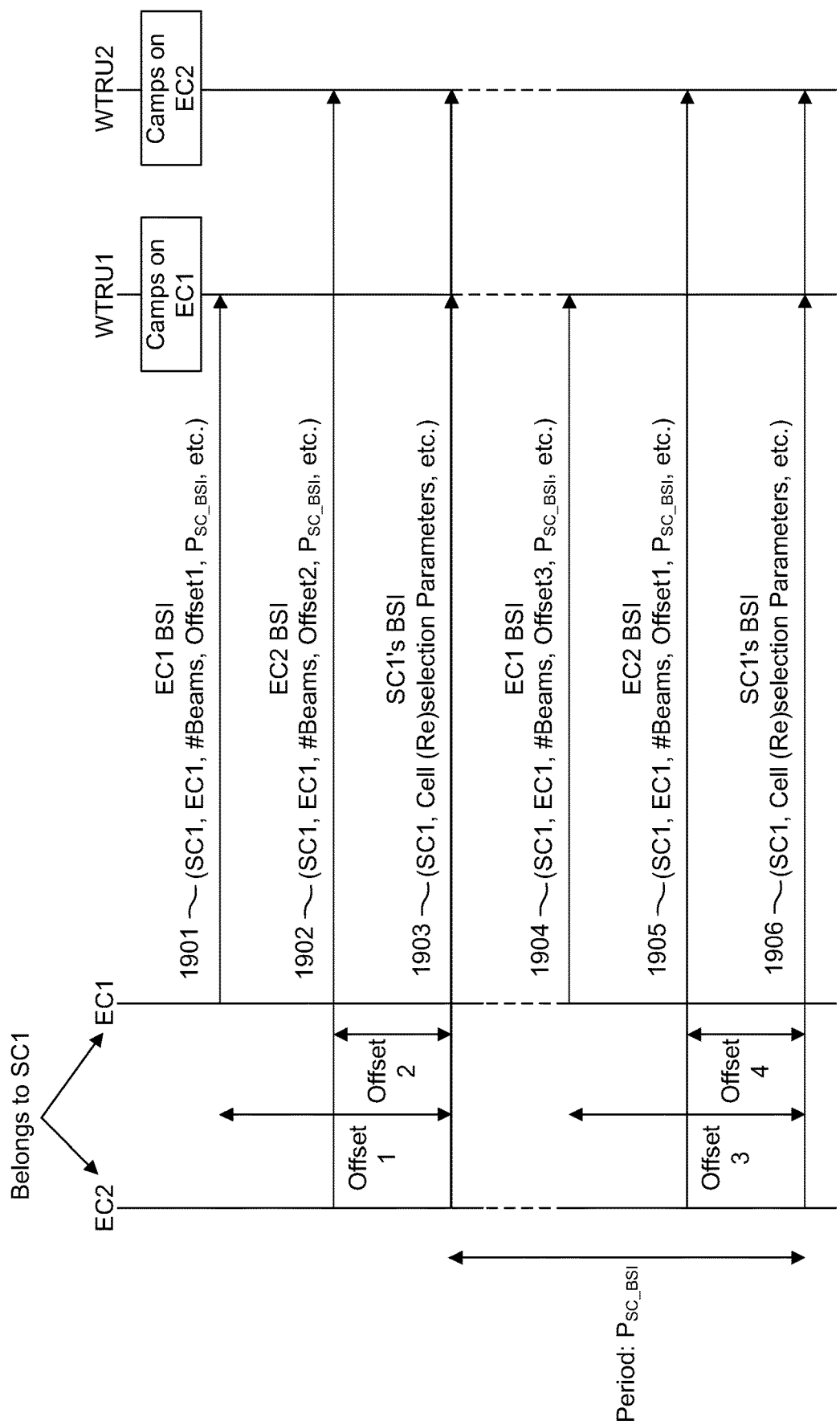
FIG. 19 illustrates an example of periodic common-BSI transmission at the SC.

In one approach, BSI containing at least the common-BSI at the SC/EC level may be transmitted periodically. The BSI at the EC/BG level may indicate the scheduling information of the BSI at the SC/EC level. FIG. 19 illustrates an example where EC1 and EC2 belong to the same SC (e.g., SC1). In the example, WTRU1 camps on EC1 and WTRU2 camps on EC2. At 1901/1902, the BSI of the EC1/EC2 may be transmitted to WTRU1/WTRU2 respectively, and may comprise scheduling information for the BSI transmission at the SC, where the scheduling information may include one or more of: the offset information (e.g., time/frequency offset for the transmission of the SC BSI with respect to the transmission of the EC BSI), periodicity of the SC BSI (e.g., P$_{SC\_BSI}$), etc. Once received, the BSI from the EC(s) may be used to receive the BSI from the SC at 1903. At 1904/1905/1906 the process may occur again if it was unsuccessful the first time.

The WTRU after camping-on an EC/BG, may acquire the EC BSI (BG BSI). The WTRU may acquire the SC BSI (EC BSI) using the scheduling information of the SC BSI (EC BSI) given in the EC BSI (BG BSI). The WTRU may acquire the SC BSI (EC BSI) when, for example, the WTRU did not acquire the SC BSI (EC BSI) for the same SC (EC) recently. A time period, such as an expiration time duration (e.g., Exp$_{TSC\_BSI}$ (Exp$_{TEC\_SSI}$)) may be configured to the WTRU, such as via SC BSI (EC BSI) or EC BSI (BG BSI). The WTRU may acquire the SC BSI (EC BSI) when, for example, the WTRU did not receive the SC BSI (EC BSI) for the same SC (EC) in the last Exp$_{TSC\_BSI}$ (Exp$_{TEC\_BSI}$)

duration. The WTRU may acquire the SC BSI (EC BSI) when, for example, the WTRU has selected or moved to another EC (BG) belonging to the same SC (EC) and the WTRU did not receive the SC BSI (EC BSI) either being on the newly selected EC (BG) or while being on the previously selected EC (BG) in the last $\text{Exp}_{TSC\_BSI}$ ($\text{ExpT}_{EC\_BSI}$) duration.

In another approach, BSI containing at least the common-BSI at the SC (EC) level may be transmitted on an on-demand/request basis. The configuration to send a SI request, which may contain the resource configuration (e.g., time-frequency scheduling information, e.g., periodicity, frame/sub-frame/slot/symbol numbers, beam association such as a mapping between the DL beams and the UL resources, etc.), and/or configuration of UL sequences (e.g., a set/pool of sequences may be configures to mitigate the collisions among the WTRUs of the same ECs/BGs or of the different ECs/BGs, etc.), etc., may be contained within the BSI of the EC (BG). A value of time window (e.g., $T_{win\_SCBSI}$ ($T_{win\_ECBSI}$)) may also be configured within which the requested SC BSI (EC BSI) may expected to be received by the WTRU after sending a request. The information of frequency domain where the SC BSI (EC BSI) may be transmitted, which may be for example, an offset compared to the frequency location of the EC (BG) BSI or absolute information of the resource location may be configured within the EC (BG) BSI.

The WTRU after camping-on an EC/BG, may acquire the EC BSI (BG BSI). The WTRU may acquire the SC BSI (EC BSI) using the configuration for SI request given in the EC BSI (BG BSI). In one example, the WTRU may send a SI request just by illuminating the configured UL resources, such as when energy-based detection is used at the network side to detect a SI request. In another example, the WTRU may request SI by sending an UL sequence (e.g., select a sequence randomly in case of a set/pool of sequences is configured, where sequences may be designed using any of pseudo-random sequences, Zadoff-Chu sequences, Golay sequences, or any mathematical sequences) using the configured UL resources. In case of beam specific UL resources, the WTRU may use the UL resources associated with the best beam of the current EC (BG) or associated with the beam over which the EC BSI (BG BSI) containing the configuration of SI request is received. The WTRU may use same or different spatial domain transmission filter (e.g., Tx beam) corresponding to the spatial domain receive filter (e.g., Rx beam) used to receive the best beam of the current EC (BG) or used to receive the beam over which the EC BSI (BG BSI) containing the configuration of SI request is received.

The network may transmit SC BSI (EC BSI) upon the reception of a SI request on an EC (BG). The network may transmit the SC BSI on only the EC (BG) over which the SI request was received. The network may transmit the SC BSI (EC BSI) on only the Tx beam associated with the Rx beam over which the SI request was received. In another example, the network may transmit the SC BSI (EC BSI) on all the active beams of the EC (BG) over which the request was received. In another example, the network may transmit the SC BSI (EC BSI) over all the active beams of all the active ECs (BGs) associated with the SC (EC).

The WTRU may monitor for SC BSI (EC BSI) on the configured frequency domain locations for the duration of $T_{win\_SCBSI}$ ($T_{win\_ECBSI}$) after sending a SI request to acquire SC BSI (EC BSI). The WTRU may monitor for SC BSI using the same or different Rx beam(s) associated with the Tx beam used to transmit the SI request. The WTRU may re-send the request when, for example, the WTRU does not receive any SC BSI (EC BSI) over the duration of $T_{win\_SCBSI}$ ($T_{win\_ECBSI}$) after sending a SI request to acquire SC BSI (EC BSI). The re-transmission may be performed using same or different transmission power (e.g., higher transmission power compared to the previous transmission). The re-transmission may be performed using same or different Tx beam used for the previous transmission. The WTRU may re-send the request using the next available configured UL resource. The WTRU may re-send the request using the same or different (e.g., randomly selected) UL sequence used for the previous transmission.

The WTRU may send a SI request to acquire the SC BSI (EC BSI) when, for example, the WTRU did not acquire the BSI for the same SC (EC) recently. An expiration time duration (e.g., $\text{ExpT}_{SC\_BSI}$ ($\text{ExpT}_{EC\_BSI}$)) may be configured to the WTRU, for example within the EC BSI (BG BSI). The WTRU may send a SI request to acquire the SC BSI (EC BSI) only if the BSI of the same SC (EC) has expired.

Figure 20:
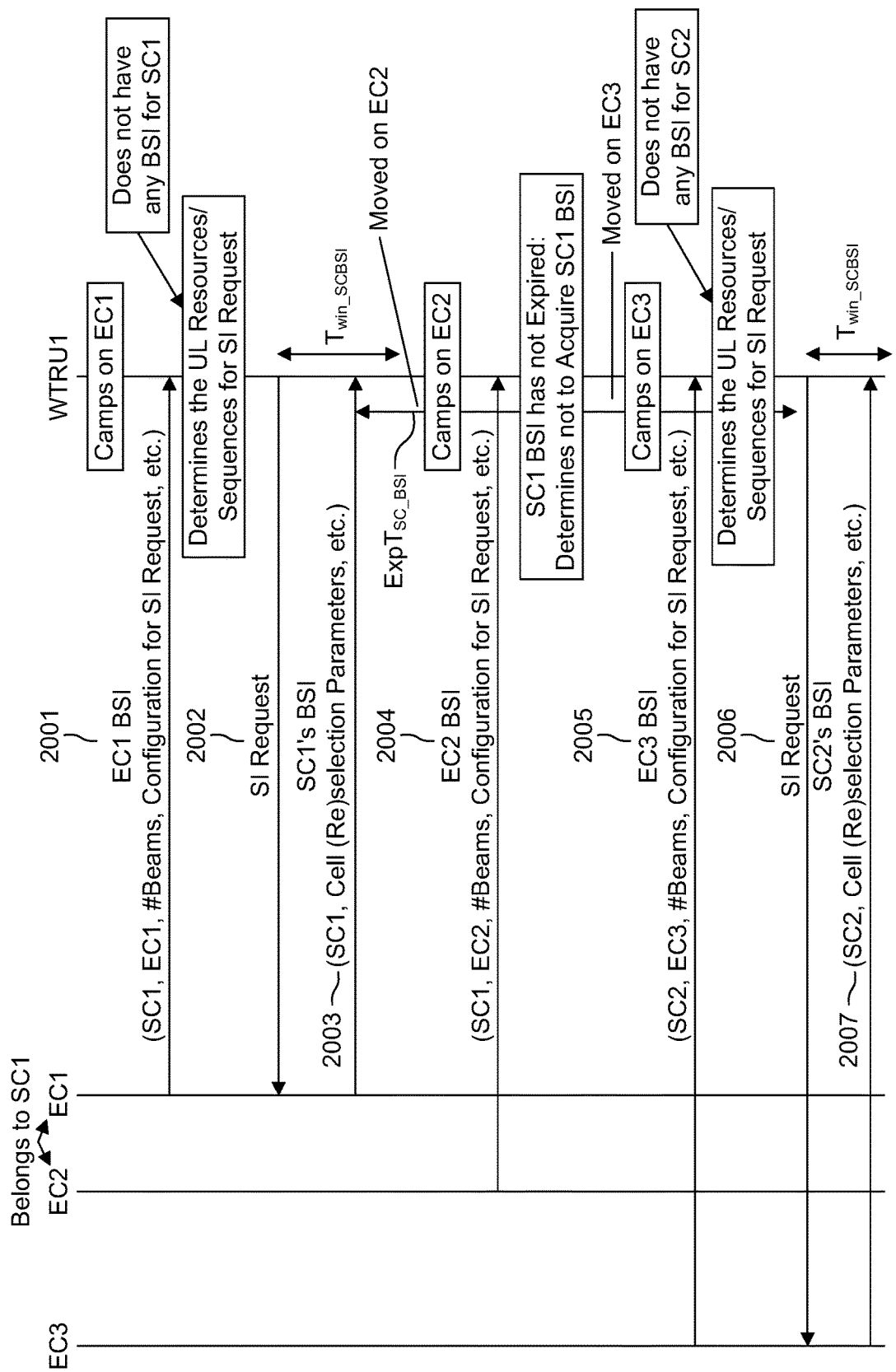
FIG. 20 illustrates an example of on-demand SC BSI acquisition procedure.

FIG. 20 illustrates an example procedure to acquire on demand SC BSI. Initially, at 2001 the WTRU after may be camping-on the EC1 and may acquire the EC1 BSI. Since the WTRU does not have any BSI of the associated SC (e.g., SC1), at 2002 the WTRU may send an SI request to acquire the SC1 BSI using the configuration given the EC1 BSI. After the acquisition of the SC1 BSI at 2003, the WTRU may move to EC2 and receive EC2 BSI at 2004, which belongs to the same SC (e.g., SC1). Since the acquired SC1 BSI has not expired yet, the WTRU does not send any new SI request to acquire the SC1 BSI at least until the expiration of the SC1 BSI. Meanwhile, at 2005 (e.g., before the expiration of the SC1 BSI) the WTRU moves to EC3 which belong to another SC (e.g., SC2) and receives EC3 BSI. Since the WTRU does not have any BSI of the SC2, at 2006 the WTRU sends a SI request to acquire, at 2007, the SC2 BSI using the configuration given in the EC3 BSI.

Figure 21:
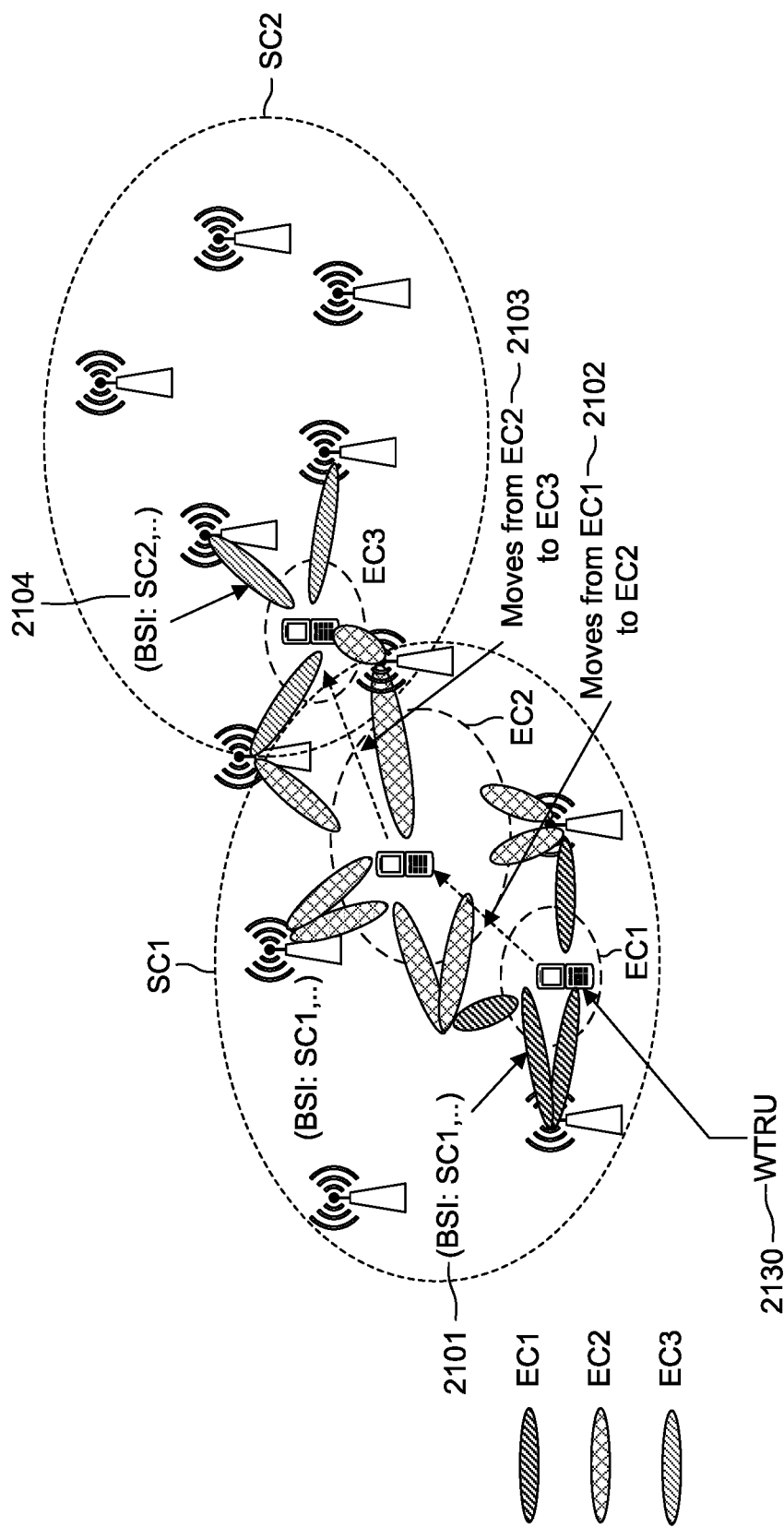
FIG. 21 illustrates an example of on-demand SC BSI acquisition procedure.

FIG. 21 illustrates the movement of the WTRU of the example of FIG. 20. As shown, initially the WTRU is camped at EC1, then moves at 2102 to EC2. At 2103, the WTRU moves to EC3. EC1 and EC2 may be in SC1, whereas EC3 may be in SC2.

In one example, on each level (e.g., BG or EC or SC), other SI (e.g., other than the BSI) may be transmitted/broadcasted periodically. The scheduling information of SI of BG, EC, and/or SC may be transmitted within the BSI of the BG, EC, and/or SC, respectively. The scheduling information may contain one or more parameters including the offset information (e.g., time/frequency offset for the transmission of the other SI with respect to the transmission of the BSI), periodicity of the other SI, etc.

In another example, other SI of BG/EC/SC may be broadcasted/unicasted in an on-demand manner. The configuration of SI request including one or more of: configuration of UL resources to send SI request, configuration of UL sequences to be used to send SI requests, value of any time window over which the requested SI may be transmitted, etc. —may be transmitted within the BSI of the respective level (BG/EC/SC). The WTRU may follow the similar procedure to acquire the other SI of any level as given above for the acquisition of on-demand SC BSI (EC BSI). The network may also follow the similar procedure to send the on-demand other SI for the SC (EC) as given above for the on-demand SC BSI (EC BSI). For the other SI of a BG, the network may transmit other SI upon the reception of a SI request. The network may transmit the other SI of a BG on only the Tx beam associated with the Rx beam over which the SI request was received or on all the active beams of the BG over which the request was received.

According to one or more techniques described herein, there may be a method performed by a WTRU to acquire system information comprising at least one of the following actions: Receiving information of the associated SC ID, configuration to send SI request including UL resources, UL sequences, time window ($T_{win\_SCBSI}$), expiration time ($ExpT_{SC\_BSI}$), frequency domain location, etc.; Determining if SC BSI associated with the current EC needs to be acquired or not based on the SC ID and the expiration of the already available SC BSI (if any); Sending a SI request using the configured resources when there is no recent SC BSI (e.g., acquired in last $ExpT_{SC\_BSI}$ duration) associated with the current EC is available; Monitoring for SC BSI on the indicated frequency domain location for the duration of $T_{win\_SCBSI}$, and/or, Re-sending a SI request if no SC BSI is received within the duration of $T_{win\_SCBSI}$.

For the above method, one or more of the following may apply: Sending a SI request using a sequence selected randomly from the configured set of sequences (if any) over the configured UL resources; Using same or different Tx beam associated with the Rx beam used to receive the best beam of the current EC or used to receive the beam over which the EC BSI containing the configuration of SI request is received; Monitoring for SC BSI using the same or different Rx beam(s) associated with the Tx beam used to transmit the SI request; Re-transmitting a SI request using same or different Tx beam and/or same or different Tx power used for the previous transmission of SI request; Receiving information of the associated SC ID, scheduling information for periodic broadcast SC BSI including time/frequency offset with respect to the EC BSI transmission, periodicity, etc.; Monitor and acquire the SC BSI using the scheduling information when there is no recent SC BSI (e.g., acquired in last $ExpT_{SC\_BSI}$ duration) associated with the current EC is available; and/or, Performing the above procedure to acquire EC BSI using the information provided within BG BSI in case of the associated EC is comprising of one or more BGs.

In one example procedure for Evanescent Cell Detection, Activation, and/or Deactivation, the WTRU may perform one or more of the following steps: selecting one or more inactive ECs/BGs to activate based on the associated detected NPIs; determining the UPI resources for each of the selected ECs/BGs using the detected NPIs; sending one or more UPIs to activate the selected ECs/BGs using the configured associated resources; start monitoring EC/BG reference signals and/or BSI from the activated ECs/BGs; and/or, re-sending UPI if no EC/BG RSs or BSI is received from the activated EC/BG within the configured (via NPI) duration. Wherein, the network to support EC detection, activation, and/or deactivation may comprise of one or more of the following: Transmitting NPIs for inactive ECs/BGs periodically over one or more associated beams; Activating an EC/BG upon reception of one or more UPI and starts transmitting periodic BSI and EC reference signals over a set of selected beams for initial activation; and/or, Deactivating an EC/BG when there is no KAI received within a configured maximum duration.

In one example method for Evanescent Cell Reselection, the WTRU may perform one or more of the following steps: receiving configuration quality thresholds, bias values, mobility state specific parameters, timer values, etc.; initiating additional measurements for EC/BG reselection when the quality of the current EC/BG is below a configured threshold; determining the quality of one or more neighboring inactive and/or active ECs/BGs using measurements on the associated NPIs or EC/BG RSs; ranking the ECs/BGs based on the measurement qualities; selecting an active EC/BG providing the best measurement quality for the configured duration and satisfying the EC/BG selection criteria; determining its mobility state based on the EC/BG reselection rate; applying cell-based and mobility state-based bias/offset values to measure the quality of different ECs/BGs; and/or, activating one or more new ECs/BGs based on the measurements in addition to the camping-on a new EC/BG.

In one example method for Evanescent Cell Selection, the WTRU may perform one or more of the following steps: selecting an EC/BG based on the quality of a configured minimum number of beams; selecting an EC/BG based on the quality of one or more beam-sets (set: anchor beam and a number of configured minimum number of supported beams); selecting an EC/BG based on the quality of one or more anchor beams; using beam-based biasing for EC/BG selection; and/or, sending KAIs periodically to indicate the WTRU's presence in the current active EC/BG.

In one example method for Hierarchical System Information Acquisition, where the method may send common SI across all ECs/BGs on the associated SC/EC level in periodic and/or on-demand basis, the WTRU may perform one or more of the following steps: receiving information of the associated SC/EC ID, configuration to send SI request time window, frequency domain location for SC/EC BSI, SC/EC BSI expiration time via the BSI of the current EC/BG; determining if SC/EC BSI associated with the current EC/BG needs to be acquired or not; sending SI request to acquire SC/EC BSI using the configured resources when there is no recent SC/EC BSI for the current SC/EC is available; monitoring for SC/EC BSI on the configured frequency domain locations for the configured time window; re-sending SI request if no SC/EC BSI is received within the configured time window; acquiring the periodic SC/EC BSI using the configuration received in EC/BG BSI.

In one example for evanescent cell augmentation, a WTRU may performed one or more of the following: receive configuration of number of potential additional beams, BPI configuration and scheduling information, power budget of the active beams, resource configuration of UAI resources, thresholds, bias values, mobility state specific parameters, timer values, etc.; initiate additional measurements for EC/BG augmentation when the quality of the current EC/BG is below a configured threshold; determine the quality of one or more potential additional beams using measurements on the associated BPIs; determine the quality of the current active beams using measurements on the associated NPIs or EC/BG RSs; determine the quality of one or more neighboring inactive or/and active ECs/BGs using measurements on the associated NPIs or EC/BG RSs; select one or more beams of the current EC/BG for augmentation based on the measurement quality; send one or more UAIs using the configured resources associated with the selected beams for augmentation; determine its mobility state based on the EC/BG reselection rate; apply beam-based, cell-based, and mobility state-based bias/offset values to measure the quality of different ECs/BGs and the beams of the current EC/BG; and/or, activate one or more new ECs/BGs in addition to the augmentation of the current EC.

In one example, a network entity (e.g., node, base station, functional entity, etc.) to support EC/BG augmentation may perform one or more of the following of: send augmentation assisting information to the WTRUs; transmit BPIs on the potential additional beams; augment the EC/BG by activating one or more additional beams or/and increasing the power of active beams upon receiving associated UAIs; update system information upon the augmentation.

As discussed herein, one or more of the following terms may be abbreviated as shown: AS: Access Stratum, BS: Base Station, BG: Beam Group, BPI: Beam Presence Indication, BSI: Basic System Information, CMAS: Commercial Mobile Alert Service, DL: Downlink, DoF: Degrees of Freedom, FR: Frequency Range, EC: Evanescent Cell, ETWS: Earthquake and Tsunami Warning System, gNB: gNodeB (Next generation NodeB), GPS: Global Positioning System, KAI: Keep Active Indication, MIB: Master Information Block, NAS: Non-access Stratum, NPI: Network Presence Indication, OFDM: Orthogonal Frequency Domain Modulation; PBCH: Physical Broadcast Channel; PLMN: Public Land Mobile Network, PSS: Primary Synchronization Signal, RAN: Radio Access Network, RAT: Radio Access Technology, RF: Radio Frequency, RNA: RAN Network Area, RRC: Radio Resource Control, RS: Reference Signals, RSRP: Reference Signal Received Power, RSSI: Reference Signal Strength Indicator, RSRQ: Reference Signals Received Quality, Rx: Receive, SC: Super Cell, SCS: Subcarrier Spacing, SFN: System Frame Number, SI: System Information, SCS: Subcarrier Spacing, SIB: System Information Block, SS: Synchronization Signals, SSB: Synchronization Signal Block, SSS: Secondary Synchronization Signal, TRP: Tx/Rx Point, Tx: Transmit, UAI: UE Augmentation Indication, UPI: UE Presence Indication, UL: Uplink, UTC: Coordinated Universal Time, V2X: Vehicle to Everything.

As described herein, a higher layer may refer to one or more layers in a protocol stack, or a specific sublayer within the protocol stack. The protocol stack may comprise of one or more layers in a WTRU or a network node (e.g., base station, TRP, eNB, gNB, other functional entity, etc.), where each layer may have one or more sublayers. Each layer/sublayer may be responsible for one or more functions. Each layer/sublayer may communicate with one or more of the other layers/sublayers, directly or indirectly. In some cases, these layers may be numbered, such as Layer 1, Layer 2, and Layer 3. For example, Layer 3 may comprise of one or more of the following: Non Access Stratum (NAS), Internet Protocol (IP), and/or Radio Resource Control (RRC). For example, Layer 2 may comprise of one or more of the following: Packet Data Convergence Control (PDCP), Radio Link Control (RLC), and/or Medium Access Control (MAC). For example, Layer 3 may comprise of physical (PHY) layer type operations. The greater the number of the layer, the higher it is relative to other layers (e.g., Layer 3 is higher than Layer 1). In some cases, the aforementioned examples may be called layers/sublayers themselves irrespective of layer number, and may be referred to as a higher layer as described herein. For example, from highest to lowest, a higher layer may refer to one or more of the following layers/sublayers: a NAS layer, a RRC layer, a PDCP layer, a RLC layer, a MAC layer, and/or a PHY layer. Any reference herein to a higher layer in conjunction with a process, device, or system will refer to a layer that is higher than the layer of the process, device, or system. In some cases, reference to a higher layer herein may refer to a function or operation performed by one or more layers described herein. In some cases, reference to a high layer herein may refer to information that is sent or received by one or more layers described herein. In some cases, reference to a higher layer herein may refer to a configuration that is sent and/or received by one or more layers described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit receive unit (WTRU), the method comprising:
receiving system information via a first set of one or more beams while in idle or inactive mode, wherein the first set of one or more beams is a currently active set of beams, the system information comprising information indicating a second set of one or more beams and augmentation resources associated with the second set of one or more beams, wherein the second set of one or more beams is currently inactive;
performing a measurement on at least one beam of the second set of one or more beams based on a measured value associated with at least one beam of the first set of one more beams being below a threshold;
determining to augment the first set of one or more beams by activating the at least one beam of the second set of one or more beams based on the measurement; and
sending an activation indication using a respective augmentation resource for the at least one beam of the second set of one or more beams in accordance with the received system information.

2. The method of claim 1, further comprising:
receiving one or more reference signals via the at least one beam of the second set of beams after sending the activation indication using the respective augmentation resource, wherein the activation indication indicates a request to begin transmission of the one or more reference signals via the at least one beam of the second set of one or more beams.

3. The method of claim 1, wherein an inactive beam is associated with a reduced reference signal or synchronization signal transmission schedule when compared to an active beam.

4. The method of claim 1, further comprising:
determining that a beam is inactive based on receipt of a beam presence indicator (BPI) received via the beam.

5. The method of claim 1, further comprising:
receiving one or more reference signals over the at least one beam of the second set of one or more beams for augmentation.

6. The method of claim 1, wherein the first set of one or more beams and the second set of one or more beams are part of a first evanescent cell.

7. The method of claim 1, wherein the system information further comprises power budget information for the first set of one or more beams, beam presence indication (BPI) information, and BPI resource information.

8. The method of claim 7, wherein determining to trigger activation of at least one beam of the second set of one or more beams for augmentation is based on the power budget information for the first set of one or more beams.

9. The method of claim 1, wherein the first set of one or more beams comprises one or more anchor beams and one or more support beams for each anchor beam.

10. The method of claim 9, wherein performing the measurement on the at least one beam of the second set of one or more beams is based on a condition that one or more anchor beams and one or more support beams of the first set of one or more beams are below a threshold.

11. A wireless transmit receive unit (WTRU) comprising:
a processor configured to:
receive system information via a first set of one or more beams while in idle or inactive mode, wherein the first set of one or more beams is a currently active set of beams, the system information comprising information indicating a second set of one or more beams and augmentation resources associated with the second set of one or more beams, wherein the second set of one or more beams is currently inactive;
perform a measurement on at least one beam of the second set of one or more beams based on a measured value associated with at least one beam of the first set of one more beams being below a threshold;
determine to augment the first set of one or more beams by activating the at least one beam of the second set of one or more beams based on the measurement; and
send an activation indication using a respective augmentation resource for the at least one beam of the second set of one or more beams in accordance with the received system information.

12. The WTRU of claim 11, wherein the processor is configured to:
receive one or more reference signals via the at least one beam of the second set of beams after sending the activation indication using the respective augmentation resource, wherein the activation indication indicates a request to begin transmission of the one or more reference signals via the at least one beam of the second set of one or more beams.

13. The WTRU of claim 11, wherein an inactive beam is associated with a reduced reference signal or synchronization signal transmission schedule when compared to an active beam.

14. The WTRU of claim 11, wherein the processor is configured to:
determine that a beam is inactive based on receipt of a beam presence indicator (BPI) received via the beam.

15. The WTRU of claim 11, wherein the processor is configured to:
receive one or more reference signals over the at least one beam of the second set of one or more beams for augmentation.

16. The WTRU of claim 11, wherein the first set of one or more beams and the second set of one or more beams are part of a first evanescent cell.

17. The WTRU of claim 11, wherein the system information further comprises power budget information for the first set of one or more beams, beam presence indication (BPI) information, and BPI resource information.

18. The WTRU of claim 17, wherein the processor is configured to:
determine to trigger activation of at least one beam of the second set of one or more beams for augmentation based on the power budget information for the first set of one or more beams.

19. The WTRU of claim 11, wherein the first set of one or more beams comprises one or more anchor beams and one or more support beams for each anchor beam.

20. The WTRU of claim 19, wherein the processor is configured to:
perform the measurement on the at least one beam of the second set of one or more beams based on a condition that one or more anchor beams and one or more support beams of the first set of one or more beams are below a threshold.

* * * * *